(12) United States Patent
Thomas

(10) Patent No.: US 12,091,264 B2
(45) Date of Patent: Sep. 17, 2024

(54) ASSEMBLIES, APPARATUSES, SYSTEMS, AND METHODS FOR MATERIAL EXTRACTION AND CONVEYANCE

(71) Applicant: Industrial Vacuum Transfer Services USA, LLC, Houston, TX (US)

(72) Inventor: Randall Earl Thomas, Harwood, TX (US)

(73) Assignee: Industrial Vacuum Transfer Services USA, LLC, Houston, TX (US)

( * ) Notice: Subject to any disclaimer, the term of this patent is extended or adjusted under 35 U.S.C. 154(b) by 151 days.

(21) Appl. No.: 17/811,295

(22) Filed: Jul. 7, 2022

(65) Prior Publication Data

US 2023/0010395 A1    Jan. 12, 2023

Related U.S. Application Data

(60) Provisional application No. 63/367,570, filed on Jul. 1, 2022, provisional application No. 63/367,219, filed on
(Continued)

(51) Int. Cl.
*B01J 19/30*     (2006.01)
*B65G 53/24*     (2006.01)
*B65G 53/58*     (2006.01)

(52) U.S. Cl.
CPC .............. *B65G 53/24* (2013.01); *B01J 19/30* (2013.01); *B65G 53/58* (2013.01);
(Continued)

(58) Field of Classification Search
None
See application file for complete search history.

(56) References Cited

U.S. PATENT DOCUMENTS

| | | |
|---|---|---|
| 2,193,784 A | 3/1940 | Smith |
| 2,458,258 A | 1/1949 | Furr |

(Continued)

FOREIGN PATENT DOCUMENTS

| | | |
|---|---|---|
| CN | 110817176 | 2/2020 |
| DE | 1528900 | 12/1969 |

(Continued)

OTHER PUBLICATIONS

Declaration of Randall Earl Thomas, Nov. 28, 2022.
(Continued)

*Primary Examiner* — Joseph A Dillon, Jr.
(74) *Attorney, Agent, or Firm* — Womble Bond Dickinson (US) LLP

(57) ABSTRACT

Assemblies, apparatuses, systems, and method to extract or convey a material from a source of the material may include a vacuum generation and sound attenuation assembly to enhance conveyance the material from the source of the material. The vacuum generation and sound attenuation assembly may include a vacuum source including a plurality of vacuum generators. Each of the plurality of vacuum generators may be positioned to cause a vacuum flow between the source of the material and the vacuum generation and sound attenuation assembly. The vacuum generation and sound attenuation assembly may further include a sound attenuation chamber connected to the vacuum source. The sound attenuation chamber may include an attenuation housing at least partially defining a chamber interior volume being positioned to receive at least a portion of the vacuum flow from the vacuum source and attenuate sound generated by the vacuum source.

20 Claims, 37 Drawing Sheets

Related U.S. Application Data on Jun. 29, 2022, provisional application No. 63/367,218, filed on Jun. 29, 2022, provisional application No. 63/364,630, filed on May 13, 2022, provisional application No. 63/264,101, filed on Nov. 16, 2021, provisional application No. 63/264,015, filed on Nov. 12, 2021, provisional application No. 63/203,147, filed on Jul. 9, 2021, provisional application No. 63/203,108, filed on Jul. 8, 2021.

(52) U.S. Cl.
CPC ............. B01J 2219/30215 (2013.01); B01J 2219/30246 (2013.01); B01J 2219/30296 (2013.01); B01J 2219/30408 (2013.01); B01J 2219/30416 (2013.01); B01J 2219/30466 (2013.01); B01J 2219/3088 (2013.01); B65G 2207/32 (2013.01)

(56) References Cited

U.S. PATENT DOCUMENTS

| | | | | |
|---|---|---|---|---|
| 2,483,485 A | * | 10/1949 | Barr | C07C 1/0485 209/474 |
| 2,863,525 A | | 12/1958 | Lucian | |
| 3,489,464 A | | 1/1970 | Delfs | |
| 3,776,601 A | * | 12/1973 | Capes | B65G 53/00 406/191 |
| 3,971,096 A | | 7/1976 | Renholt | |
| 4,000,061 A | | 12/1976 | Bowling et al. | |
| 4,212,653 A | | 7/1980 | Giles | |
| 4,278,454 A | | 7/1981 | Nemesi | |
| 4,303,417 A | | 12/1981 | Koch | |
| 4,372,713 A | * | 2/1983 | Kean, Jr. | B65G 53/64 55/303 |
| 4,379,663 A | * | 4/1983 | Allison | B65G 53/66 406/28 |
| 4,415,297 A | * | 11/1983 | Boring | B65G 53/24 55/DIG. 32 |
| 4,422,810 A | * | 12/1983 | Boring | B65G 53/24 406/191 |
| 4,423,987 A | | 1/1984 | Powers | |
| 4,519,810 A | * | 5/1985 | Haas | C10J 3/482 48/210 |
| 4,578,840 A | | 4/1986 | Pausch | |
| 4,759,691 A | * | 7/1988 | Kroupa | F04F 5/467 417/174 |
| 4,923,597 A | | 5/1990 | Anderson et al. | |
| 4,925,467 A | | 5/1990 | Jordan et al. | |
| 4,933,017 A | * | 6/1990 | Brzoska | A47L 5/14 15/406 |
| 4,935,984 A | | 6/1990 | Bryant | |
| 4,947,510 A | | 8/1990 | English | |
| 4,988,240 A | | 1/1991 | Thompson | |
| 5,030,259 A | | 7/1991 | Bryant et al. | |
| 5,163,786 A | | 11/1992 | Christianson | |
| 5,425,188 A | | 6/1995 | Rinker | |
| 5,562,746 A | | 10/1996 | Raether | |
| 5,791,073 A | * | 8/1998 | Palmer | E02F 5/003 406/173 |
| 5,940,926 A | * | 8/1999 | Inzinna | B23Q 11/0046 15/409 |
| 6,093,226 A | | 7/2000 | Schoenberger | |
| 6,206,621 B1 | | 3/2001 | Sebring | |
| 6,385,867 B1 | | 5/2002 | Slabach | |
| 6,413,020 B1 | | 7/2002 | Davison | |
| RE38,872 E | | 11/2005 | Hayes | |
| 7,074,261 B2 | * | 7/2006 | Murphy | B01D 46/02 55/482 |
| 7,909,910 B2 | * | 3/2011 | Benner | B04C 11/00 55/423 |
| 7,959,870 B2 | | 6/2011 | Yanokuchi et al. | |
| 7,967,901 B2 | | 6/2011 | Sakatani et al. | |
| 8,277,201 B2 | | 10/2012 | Krohn | |
| 8,596,990 B2 | * | 12/2013 | Schaaf | F04F 5/461 417/174 |
| 8,702,399 B2 | | 4/2014 | Krohn | |
| 8,881,341 B2 | | 11/2014 | Schmidt, Jr. | |
| 8,967,919 B2 | | 3/2015 | Yaluris et al. | |
| 9,045,072 B2 | | 6/2015 | Hetcher | |
| 9,212,669 B2 | | 12/2015 | Krohn | |
| 9,227,780 B2 | | 1/2016 | Krohn | |
| 9,687,890 B2 | | 6/2017 | Tacke | |
| 9,713,827 B2 | | 7/2017 | Bonneau et al. | |
| 9,719,230 B2 | | 8/2017 | Showley | |
| 9,988,788 B2 | | 6/2018 | Holt | |
| 10,065,150 B2 | | 9/2018 | Archuleta et al. | |
| 10,421,624 B2 | * | 9/2019 | Maguire | B65G 53/40 |
| 10,457,501 B2 | | 10/2019 | Wilkinson et al. | |
| 10,502,237 B2 | * | 12/2019 | Johnson | F04F 5/20 |
| 10,527,064 B2 | | 1/2020 | Krohn | |
| 10,739,070 B2 | * | 8/2020 | Bishop | F26B 3/20 |
| 10,875,060 B2 | | 12/2020 | Wu et al. | |
| 10,906,225 B2 | * | 2/2021 | Zinski | B29C 48/288 |
| 10,926,008 B2 | | 2/2021 | Minskoff et al. | |
| 11,091,327 B2 | * | 8/2021 | Kelly | B65G 53/04 |
| 11,179,754 B2 | | 11/2021 | Doucette, Jr. | |
| 11,584,598 B2 | | 2/2023 | Conradt | |
| 11,629,486 B2 | * | 4/2023 | Forster | E03D 5/016 4/316 |
| 11,643,790 B2 | | 5/2023 | Renger | |
| 2005/0005968 A1 | * | 1/2005 | Berry | B67D 7/0283 137/205 |
| 2007/0234906 A1 | | 10/2007 | Demarco | |
| 2007/0251198 A1 | | 11/2007 | Witter | |
| 2008/0244986 A1 | | 10/2008 | Adelmann et al. | |
| 2009/0127352 A1 | | 5/2009 | Hinther | |
| 2009/0159003 A1 | * | 6/2009 | Noguchi | B65G 53/16 118/715 |
| 2010/0218467 A1 | | 9/2010 | Witter | |
| 2010/0243575 A1 | | 9/2010 | Nowling | |
| 2011/0047743 A1 | | 3/2011 | Shepherd | |
| 2012/0117754 A1 | | 5/2012 | Mendenhall | |
| 2012/0125441 A1 | | 5/2012 | Krohn | |
| 2012/0233758 A1 | * | 9/2012 | Tolles | E03F 1/006 4/321 |
| 2012/0318583 A1 | | 12/2012 | Krohn | |
| 2013/0108482 A1 | * | 5/2013 | Johnson | F16K 15/16 417/300 |
| 2013/0232723 A1 | | 9/2013 | Catalfamo | |
| 2013/0315761 A1 | | 11/2013 | Milhau et al. | |
| 2014/0374331 A1 | * | 12/2014 | Anderson | B01D 29/13 210/416.1 |
| 2015/0335217 A1 | | 11/2015 | Fritsche | |
| 2017/0058484 A1 | | 3/2017 | Buchleiter | |
| 2017/0128957 A1 | | 5/2017 | Kosawa et al. | |
| 2017/0267466 A1 | | 9/2017 | Wilkinson et al. | |
| 2018/0148277 A1 | * | 5/2018 | Maguire | B29C 31/02 |
| 2019/0193960 A1 | | 6/2019 | Sewell | |
| 2019/0226474 A1 | | 7/2019 | Krohn | |
| 2020/0078837 A1 | | 3/2020 | Ducette et al. | |
| 2020/0378200 A1 | | 12/2020 | Krohn | |
| 2022/0031929 A1 | * | 2/2022 | Davie | A61M 1/80 |
| 2022/0126225 A1 | | 4/2022 | Nowling | |
| 2023/0009143 A1 | | 1/2023 | Thomas | |
| 2023/0009644 A1 | | 1/2023 | Thomas | |
| 2023/0010206 A1 | | 1/2023 | Thomas | |
| 2023/0010635 A1 | | 1/2023 | Thomas | |
| 2023/0011157 A1 | | 1/2023 | Thomas | |
| 2023/0127887 A1 | | 4/2023 | Khankal et al. | |
| 2023/0340957 A1 | | 10/2023 | Thomas | |
| 2023/0340966 A1 | | 10/2023 | Krohn | |
| 2023/0356273 A1 | * | 11/2023 | Speece | B27G 3/00 |
| 2023/0373571 A1 | * | 11/2023 | Sato | B66C 1/025 |
| 2023/0405644 A1 | | 12/2023 | Thomas et al. | |
| 2024/0150136 A1 | | 5/2024 | Sundholm | |

FOREIGN PATENT DOCUMENTS

| | | | | |
|---|---|---|---|---|
| DE | | 2625701 | 12/1977 | |
| DE | | 3335248 A | * 4/1985 | ............ B01J 8/0025 |

(56) References Cited

FOREIGN PATENT DOCUMENTS

| | | |
|---|---|---|
| DE | 202011052400 | 1/2012 |
| EP | 0135608 A1 * | 9/1983 |
| EP | 1226865 | 7/2002 |
| EP | 1251087 | 10/2002 |
| EP | 1537773 | 8/2005 |
| EP | 1967260 | 9/2008 |
| EP | 2045199 | 4/2009 |
| EP | 2805902 | 11/2014 |
| EP | 3064457 | 9/2016 |
| EP | 3799969 | 4/2021 |
| GB | 1385706 | 2/1975 |
| IN | 298340 | 6/2018 |
| IN | 326989 | 12/2019 |
| IN | 329066 | 1/2020 |
| IN | 396075 | 5/2022 |
| JP | 5043983 | 5/1974 |
| JP | 52115089 | 9/1977 |
| JP | 60190707 | 12/1985 |
| JP | 04103849 | 9/1992 |
| JP | 0738044 | 7/1995 |
| JP | 09221225 | 8/1997 |
| JP | 2003095436 | 4/2003 |
| JP | 2005112373 | 4/2005 |
| JP | 2006102657 | 4/2006 |
| JP | 2006130479 | 5/2006 |
| KR | 100776693 | 11/2007 |
| KR | 20120006864 | 1/2012 |
| KR | 20160077775 | 7/2016 |
| KR | 101864666 | 6/2018 |
| KR | 102063424 | 1/2020 |
| WO | 2004010006 | 1/2004 |
| WO | 2008009024 | 1/2008 |
| WO | 2009156685 | 12/2009 |
| WO | 2010090574 | 8/2010 |
| WO | 2012059625 | 5/2012 |
| WO | 2017041769 | 3/2017 |
| WO | 2021089977 | 5/2021 |

OTHER PUBLICATIONS

Invitation to Pay Additional Fees with Partial International Search for PCT/US2022/073532, Nov. 4, 2022.
International Search Report and Written Opinion for PCT/US2022/073537, Nov. 4, 2022.
International Search Report and Written Opinion for PCT/US2022/073542, Nov. 4, 2022.
International Search Report and Written Opinion for PCT/US2022/073545, Nov. 4, 2022.
International Search Report and Written Opinion for PCT/US2022/073551, Nov. 4, 2022.
International Search Report and Written Opinion for PCT/US2022/073554, Nov. 4, 2022.
VAC-U-MAX, Air Operated Industrial Vacuum Cleaners, Belleville, NJ, 2021, https://www.vac-u-max.com/.
Wayback Machine printouts of www.supavac.com, Apr. 4, 2004.
International Search Report and Written Opinion for PCT/US2022/073532, Jan. 2, 2023.
Filter Concept Pvt. Ltd., Screenshots from youtube video located at https://www.youtube.com/watch?v=bbXZCzgZh4w, Mar. 14, 2013.
Transvac, Ejector Performance Testing, Alfreton, Derbyshire, UK, 2021, https://www.transvac.co.uk/ejector-performance-testing/.
Transvac, How an Ejector Works, Alfreton, Derbyshire, UK, 2021, https://www.transvac.co.uk/how-an-ejector-works/.

* cited by examiner

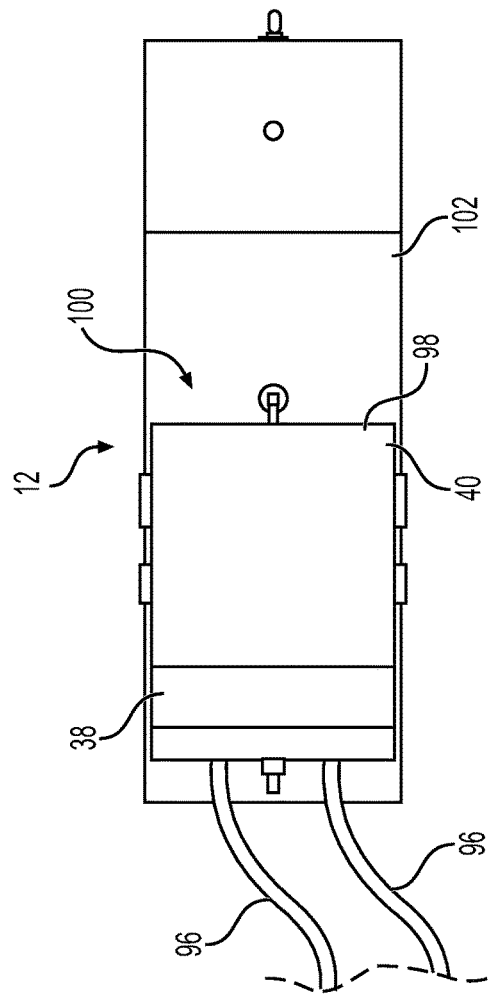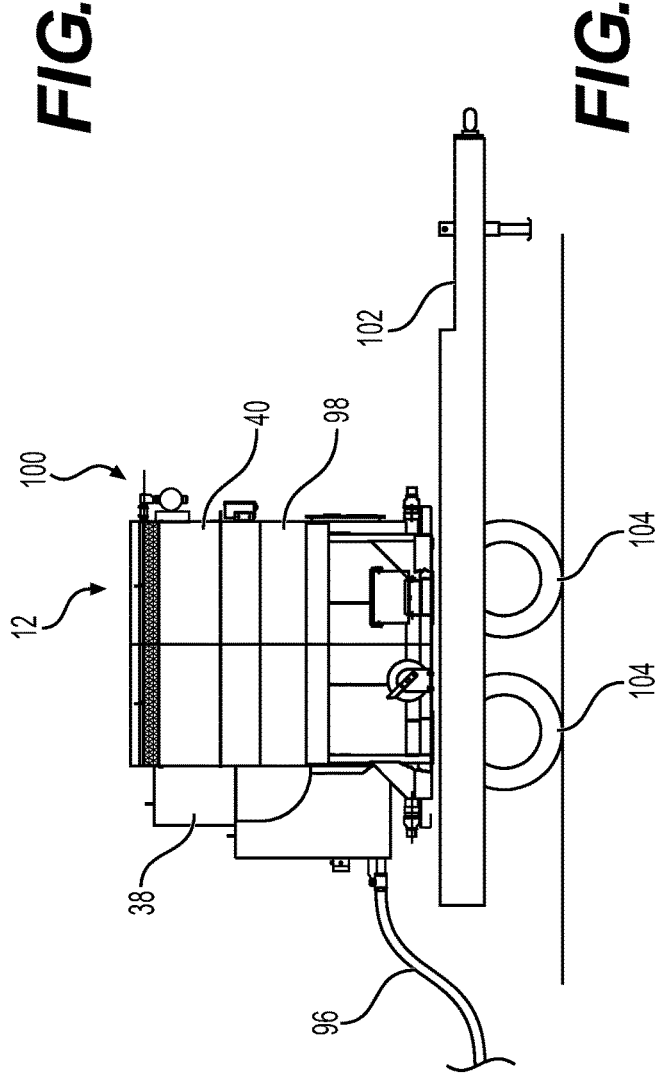
FIG. 8B
FIG. 8A

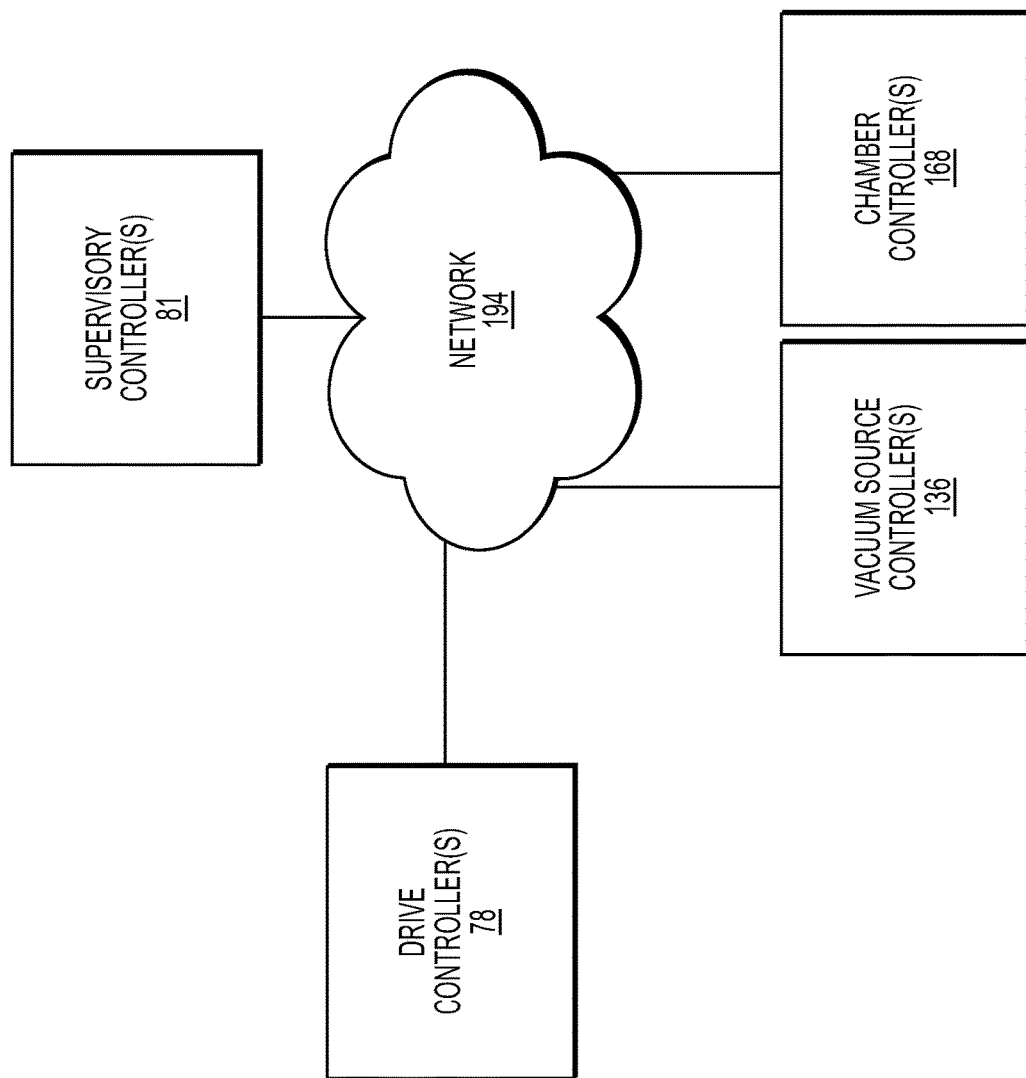

ASSEMBLIES, APPARATUSES, SYSTEMS, AND METHODS FOR MATERIAL EXTRACTION AND CONVEYANCE

PRIORITY CLAIMS

This U.S. non-provisional patent application claims priority to and the benefit of U.S. Provisional Application No. 63/367,570, filed Jul. 1, 2022, titled "HIGH VOLUME INDUSTRIAL VACUUM ASSEMBLIES AND METHODS," U.S. Provisional Application No. 63/367,219, filed Jun. 29, 2022, titled "RECEIVER, ASSEMBLIES, AND METHODS FOR LOADING AND EXTRACTING PRODUCT IN ELEVATED TOWER," U.S. Provisional Application No. 63/367,218, filed Jun. 29, 2022, titled "ASSEMBLIES AND METHODS FOR MATERIAL EXTRACTION FROM RETENTION COLLECTIONS," U.S. Provisional Application No. 63/364,630, filed May 13, 2022, titled "ASSEMBLIES, APPARATUSES, SYSTEMS, AND METHODS FOR MATERIAL EXTRACTION AND CONVEYANCE," U.S. Provisional Application No. 63/264,101, filed Nov. 16, 2021, titled "ASSEMBLIES AND METHODS FOR MATERIAL EXTRACTION," U.S. Provisional Application No. 63/264,015, filed Nov. 12, 2021, titled "ASSEMBLIES AND METHODS FOR MATERIAL EXTRACTION," U.S. Provisional Application No. 63/203,147, filed Jul. 9, 2021, titled "SYSTEMS, METHODS, AND DEVICES FOR INDUSTRIAL TOWER WASTE EXTRACTION," and U.S. Provisional Application No. 63/203,108, filed Jul. 8, 2021, titled "SYSTEMS, METHODS, AND DEVICES FOR INDUSTRIAL TOWER WASTE EXTRACTION," the disclosures of all of which are incorporated herein by reference in their entireties.

TECHNICAL FIELD

The present disclosure relates to assemblies, apparatuses, systems, and methods for extracting material from a source of the material and conveying material to a desired location and, more particularly, to assemblies and methods for extracting material from environments providing sources for the material and conveying material to elevated positions.

BACKGROUND

Certain environments, such as, for example, work sites, industrial sites, commercial sites, residential sites, or natural sites, may often be sources of material that is either deposited or accumulates as a result of operations at the site or through natural accumulation. The deposit or accumulation of the material may be undesirable for a number of reasons, and thus, removal of the material from the site may be desirable or necessary. For example, the presence of the material in sufficient quantities may hinder operations at the site, may present an undesirable environmental condition, and/or may present recycling or remediation opportunities. Traditional approaches to remove the material from the site and/or to deposit the material may be unsatisfactory or suffer from drawbacks for various reasons. For example, the material may include a variety of material types (e.g., packing material, chemical fillers, insulation, etc.) or material forms (e.g., liquids, solids, emulsions, particulates, etc.), and/or the material may be located or positioned, such that it is difficult to efficiently extract the material from the site. In some instances, it may be desirable to convey a material to a desired location, for example, in large quantities and/or in an efficient manner. For example, it may be desirable to convey a material to an elevated position relative to a source of the material. This may be desirable, for example, when supplying material to the top or upper portion of a tower, such as a refinery tower. Traditional methods of extracting and/or conveying material may be impracticable, inefficient, unduly time consuming, and/or labor intensive.

Accordingly, Applicant has recognized a desire to provide improved assemblies, apparatuses, systems, and methods for extracting material from a source and/or depositing material at a desired location, including a variety of different materials from a variety of different environments, that may be more practicable, more efficient, less time consuming, and/or less labor intensive. The present disclosure may address one or more of the above-referenced drawbacks, as well as other possible drawbacks.

SUMMARY

As referenced above, it may be desirable to provide enhanced assemblies, apparatuses, systems, and methods for extracting material from a source of the material and/or depositing the material at a desired location, including a variety of different materials from a variety of different environments, that may be more practicable, more efficient, less time consuming, and/or less labor intensive. For example, the intentional generation or production of some materials for desired intermediate or final products may result in the deposit or accumulation of by-product materials that need to be removed from the environment in which the desired products are generated or produced. In some embodiments, the assemblies, apparatuses, systems, and methods may provide enhanced extraction of material to be removed from various environments, such as, for example, work sites, industrial sites, commercial sites, residential sites, natural sites, etc. For example, in some embodiments, the material may be extracted in a substantially continuous manner and/or may be extracted without significant contamination of the ambient environment with the material or portions thereof. In some embodiments, the assemblies, apparatuses, systems, and methods may provide enhanced conveyance for the efficient delivery of material to be loaded and/or deposited in various environments and/or sites.

In some embodiments, a method to enhance extraction of pall rings from a refinery apparatus may include supplying a pressurized fluid to a plurality of vacuum generators, and generating, using the pressurized fluid, a vacuum flow. The method further may include associating a manifold with the refinery apparatus. The manifold may provide a flow path for the vacuum flow. The method also may include extracting pall rings from the refinery apparatus via the vacuum flow through the manifold to a material collector through which the vacuum flow passes, depositing at least a portion of the extracted pall rings in the material collector. The method further may include passing the vacuum flow into a sound attenuation chamber to reduce a sound level generated by one or more of the vacuum flow or generating the vacuum flow.

In some embodiments, a material extraction assembly to enhance extraction of pall rings from a refinery apparatus may include a vacuum source including a plurality of vacuum generators. Each of the plurality of vacuum generators may be positioned to cause a vacuum flow between the refinery apparatus and the vacuum source. The material extraction assembly further may include a material collector including an interior collector volume positioned for receipt of at least a portion of the pall rings. The material extraction assembly further may include a sound attenuation chamber connected to the vacuum source. The sound attenuation chamber may include an attenuation housing at least partially defining a chamber interior volume positioned to receive at least a portion of the vacuum flow from the vacuum source and attenuate sound generated by the vacuum source.

In some embodiments, a method to enhance conveyance of pall rings from a pall ring source to a material discharge outlet providing fluid communication to a refinery apparatus, the material discharge outlet being located at an elevated position relative to the pall ring source, may include supplying a pressurized fluid to a plurality of vacuum generators, and generating, using the pressurized fluid, a vacuum flow. The method further may include associating a conveyance manifold with the pall ring source. The conveyance manifold may provide a flow path for the vacuum flow between the pall ring source and the material discharge outlet. The method also may include conveying pall rings from the pall ring source via the vacuum flow through the conveyance manifold to the material discharge outlet, depositing at least a portion of the pall rings in the refinery apparatus. The method further may include passing the vacuum flow into a sound attenuation chamber to reduce a sound level generated by one or more of the vacuum flow or generating the vacuum flow.

In some embodiments, a method to enhance conveyance of a material from a material source to a material discharge outlet at an elevated position relative to the material source may include supplying a pressurized fluid to a plurality of vacuum generators, and generating, using the pressurized fluid, a vacuum flow. The method further may include associating a conveyance manifold with the material source. The conveyance manifold may provide a flow path for the vacuum flow between the material source and the material discharge outlet. The method also may include conveying the material from the material source via the vacuum flow through the conveyance manifold to the material discharge outlet, depositing at least a portion of the material from the material discharge outlet. The method further may include passing the vacuum flow into a sound attenuation chamber to reduce a sound level generated by one or more of the vacuum flow or generating the vacuum flow.

In some embodiments, a loading assembly to enhance conveyance of pall rings from a pall ring source to a material discharge outlet providing fluid communication to a refinery apparatus, the material discharge outlet being located at an elevated position relative to the pall ring source, may include a vacuum source including a plurality of vacuum generators. Each of the plurality of vacuum generators may be positioned to cause a vacuum flow between the pall ring source and the material discharge outlet. The loading assembly further may include a conveyance manifold between the pall ring source and the material discharge outlet to load pall rings into the refinery apparatus. The flow path of the conveyance manifold may provide the vacuum flow between the pall ring source and the vacuum source. A sound attenuation chamber may be connected to the vacuum source. The sound attenuation chamber may include an attenuation housing at least partially defining a chamber interior volume being positioned to receive at least a portion of the vacuum flow from the vacuum source and attenuate sound generated by the vacuum source.

In some embodiments, a loading assembly to enhance conveyance of a material from a material source to a material discharge outlet located at an elevated position relative to the material source may include a vacuum source including a plurality of vacuum generators. Each of the plurality of vacuum generators may be positioned to cause a vacuum flow between the material source and the material discharge outlet. The loading assembly further may include a conveyance manifold providing a flow path between the material source and the material discharge outlet. The flow path of the conveyance manifold may provide the vacuum flow between the material source and the material discharge outlet. The loading assembly also may include a sound attenuation chamber connected to the vacuum source. The sound attenuation chamber may include an attenuation housing at least partially defining a chamber interior volume being positioned to receive at least a portion of the vacuum flow from the vacuum source and attenuate sound generated by the vacuum source.

Still other aspects and advantages of these exemplary embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to more clearly illustrate embodiments of the disclosure.

FIG. 8A is schematic side view of an example vacuum generation and sound attenuation assembly, according to embodiments of the disclosure.

FIG. 8B is a schematic top view of the example vacuum generation and sound attenuation assembly shown in FIG. 8A, according to embodiments of the disclosure.

FIG. 17 is a block diagram of an example supervisory controllers for coordinating substantially continuous material conveyance by an example material conveyance assembly, according to embodiments of the disclosure.

DETAILED DESCRIPTION

The drawings include like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described may be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, in particular, to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Figure 1:
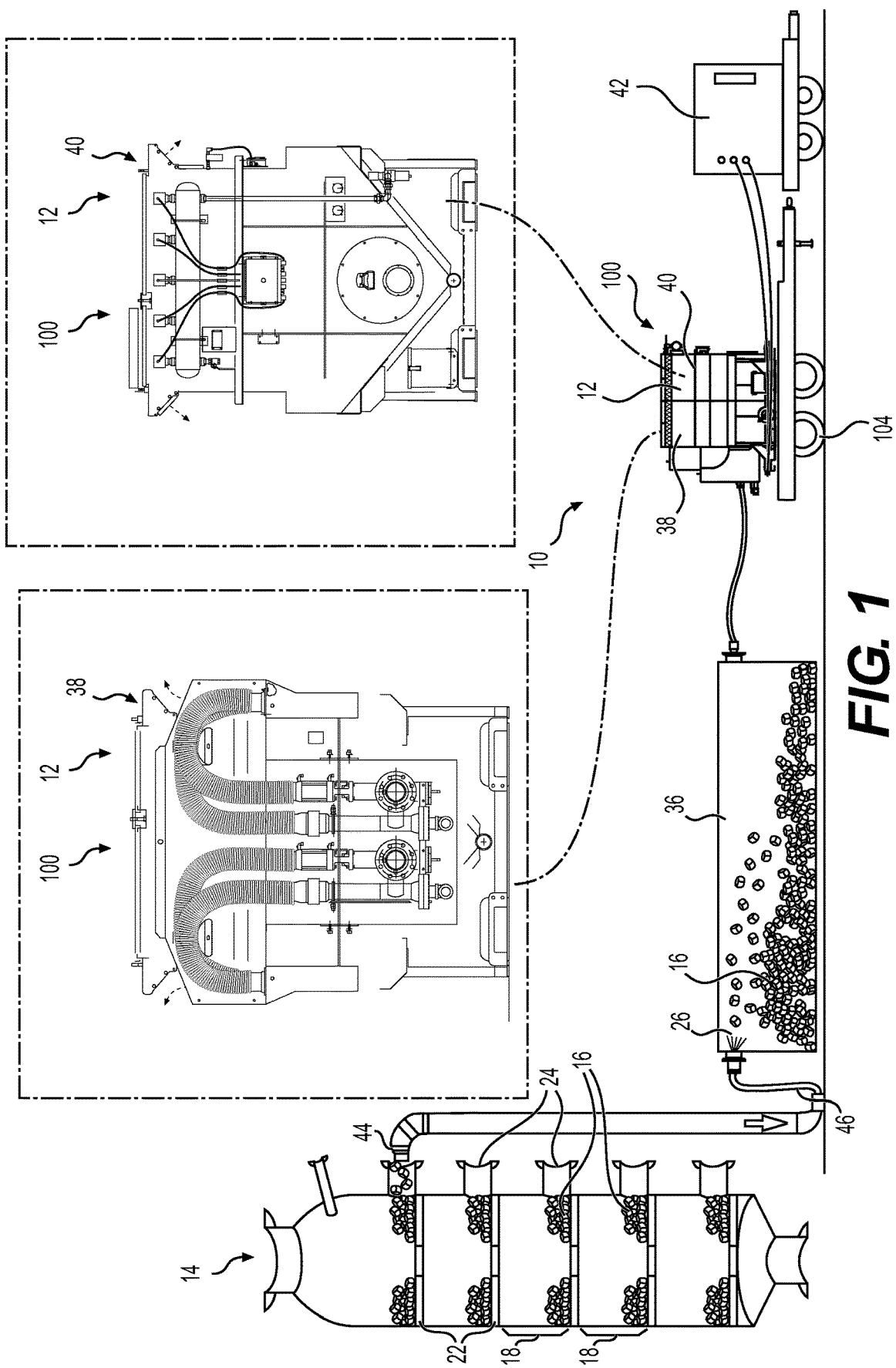
FIG. 1 is a schematic side view of an example material extraction assembly including an example vacuum generation and sound attenuation assembly, including detailed end views of an example vacuum source and an example sound attenuation chamber of the vacuum generation and sound attenuation assembly, according to embodiments of the disclosure.

FIG. 1 is a schematic side view of an example material extraction assembly 10 including an example vacuum generation and sound attenuation assembly 12, according to embodiments of the disclosure. The example material extraction assembly 10 may be configured to extract material from a source of the material. For example, the material extraction assembly 10, in at least some embodiments, may be used for extraction of a variety of different materials from a variety of different environments. For example, the intentional generation or production of some materials for desired intermediate or final products may result in the deposit or accumulation of by-products or other materials used to facilitate the production of the desired products that need to be removed from the environment. In some embodiments, the assemblies, apparatuses, systems, and methods may provide efficient extraction of the material to be removed from various environments, such as, for example, work sites, industrial sites, commercial sites, residential sites, natural sites, etc. The industrial site may include, for example, chemical reaction towers (or other types of reaction vessels) in which chemical reactions are performed to obtain desirable products. Waste material may be generated as a byproduct from the chemical reactions.

For example, some types of chemical reactions may utilize a catalyst material to mediate the chemical reactions, for example, by causing the reaction to occur and/or increasing/decreasing a rate at which the reaction occurs, etc. In a chemical reaction tower (see, e.g., FIG. 1), the catalyst material may be loaded into the chemical tower at various tower levels. Other materials, such as, for example, gasses, liquids, etc., may thereafter be introduced into the tower. The presence of the catalyst material may cause, mediate, or otherwise facilitate a desired chemical reaction to generate a desired product. The chemical reaction may cause the reactivity, morphology, or other properties of the catalyst material to change, thereby reducing the ability of the catalyst to perform its function. For example, the catalyst may be used up or otherwise render its presence in the chemical tower undesirable.

In another example, some types of chemical reactions may utilize devices and/or materials to facilitate the chemical reactions. For example, a packing material may increase the surface area and number of edge surfaces over which the reaction occurs to improve reaction efficiency and/or to increase/decrease a rate at which the reaction occurs, etc. In a chemical reaction tower (see, e.g., FIG. 1), the facilitating material may be, for example, pall rings that may be loaded into the chemical tower at various tower levels and distributed as packing. The pall rings may include and/or be formed from one or more of metal, ceramic, or polymeric materials. The pall rings may have one or more of any known pall ring sizes, configurations, and/or geometries.

The chemical reaction may also interact with the materials out of which the chemical reaction tower is formed. For example, some chemical reaction towers may be formed from concrete and steel. Chemical reaction towers may be formed from any number and types of materials. The catalyst or the other materials in the chemical reaction tower may react or otherwise interact with these materials of the chemical reaction tower, forming additional undesired products, which may be referred to as "tower products."

The undesired reaction products and/or the tower products, which may be referred to as "waste material," may move within the chemical reaction tower. For example, some of this material may partially or completely cover the catalyst or other important features of the chemical reaction tower, thereby reducing the effectiveness of the catalyst, for example, even in cases where the catalyst is not depleted but remains active.

In some examples, the undesired reaction products and/or the tower products, the "waste material," may partially or completely cover the packing material (e.g., the pall rings) or other important features of the chemical reaction tower, thereby reducing the effectiveness of the packing material. This accumulation may inhibit the reactions of the chemical reaction tower, for example, even in instances where the packing material itself is not depleted or damaged.

The presence of the depleted catalyst material, catalyst or packing material covered in waste material, and/or the waste material itself, may impair future functioning of the chemical reaction tower. For example, the presence of this material in the chemical reaction tower may reduce the conversion efficiency (e.g., the quantity of desirable products produced versus the quantity of input products) of the chemical reactions, increase a reaction time, may render the chemical reactions more difficult to control (or prevent them from occurring), and/or may otherwise reduce the ability of the chemical reaction tower to perform its intended function.

Some embodiments disclosed herein may relate to assemblies, apparatuses, systems, and methods for extracting material from a source of the materials, such as, for example, removing undesired material from environments, such as, for example, industrial environments. In some embodiments, the extracted material may include one or more of pall rings, beads, balls, pellets, sand, or bricks. Embodiments may also relate to assemblies, apparatuses, systems, and methods for conveying and depositing new and/or recycled material from a source of the material. In some embodiments, the conveyed or deposited material may include one or more of pall rings, beads, balls, pellets, sand, or bricks. For example, some embodiments disclosed herein may facilitate extraction of undesired materials or deposition of new and/or recycled material from or to an industrial environment using, for example, a high-pressure vacuum flow. Removing undesired material from an industrial environment using a high-pressure vacuum flow may provide for time-efficient removal of the undesired materials and/or may reduce or prevent contamination of the ambient environment with the undesired material or portions thereof. Similarly, depositing new and/or recycled materials, such as packing material, using a high-pressure vacuum flow may provide for time-efficient replacement of said materials in the industrial environment.

Industrial environments, chemical reaction towers, and the associated material discussed herein are merely examples, and other types of environments and/or other types of materials are contemplated.

FIG. 1 schematically depicts an example material source that is an example reaction vessel 14. Reaction vessels 14 may generate desirable products by reacting multiple materials with each other. Once a desirable product is generated, the reaction vessel 14 may be contaminated with the presence of material, which may include undesired material 16 (e.g., waste material, used pall rings, etc.). Applicant has recognized that the undesired material 16 may be distributed throughout the reaction vessel 14, that reaction vessel 14 may be tall, and/or that the reaction vessel 14 may provide limited access to the location or locations of the undesired material 16. For example, as shown in FIG. 1, the reaction vessel 14 may include a plurality of zones 18, which may include the presence of the undesired material 16. The plurality of zones 18 may be located in different regions of the reaction vessel 14, may be separated by different floors, levels, or support members 22, such as, for example, platforms, beams, etc., of the reaction vessel 14. This may render it difficult to access the undesired material 16 for removal from the reaction vessel 14. In some instances, different zones of reaction vessel 14 may only be accessible using a ladder, scaffolding, or other types of elevated support structures that may render access to the zones challenging.

As schematically depicted in FIG. 1, the material extraction assembly 10 and related methods, according to at least some embodiments, may facilitate extraction of material such as the undesired material 16 from the source of the material, such as the reaction vessel 14, using one or more high-pressure vacuum flows. The use of high-pressure vacuum flows may facilitate extraction of the undesired material 16 (and/or other material), for example, in situations in which there is limited physical access to the plurality of zones 18 and 20, where the undesired material 16 may be present. The use of high-pressure vacuum flows may facilitate parallel removal of the undesired material 16 from multiple locations within the source of the material, such as the reaction vessel 14.

For example, as shown in FIG. 1, the reaction vessel 14 may include a plurality of reaction vessel ports 24, which may provide only limited access to the plurality of zones 18 from exterior the reaction vessel 14. For example, the reaction vessel ports 24 may be relatively small, such that it may be difficult or impossible for a person to enter the interior of the reaction vessel 14 through the reaction vessel ports 24, or such that it may be difficult or impossible to pass conventional tools, such as shovels or material transportation carts, through the reaction vessel ports 24.

In some embodiments, the material extraction assembly 10 may be configured to efficiently extract the undesired material 16 through the reaction vessel ports 24, for example, by generating a high-pressure vacuum flow and associating the high-pressure vacuum flow to external portions of respective reaction vessel ports 24. In some embodiments, the high-pressure vacuum flow may generate suction directed out of the interior of reaction vessel 14 through the respective reaction vessel ports 24. The suction may generate a vacuum induced vacuum flow 26 with at least a portion of the undesired material 16 entrained in the vacuum induced vacuum flow 26.

Depending on, for example, the distribution of the undesired material 16, various fixtures may be attached to the reaction vessel ports 24 to control application of suction to the undesired material 16. In some embodiments, conduits, such as hoses or other fluid flow directing carriers may be pneumatically connected to one or more of the reaction vessel ports 24, for example, inside of the reaction vessel 14. The conduits may be positioned such that the vacuum flow 26 entrains desired quantities of the undesired material 16 in the vacuum flow 26. Exterior portions of the reaction vessel ports 24 may be connected to other components of the material extraction assembly 10, for example, to apply the high-pressure vacuum and/or process undesired material 16 entrained in the vacuum flow 26.

In some instances, at least a portion of zones 18 of the reaction vessel 14 may not be reasonably accessible via one or more of the reaction vessel ports 24, and some undesired material 16 may be present in such zones. In some embodiments, one or more of the zones 18 of the reaction vessel 14 may include substantially sealed zones. Such sealed zones may not be readily accessible via one or more of the reaction vessel ports 24 or other structures through which fluid flow paths may be established from the interior of the reaction vessel 14 to outside the reaction vessel 14. In some embodiments, to remove undesired material 16 from a sealed zone, a temporary access port may be formed in the reaction vessel 14. The temporary access port may be drilled or cut through the shell of the reaction vessel 14 to facilitate access to the sealed zone from outside the reaction vessel 14. The temporary access port may facilitate access to the sealed zone 28 from outside of reaction vessel 14.

Applicant has recognized that the undesired material may present a contamination threat to areas near reaction vessels. The undesired material 16 may include significant quantities of small particles that may be difficult to control. In some embodiments, the material extraction assembly 10 may facilitate extraction of undesired material with an at least partially sealed system. For example, the at least partially sealed system may be configured to transfer the undesired material from the reaction vessel 14 using a substantially sealed fluid flow path having a limited number of potential exit points. In some embodiments, the flow path may be filtered prior to exiting the flow path to limit or prevent discharge of particulate forms of the undesired material from at least some embodiments of the material extraction assembly 10.

Applicant has recognized that the undesired material 16 may be heterogeneous in nature and/or may include material that ranges in size from particulates to one or more inches in size. The undesired material 16 may also be in various states of matter. For example, some portions of the undesired material 16 may be solid, and other portions may be liquid or semi-liquid. Conventional approaches to material removal may be unable to effectively process heterogeneous undesired materials. In some embodiments, the material extraction assembly 10 may facilitate extraction of heterogeneous undesired material, for example, using the high-pressure vacuum flow 26. In some embodiments, the high-pressure vacuum flow 26 may be capable of moving a broad range of materials in various states of matter. The use of a high-pressure vacuum flow 26 for material extraction may facilitate substantial containment of removed undesired material 16, thereby limiting or preventing release into or contamination of the ambient environment with portion of the extracted undesired material 16.

The example material extraction assembly 10 shown in FIG. 1 may be used to extract undesired material 16 from various environments. While described with respect to an industrial environment, at least some embodiments may be used to remove undesired material 16 from other environments, including, for example, commercial, residential, and natural environments.

As shown in FIG. 1, the example material extraction system 10 may use a high-pressure vacuum flow 12 to extract materials from an industrial environment. For example, the high-pressure vacuum flow 26 may move the undesired material 16 along a flow path to separate it from the industrial environment. Once separated from the industrial environment, in some embodiments, the undesired material 16 may be transported to a site remote from the industrial environment, for example, for disposal, recycling, and/or remediation. In some embodiments, for example, as shown in FIG. 1, the material extraction assembly 10 may include a material collector 36, a vacuum source 38, a sound attenuating chamber 40 connected to the vacuum source 38, and a fluid source 42 configured to provide pressurized fluid to the vacuum source 38. In some embodiments, one or more of the material collector 36, the vacuum source 38, the sound attenuation chamber 40, or the fluid source 42 may be configured to be easily transported between geographical locations for use at different environments, for example, by being supported on one or more trailers including wheels, tracks, skids, or other devices for facilitating movement between geographical locations.

In some embodiments, one or more of the material collector 36, the vacuum source 38, or the sound attenuation chamber 40 may be arranged to form a flow path beginning at the source of the material (e.g., at the reaction vessel 14) and terminating at the sound attenuation chamber 40. The flow path may be used to extract undesired material 16 from the reaction vessel 14 and, in some embodiments, limit contamination of the ambient environment. For example, the vacuum source 38 may generate a vacuum in the flow path, thereby generating a fluid flow along the flow path. The fluid flow may be used to apply suction proximate the undesired material 16 in the reaction vessel 14 to draw the undesired material 16 into the flow path. The fluid flow in the flow path may cause the undesired material 16 to flow out of reaction vessel 14 and into material collector 36, thereby separating at least a portion of the undesired material 16 from the environment. In some embodiments, a major portion of the undesired material 16 may be deposited in the material collector 36. In some embodiments, a minor portion of the undesired material 16 may flow from the material collector 36, through the vacuum source 38, and into the sound attenuation chamber 40. In some embodiments, the sound attenuation chamber 40 may be configured to remove (or reduce) the minor portion of the undesired material 16 in the fluid flow prior to the fluid flow being exhausted into the ambient environment.

In some embodiments, to form the flow path, the material collector 36 may be pneumatically connected to the source of the undesired material (e.g., the reaction vessel 14). In some embodiments, the pneumatic connection between reaction vessel 14 may be formed using a manifold 44. The manifold 44 may be connected to multiple reaction vessel ports 24 of the reaction vessel 14, thereby pneumatically connecting the material collector 36 to multiple locations of the reaction vessel 14. For example, the interior of the material collector 36 may be pneumatically connected to the reaction vessel 14. Pneumatically connecting the material collector 36 to multiple locations of reaction vessel 14 may facilitate extraction of undesired material 16 from each of the locations, for example, concurrently, simultaneously, sequentially, in parallel, etc.

Some reaction vessels 14 may be tall. Due to the height of some reaction vessels 14 and the distribution of the zones along the height, it may be challenging to access one or more of the zones of the reaction vessel 14. In some embodiments, the manifold 44 may include relatively rigid piping (e.g., poly pipe or polyethylene pipe). The piping may render the manifold 44 at least partially self-supporting, which may facilitate pneumatic connection of the manifold 44 to multiple zones of the reaction vessel 14. The manifold 44, in some embodiments, may pneumatically connect the material collector 36 to any number of locations on the reaction vessel 14, for example, such as those that are difficult to reach or access. The piping may be of low weight and/or easily attachable to a wide variety of structures, which may reduce the need for significant in-person access to difficult-to-reach locations on/in the reaction vessel 14 to extract undesired material 16.

In some embodiments, the manifold 44 may be pneumatically connected to the material collector 36, for example, via a conduit 46, such as a hose. In some embodiments, the conduit 46 may be flexible to allow for pneumatic connection of the manifold 44 and the material collector 36 in various orientations and positions with respect to one another. The conduit 46 may be sized so as not to limit the flow of fluid along the flow path.

In some instances, the undesired material 16 in the reaction vessel 14 may present a clogging potential. For example, the undesired material 16 may include relatively large components that may tend to wedge or catch on structures through which the undesired material 16 is drawn. In some embodiments, the conduit 46 may be, at least in part, transparent, translucent, and/or capable of providing an indication of the contents passing through the conduit 46, which may be usable to detect and/or diagnose whether the conduit 46 is clogging. As noted herein, the undesired material 16 may be heterogeneous and may include relatively large components that may tend to clog narrow passages (e.g., constrictions in the conduit 46). To reduce the risk of clogging, in some embodiments, the conduit 46 may include, at least in part, a smooth inner surface, such as may be present in poly pipe. A smooth inner surface may reduce the risk of, or prevent, clogging of the conduit 46.

Figure 15:
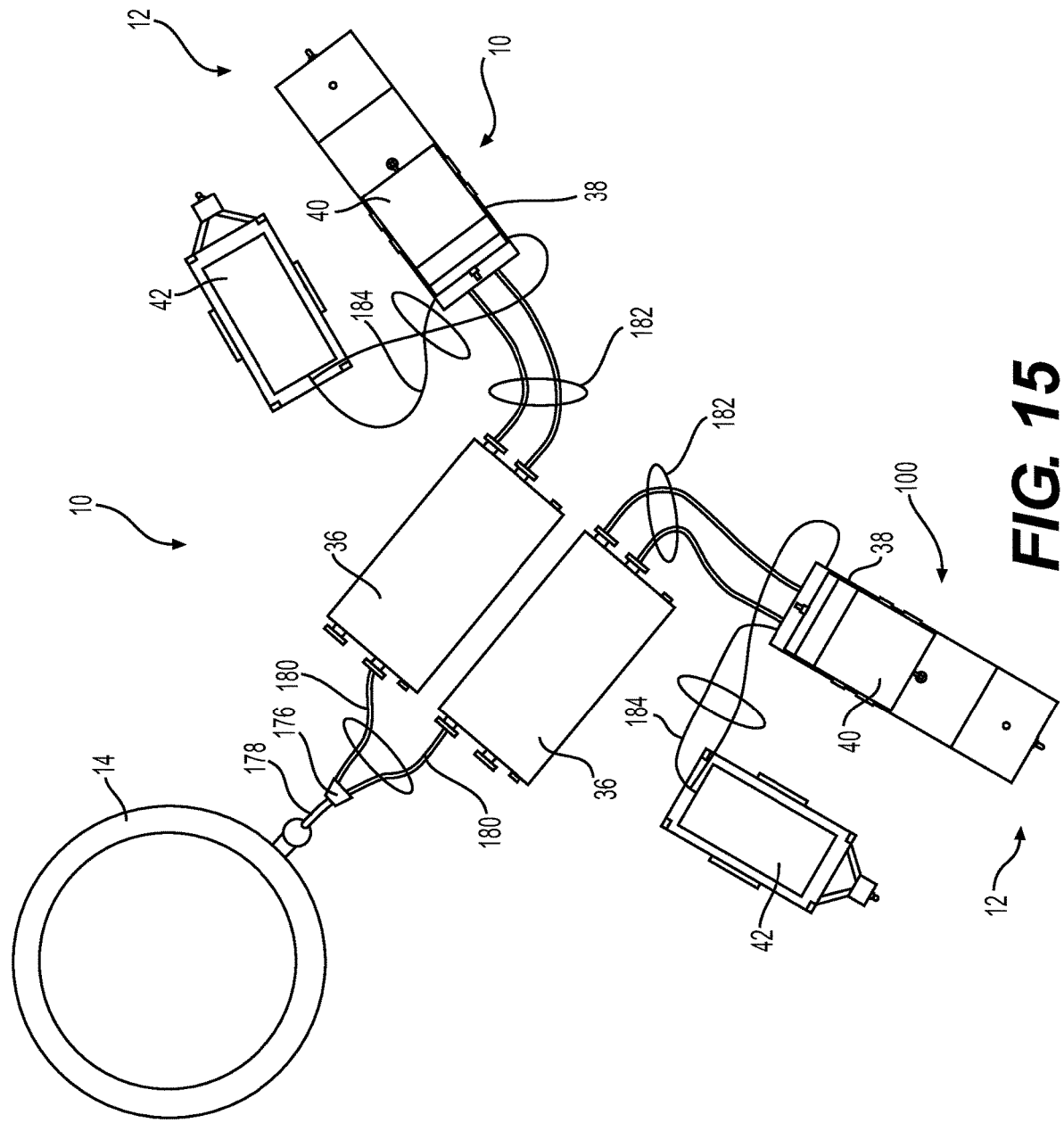
FIG. 15 is a schematic top view of example components of an example material extraction assembly, according to embodiments of the disclosure.

Although the example suction manifold 44 is shown in FIG. 1 as only being pneumatically connected to one material collector 36, in some embodiments, the suction manifold 44 may be connected to multiple material collectors, and/or multiple suction manifolds may be connected to one or more material collectors. In some embodiments, the multiple material collectors may be connected in parallel to, for example, scale-up the extraction capacity of the material extraction assembly 10, for example, by increasing the pressure of the high-pressure vacuum flow, etc., for example, as shown in FIG. 15.

In some embodiments, the undesired material 16 may flow into the material collector 36 after flowing through the manifold 44. A major portion of the undesired material 16 may be collected in the material collector 36. In some embodiments, however, some (e.g., a minor portion) of the undesired material 16 may flow out of the material collector 36 in the flow path of the high-pressure vacuum flow 26. In some embodiments, the material collector 36 may remove a major portion of the undesired material 16 from the fluid flow it receives along the flow path of the vacuum flow 26. In some embodiments, the material collector 36 may receive all, or a portion, of the fluid flow out of the reaction vessel 14, and the material collector 36 may include one or more structures configured to trap a major portion of the undesired material 16 in the fluid flow received inside the material collector 36. Once trapped, the major portion of the undesired material 16 may be retained in the material collector 36, for example, for disposal, recycling, and/or remediation.

Applicant has recognized that it may be desirable to rapidly convey materials in large quantities and/or in an efficient manner to desired locations, for example, that may present unique challenges. For example, it may be difficult to rapidly convey large quantities of materials to an elevated position relative to a source or supply of the material. Although liquid materials may be pumped to elevated positions using conventional pumps, other types of materials, such as semi-solid materials, sludge, particulates, sand, gravel, and discrete solid materials of regular or irregular sizes and shapes may be difficult efficiently to convey to elevated locations.

For example, environments similar to the example environment illustrated in FIG. 1 may present a desire to convey a material to an elevated position relative to a source or supply of the material. For example, it may be desirable to replace the undesired material 16 that was extracted from the reaction vessel 14, for example, as described with respect to FIG. 1, with a material, such as regenerated or new material. For example, it may be desirable to re-supply the reaction vessel 14 with material 16, which may be, for example, fresh or regenerated catalyst, packing materials such as pall rings, and/or other materials after the undesired material 16 has been removed. Assemblies, apparatuses, systems, and methods similar to the embodiments illustrated in FIG. 2 may provide for rapid deployment of desired materials in environments, for example, such as the example environment shown in FIG. 1.

Figure 2:
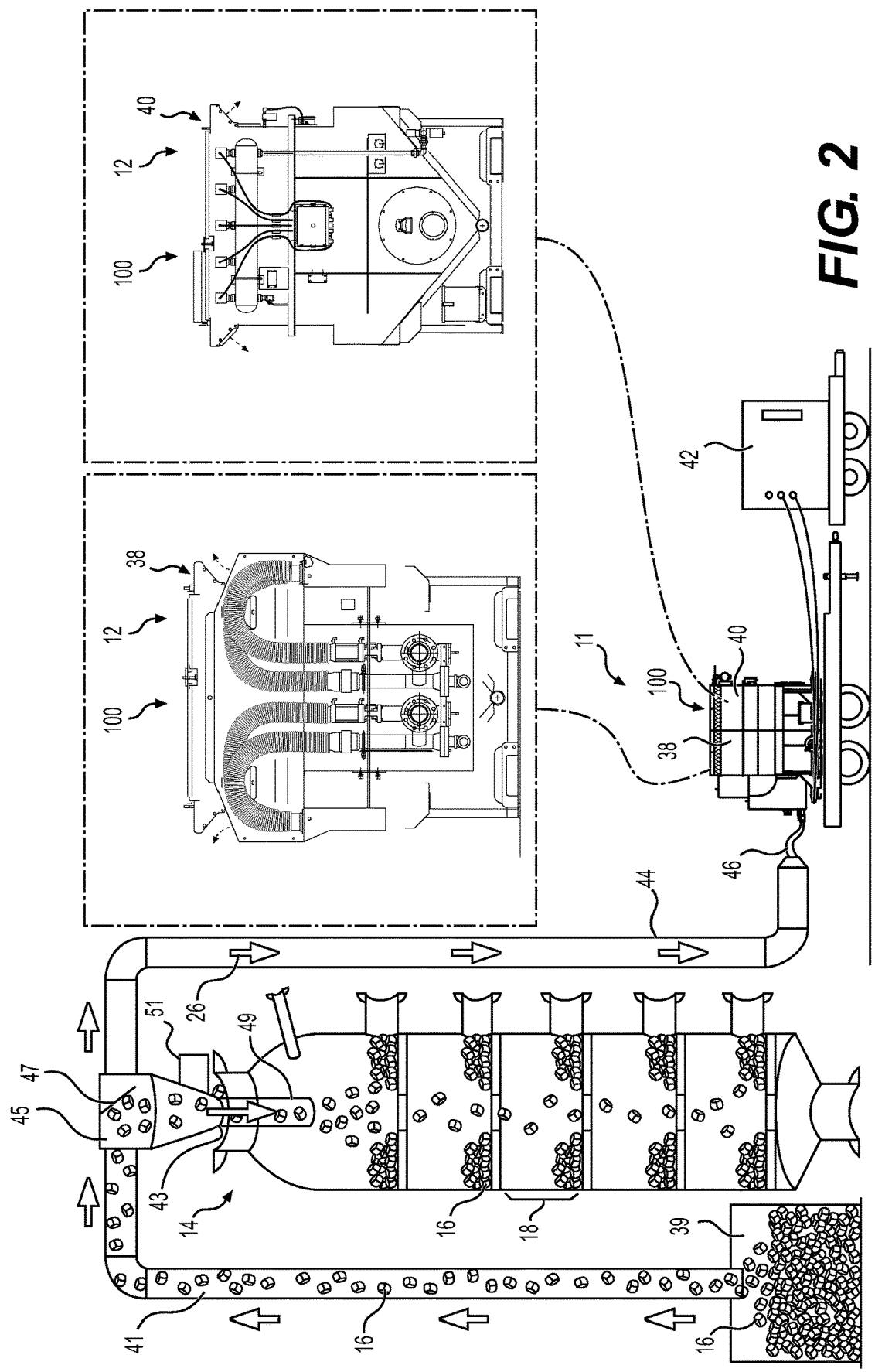
FIG. 2 is a schematic side view of an example material conveyance assembly including an example vacuum generation and sound attenuation assembly, including detailed end views of an example vacuum source and an example sound attenuation chamber of the vacuum generation and sound attenuation assembly, according to embodiments of the disclosure.

FIG. 2 schematically depicts embodiments where the example reaction vessel 14 is the desired location for depositing a material 16, for example, new, regenerated, and/or recycled material. In some embodiments, a material conveyance 11 assembly may be configured to rapidly and/or efficiently convey the material 16 to an elevated material discharge outlet 43 or port and into the interior of the reaction vessel 14, for example, by generating a high-pressure vacuum flow and associating the high-pressure vacuum flow to external portions of the reaction vessel 14. In some embodiments, the high-pressure vacuum flow may generate suction directed through a conveyance manifold 41 and a suction manifold 44 external to the reaction vessel 14. The suction may generate a vacuum-induced vacuum flow 26 (as schematically represented by the arrows in FIG. 2), such that new and/or recycled material 16 may be drawn from a material source 39 through the conveyance manifold 41 and directed to, for example, a material discharge outlet 43. The vacuum flow may be induced through a vacuum source 38 (e.g., one or more mobile fluid supplies). The conveyance manifold 41 may provide a path through which the vacuum flow 26 passes to transport the material 16 to the elevated position above the reaction vessel 14.

In some embodiment, the material conveyance assembly 11 shown in FIG. 2 may include one or more parts and/or assemblies in common with a material extraction assembly, such as, for example, the material extraction assembly 10 shown in FIG. 1. In some such embodiments, at least some portions of the material extraction assembly 10 and the material conveyance assembly 11 may be at least substantially interchangeable, facilitating rapid conversion between the material extraction assembly 10 and the material conveyance assembly 11. This may provide flexibility of use of the material extraction assembly 10 and the material conveyance assembly 11, which may result in efficiencies of use and/or adaptability of use.

The example reaction vessel 14 may be a refinery apparatus including a tower separated internally into various zones 18. The material source 39 may be, for example, a desired source of new, cleaned, regenerated, and/or recycled material, such as pall rings, and the pall rings may include and/or be formed from one or more of metal, ceramic, or polymeric materials. The pall rings may have one or more of any known pall ring sizes, configurations, and/or geometries. In some examples, the desired material 16 from the material source 39 may be new and/or regenerated catalyst or similar materials.

To provide for the rapid conveyance and/or deployment of desired material 16, in some embodiments, the material conveyance assembly 11 may include a separator housing 45. The separator housing 45 may be a device configured to rapidly convey and deploy desired materials 16 into an interior of the reaction vessel 14. For example, the separator housing 45 may be positioned at an elevated location relative to the material source 39, for example, toward an upper portion of the reaction vessel 14, and may receive the desired material 16. The separator housing 45, upon receipt of the desired material 16, may separate the desired material 16 from the high pressure vacuum flow 26, in which the desired material 16 is entrained and conveyed from the material source 39, and in which is used to carry the desired material 16 through the conveyance manifold 41 to the separator housing 45. The high pressure vacuum flow 26 may be directed to the separator housing 45 with the conveyance manifold 41.

In some embodiments, desired material 16 received in the separator housing 45 may be pumped, gravity fed, and/or otherwise directed through the material discharge outlet 43 into the interior of the reaction vessel 14. In some embodiments, the material discharge outlet 43 may be pneumatically connected to the reaction vessel 14 and located at an elevated position relative to the material source 39. The pneumatic connection between the material discharge outlet 43 and the reaction vessel 14 may be, for example, a conveyance chute 49. The conveyance chute 49 may extend at least partially into the interior of the reaction vessel 14 to facilitate the delivery of the conveyed material 16. In some embodiments, the conveyance chute 49 may include one or more flexible tubular members or other similar devices. The material discharge outlet 43 may be connected to the conveyance manifold 41 and the suction manifold 44 via the separator housing 45. The separator housing 45 may be, for example, situated above the material discharge outlet 43 and the reaction vessel 14, and may be provided with a diverter 47 or other structure capable of allowing the vacuum flow 26 to pass therethrough while directing conveyance of the desired material 16 toward the material discharge outlet 43 for deposit and/or distribution within the reaction vessel 14. The diverter 47 may include, for example, a porous element (e.g., a screen and/or filter media), a valve, and/or any device or devices capable of separating at least a majority of the desired material 16 from the vacuum flow 26 in the separator housing 45.

Although the example conveyance manifold 41 and suction manifold 44 are shown in FIG. 2 as only being pneumatically connected to a single material discharge port 43 for conveying or delivering the desired material 16 to the reaction vessel 14, in some embodiments, one or more manifolds may be connected to multiple discharge ports. In some embodiments, the multiple discharge ports may be connected in parallel to, for example, scale-up the conveyance capacity of the material conveyance assembly 11, for example, to more rapidly and/or more evenly distribute the desired material 16 within the reaction vessel 14. For example, multiple discharge ports may be arranged to more evenly disburse the desired material 16 within one or more zones 18 of the reaction vessel 14.

Although gravity, pumping, and/or other methods may be employed to clear the separator housing 45 and material discharge port 43 of blockages of the desired material 16 conveyed by the material conveyance assembly 11 to the reaction vessel 14, there may be a desire to dislodge any material 16 collected in and around the material discharge port 43. In some embodiments, desired material 16 (e.g., new and/or recycled pall rings, catalyst, etc.) that has accumulated in and around the discharge port 43 and which has not been deposited into the interior of the reaction vessel 14 may be dislodged by, for example, vibrating one or more of the components. For example, a vibration assembly 51 may be attached to the separator housing 47 and/or conveyance chute 49 adjacent to the passage near the top of the reaction vessel 14. The vibration assembly 51 may be used to induce dynamic vibration in one or more of the surrounding separator housing 47, the conveyance chute 49, or the suction manifold 44, for example, to dislodge accumulated material and deposit the accumulated material into the interior of the reaction vessel 14.

In some embodiments, the suction manifold 44 may be pneumatically connected to the vacuum source 38, for example, via a conduit 46, such as a hose. In some embodiments, the conduit 46 may be flexible to allow for pneumatic connection of the suction manifold 44 and the vacuum source 38 in various orientations and positions with respect to one another. The conduit 46 may be sized so as not to limit the flow of fluid along the flow path.

Figure 3:
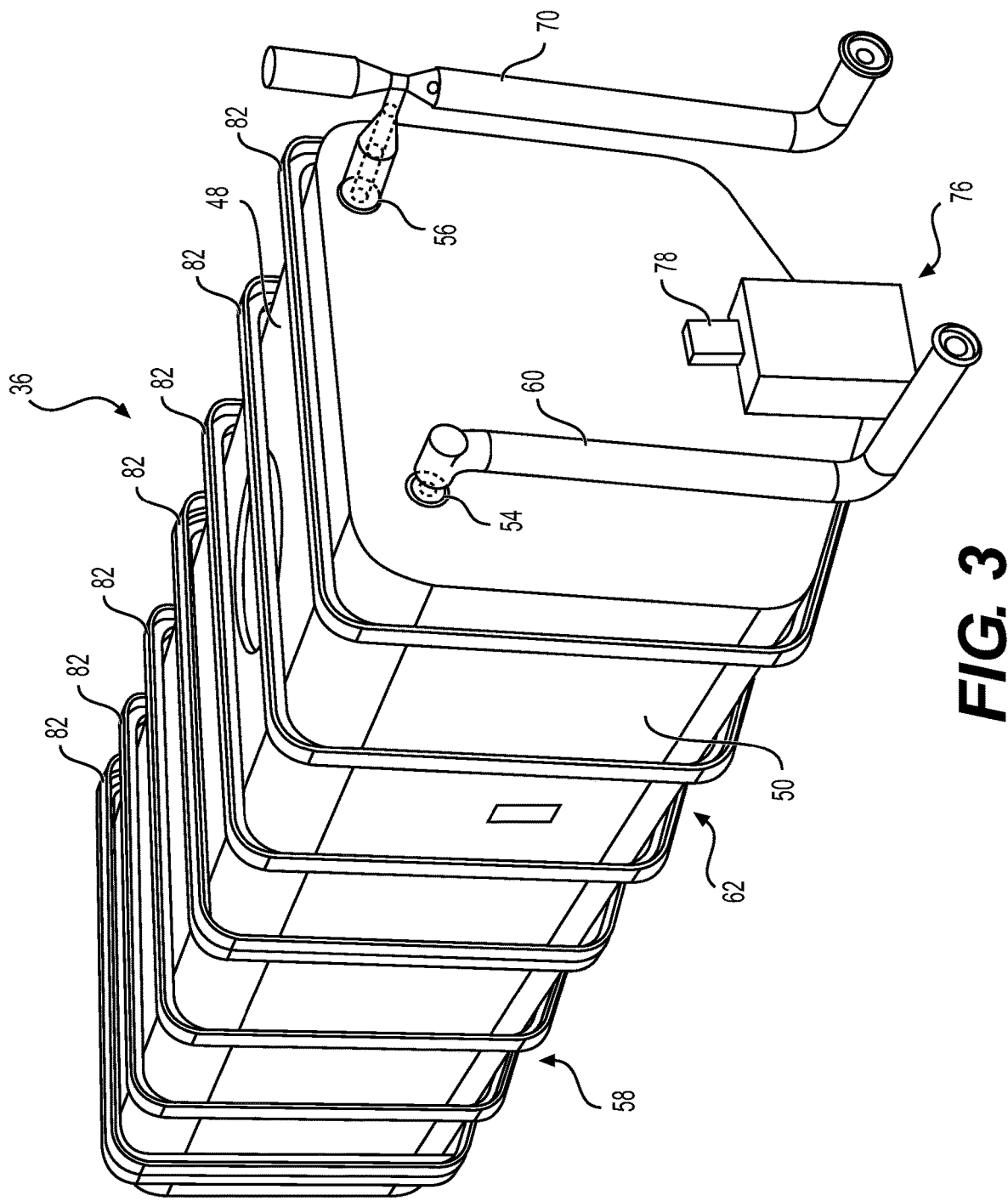
FIG. 3 is a schematic perspective view of an example material collector including an example vacuum box for a material extraction system, according to embodiments of the disclosure.
Figure 4:
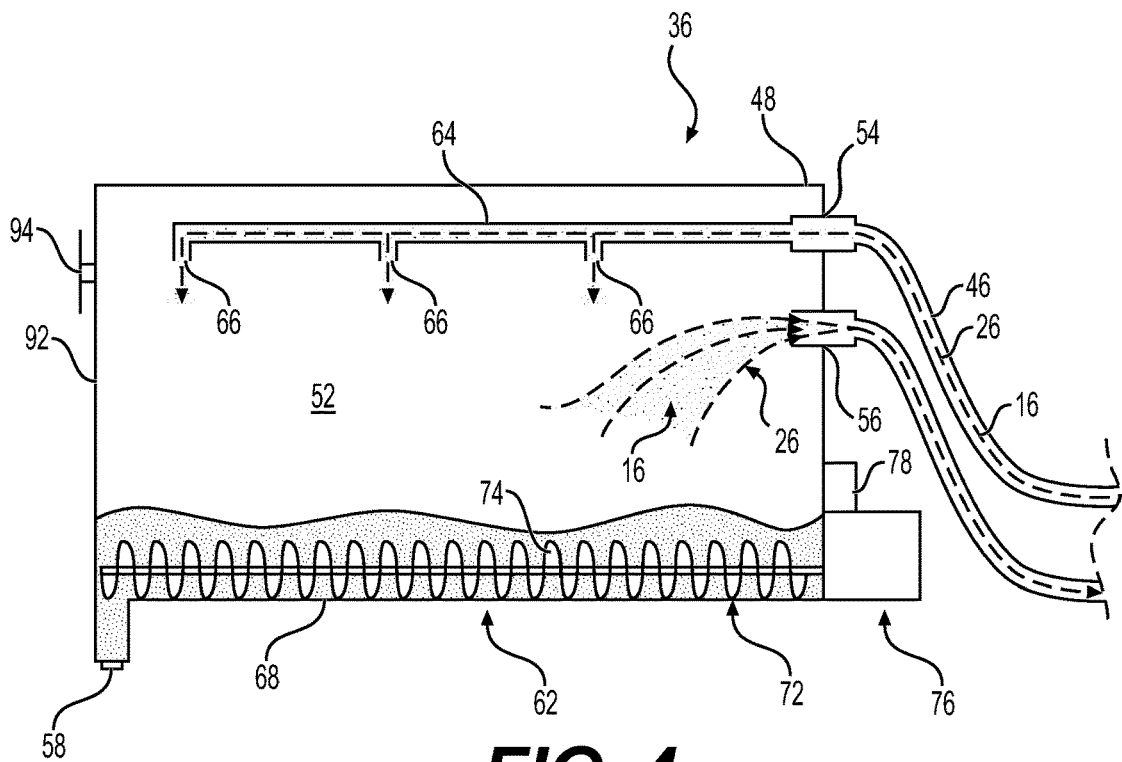
FIG. 4 is a schematic side section view of an example material collector, according to embodiments of the disclosure.
Figure 5:
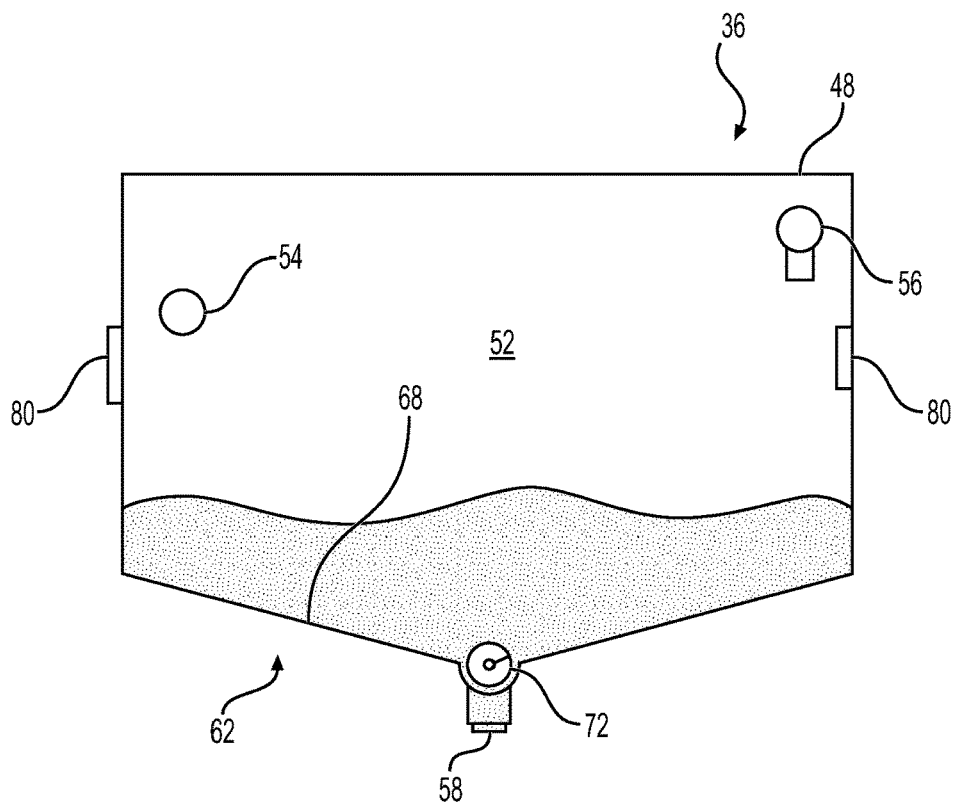
FIG. 5 is a schematic end section view of an example material collector, according to embodiments of the disclosure.

FIG. 3, FIG. 4, and FIG. 5 are schematic views of example material collectors 36, including an example vacuum box 48, according to embodiments of the disclosure when used for collecting waste or undesired material 16. FIG. 3 is a schematic perspective end view of an example material collector 36 including an example vacuum box 48. In some embodiments, the vacuum box 48 may define a structure through which the vacuum flow 26, including entrained undesired material 16, may traverse along the flow path of the vacuum flow 26. In some embodiments, the vacuum box 48 may include a housing 50, and the housing 50 may include one or more walls at least partially defining an interior 52 of the housing 50 (see FIGS. 4 and 5). In some embodiments, the interior 52 may be substantially sealed from the ambient environment by the housing 50, for example, so that a vacuum may be applied to the interior 52, and a flow path through the interior 52 may be established via the vacuum flow 26.

In some embodiments, as shown in FIG. 3 through FIG. 5, a plurality of ports may be provided in/on the housing 50 to facilitate the flow of fluid into and out of the interior 52 of the housing 50. For example, each of the ports may (i) facilitate access to the interior 52, (ii) facilitate connection of conduits or other structures to provide fluid flow through the interior 52 along a flow path with other components of the material extraction assembly 10, and/or (iii) to facilitate removal of portions of undesired material 16 from the interior 52.

For example, the ports may include an inlet port 54, a vacuum port 56, and a discharge port 58. The inlet port 54 may be positioned on the housing 50 and configured to allow access to the interior 52 from outside the housing 50. The inlet port 54 may include an aperture through a wall of the housing 50 that facilitates pneumatic connection of the interior 52 to other components of the material extraction assembly 10. In some embodiments, the inlet port 54 may be pneumatically connected to the suction manifold 44 (FIGS. 1 and 2), the reaction vessel ports 24 (FIGS. 1 and 2), and/or to one or more access devices 32 (FIG. 2B), for example, to pneumatically connect the interior 52 to one or more of the zones 18 and 20 of the reaction vessel 14. When connected to these reaction vessel ports 24, fluid flow including undesired material 16 from the reaction vessel 14 may flow into the interior 52 through the inlet port 54.

As shown in FIG. 4, in some embodiments, the inlet port 54 may be connected to one or more conduits 60 and/or other fluid flow components to form a flow path to various locations outside the housing 50. In some embodiments, the inlet port 54 may be connected to the one or more conduits 60 to connect a location where the inlet port 54 passes through housing 50 to a location that is more easily accessible for a person to secure pneumatic connections between the inlet port 54 and other components of the material extraction assembly 10. For example, with reference to FIG. 3, the inlet port 54 may extend through a wall of the housing 50 toward the top of the housing 50 and may include conduits 60 to enable the inlet port 54 to be accessible to a person located at a lower portion 62 of the material collector 36.

Applicant has recognized that for applications when undesired material 16 is being extracted from the reaction vessel 14, the vacuum box 48 may be able to store only a limited quantity of material and that the amount of the limited quantity may depend, for example, on how the material is distributed in the interior 52 of the housing 50. For example, if material is deposited in the interior 52 near locations where fluid flow may exit the interior 52, significant quantities of the material in the interior 52 may be drawn out of the interior 52 rather than being retained in the vacuum box 48. The reaction vessel 14 (or other sources of material to be extracted) may include a greater volume of material than the vacuum box 48 is able to hold.

In some embodiments, the vacuum box 48 may be configured to facilitate distribution of material within (e.g., throughout) the interior 52 of the vacuum box 48. Distributing the material in the interior 52 may increase the amount of material that may be retained in the interior 52 without increasing the rate at which the material exits vacuum box 48 due to fluid flow through the interior 52 of the vacuum box 48. This may result in the vacuum box 48 having an increased effective material capacity (e.g., the maximum material capacity at which the quantity of material exiting a structure passes a threshold level) as compared to other structures that do not distribute material throughout their respective interiors. The increased effective material capacity of some embodiments of the vacuum box 48 may reduce the rate at which the vacuum box 48 may need to be replaced as a result of being full due to the use of high-pressure vacuum flow 26 for material extraction. In some embodiments, the vacuum box 48 may facilitate time-efficient replacement in a material extraction assembly, so as to enable the material extraction system to substantially continuously remove undesired material 16 using multiple vacuum boxes 48.

As shown in FIG. 4, in some embodiments, the vacuum box 48 may include a conduit 64 configured to distribute the undesired material 16 within the interior 52 of the vacuum box 48. For example, the conduit 64 may be positioned in the interior 52 and connected to a portion of the inlet port 54 that passes through a wall of the housing 50, so as to position the fluid flow inside the interior 52 of the housing 50. In some embodiments, the conduit 64 may include multiple conduit ports 66 to facilitate distribution of the undesired material 16 within the interior 52 of the housing 50, for example, by directing the fluid flow from the reaction vessel 14 traveling along the flow path to multiple locations within the interior 52 of the housing 50. The multiple locations may be distributed along the length and/or width of the vacuum box 48, for example, so that the undesired material 16 entrained in vacuum flow 26 is distributed throughout the interior 52 (e.g., rather than being generally deposited at a single location). The conduit ports 66 may be positioned to direct the undesired material 16 in the vacuum flow 26 toward the floor 68 of the housing 50, which may, in some embodiments, be shaped (e.g., V-shaped) to cause the undesired material 16 to flow toward the center of the floor 68, for example, as shown in FIG. 5. In some embodiments, the positioning of the conduit ports 66 may cause a major portion of the undesired material 16 to fall via gravity to the floor 68. For example, by being directed toward floor 68, the undesired material 16 entrained in the vacuum flow 26 may fall below the vacuum port 56, rendering the undesired material 16 less likely to exit the interior 52 of the housing 50 due to the force of gravity.

In some embodiments, the vacuum port 56 may be positioned on the housing 50 to facilitate access to the interior 52 from outside the housing 50, for example, to facilitate the high-pressure vacuum flow 26 to be applied to the interior 52 of the housing 50. The vacuum port 56 may include an aperture passing through a wall of the housing 50 and may allow for the interior 52 to be pneumatically connected to other components of the material extraction assembly 10. In some embodiments, the vacuum port 56 may be pneumatically connected to the vacuum source 38 to enable the vacuum source 38 to apply a vacuum to the interior 52 of the housing 50. The one or more conduits 70 and/or other fluid flow components may form a flow path from the interior 52 to various locations outside the housing 50. In some embodiments, the one or more conduits 70 may be connected at a location where the vacuum port 56 passes through a wall of the housing 50 to a location more easily accessible to a person to make pneumatic connections between the vacuum port 56 and other components of the material extraction assembly 10. For example, as shown in FIG. 3, the vacuum port 56 may extend through a wall of the housing 50 toward the top of the housing 50 and may include conduits 70 to enable the vacuum port 56 to be accessible to a person toward the lower portion 62 of the material collector 36.

In some embodiments, the interior 52 may be placed along the flow path through which the undesired material 16 flows. In some embodiments, the inlet port 54 and the vacuum port 56 may be positioned with respect to the interior 52 of the housing 50 to establish a flow path into and out of the interior 52 of the housing 50. The flow path may cause fluid flow directed into the inlet port 54 to flow through the interior 52 and out the vacuum port 56. The flow path through the interior 52 may be placed along the flow path through the material extraction assembly 10. The flow path may be used in combination with other flow paths, for example, flow paths parallel to one another, to enhance the rate at which undesired material may be removed, to enhance the strength of the applied high-pressure vacuum flow 26 to facilitate removal of materials presenting a challenge to extraction (e.g., materials having a higher viscosity, materials including significant solid content, etc.), or for other purposes, for example, as shown in FIG. 15.

In some embodiments, the vacuum box 48 may be configured to move the undesired material 16 in the interior 52 to reduce the likelihood of it flowing out the vacuum port 56, which may improve the capacity of the vacuum box 48. For example, the vacuum box 48 may include a material mover 72 configured to move the undesired material 16 within the interior 52, for example, as shown in FIG. 4. Moving the undesired material 16 in the interior 52 may further distribute the undesired material 16 in the interior 52, thereby further increasing the effective undesired material capacity of the vacuum box 48. In some embodiments, the material mover 72 may apply force to various portions of the undesired material 16 in the interior 52 to change the locations of the portions within the interior 52. As shown in FIG. 4, in some embodiments, the material mover 72 may include an auger 74 and a drive unit 76 connected to the auger 74 and configured to drive (e.g., rotate) the auger 74.

In some embodiments, the auger 74 may be positioned in the interior 52 to distribute the undesired material 16 within the interior 52. The auger 74 may include a drill, one or more helical flights, and/or other structures for applying force to the undesired material 16 in the interior 52 of the housing 50. For example, when the auger 74 rotates, a drill or helical flights of the auger 74 may apply force to the undesired material 16 to move it within the interior 52. The movement caused by auger 74 may more evenly distribute the undesired material 16 within the interior 52, for example, to reduce the likelihood of the undesired material 16 flowing out the exhaust port 56. The drive unit 76 may include a motor or other type of actuator usable to rotate the auger 74 by application of a rotational force. In some embodiments, the drive unit 76 may include a hydraulic motor driven using electric power. The quantity of electric power required to rotate auger 74 by the drive unit 76 may be directly related to the quantity of undesired material 16 in the interior 52. For example, as the quantity of undesired material 16 in the interior 52 increases, it may require progressively larger amounts of electric power for the drive unit 76 to rotate the auger 74. As a result, the quantity of electrical power used by the drive unit 76 may be used to determine the load on the auger 74 and/or the quantity of the undesired material 16 in the interior 52 of the housing 50.

To manage the operation of auger 74, in some embodiments, the drive unit 76 may be operably connected to a drive controller 78, which may be coupled to system level controllers. The drive controller 78 may direct, instruct, or otherwise orchestrate operation of the drive unit 76. The drive controller 78 may include computing hardware (e.g., processors, memory, storage devices, communication devices, other types of hardware devices including circuitry, etc.) and/or computing instructions (e.g., computer code) that when executed by the computing hardware cause the drive controller 78 to provide its functionality.

Figure 6:
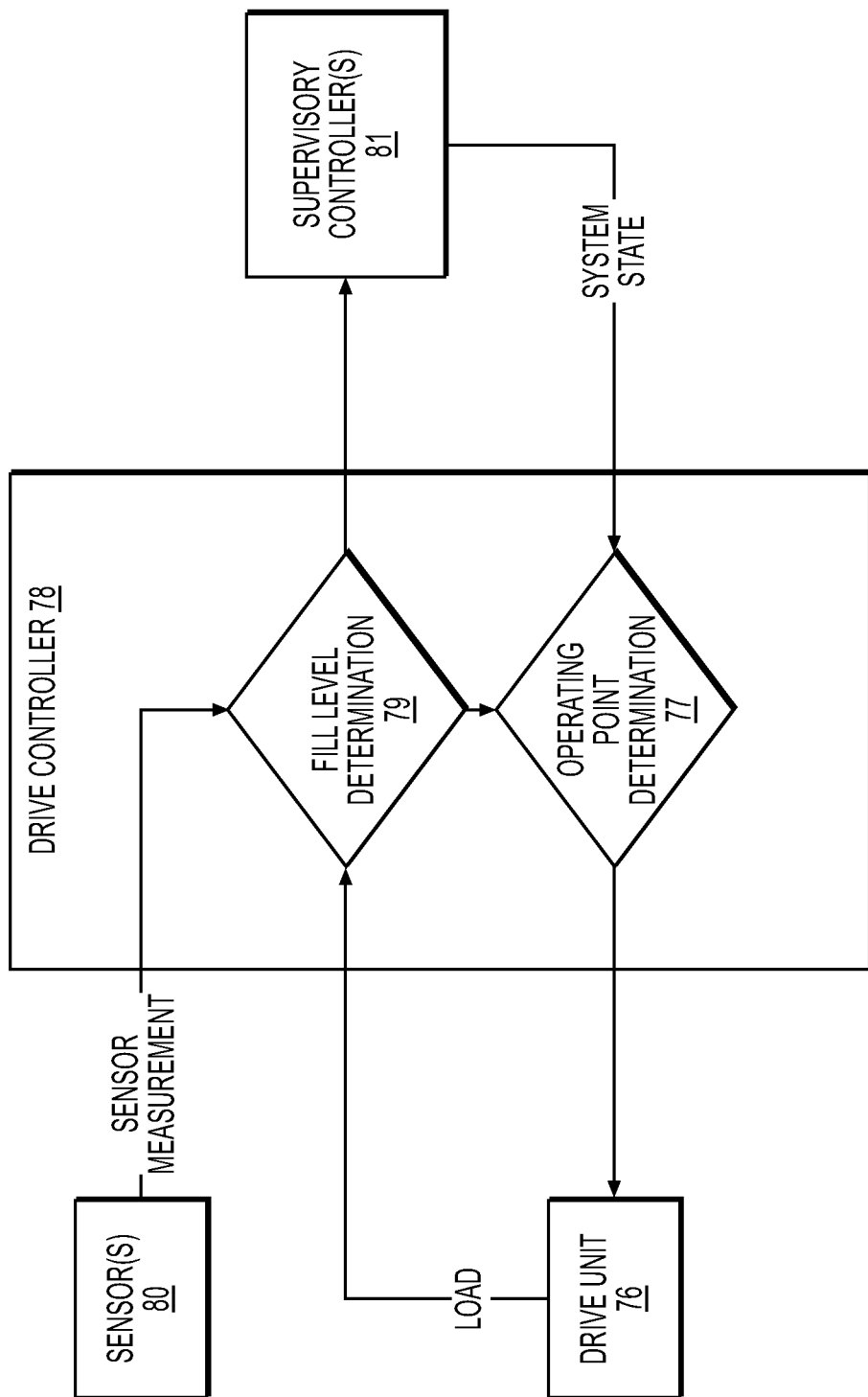
FIG. 6 is a block diagram of an example architecture for operating point determination for a material collector of a material extraction assembly, according to embodiments of the disclosure.

In some embodiments, the drive controller 78 may utilize its computing hardware to set an operating point 77 for the drive unit 76. For example, FIG. 6 is a block diagram of an example architecture for operating point 77 determination for a material collector 36 of a material extraction assembly 10, according to embodiments of the disclosure. For example, to set the operating point 77 of for the drive unit 76, the drive controller 78 may receive information from the drive unit 76 relating to the load placed on the drive unit 76 to drive, for example, the auger 74. For example, drive controller 78 may be configured to monitor the quantity of electric power used by the drive unit 76 to drive the auger 74 over time. For example, the drive unit 76 may communicate one or more signals indicative of its electrical power consumption to the drive controller 78. The drive controller 78 may include a data structure (e.g., a table, list, function, etc., stored in the computer hardware) usable to estimate the fill level 79 (e.g., a fill level determination 79 as shown in FIG. 6) of the vacuum box 48, for example, based at least in part on the electric power consumption of drive unit 76. For example, the data structure may include a lookup table that provides the fill level 79 of the vacuum box 48 as a function of its electrical power consumption.

To set the operating point 77 of the drive unit 76, in some embodiments, the drive controller 78 may obtain information from one or more sensors 80. For example, the one or more sensors 80 may be positioned at various locations on/in the housing 50 (and/or other locations) and may be operably connected to the drive controller 78 (e.g., in communication with the drive controller 78). The one or more sensors 80 may be configured to generate signals indicative of one or more physical properties, communicating the signals to the drive controller 78, and/or displaying information relating to the physical properties (or quantities determined from the measured physical properties, such as, for example, the fill level 79 of the vacuum box 48). The drive controller 78 may include a data structure (e.g., a table, list, function, etc.) usable to estimate the fill level 79 of the vacuum box 48 based at least in part on the physical properties measured with the one or more sensors 80. The data structure may include a lookup table that provides the fill level 79 of the vacuum box 48 as a function of the measured physical properties. The measured physical properties may include, for example, temperatures, depths/heights of material in the interior 52, opacities of the material, quantities of light reflected by or transmitted through the material, etc.

To measure temperatures, in some embodiments, the vacuum box 48 may include one or more sensors such as thermocouples or other devices for measuring temperature. The one or more sensors 80 may be positioned to measure the temperature of the housing 50, the interior 52, or other components of the vacuum box 48. In some embodiments, the data structure may provide the fill level 79 of the vacuum box 48 as a function of, for example, the temperature of one or more portions of the vacuum box 48.

To measure depths or heights of the undesired material in the vacuum box 48, in some embodiments, the vacuum box 48 may include one or more sensors 80 including depth sensors, such as float sensors, interferometers, etc. The depth sensors may be positioned in the interior 52, on the housing 50, and/or in other locations to measure the height of the undesired material 16 in the vacuum box 48. In some embodiments, the data structure may provide the fill level 79 of the vacuum box 48 as a function of, for example, the heights of the undesired material 16 in the vacuum box 48.

To measure available light, in some embodiments, the vacuum box 48 may include one or more sensors 80 that include photo-sensors (e.g., charge-coupled devices, etc.). The photo-sensors may be positioned to measure the intensity of light reflected by or transmitted by the undesired material 16 in the interior 52 (or other visual indicators), so as to determine the fill level 79 of the vacuum box 48. In some embodiments, the data structure may provide the fill level 79 of the vacuum box 48 as a function of, for example, the measured light intensity of the undesired material 16 in vacuum box 48.

To determine the fill level 79 of the vacuum box 48, in some embodiments, the drive controller 78 receives sensor signals from the one or more sensors 80 using one or more wireless or wired connections. The drive controller 78 may provide the measurements and/or the load on the drive unit 76 to system level controllers (e.g., supervisory controller(s)) using the one or more wireless or wired connections. The drive controller 78 may use the measurements to determine the fill level 79 of the vacuum box 48 using the data structures. Based on the determined fill level 79 and/or a state of the system (e.g., provided by system supervisory controller(s) 81), the drive controller 78 may determine an operating point 77 for the drive unit 76. The drive unit 76 may consume electric power based on the operating point 77, thereby enabling the drive controller 78 to control the rate at which undesired material 16 is moved within the vacuum box 48.

Figure 7B:
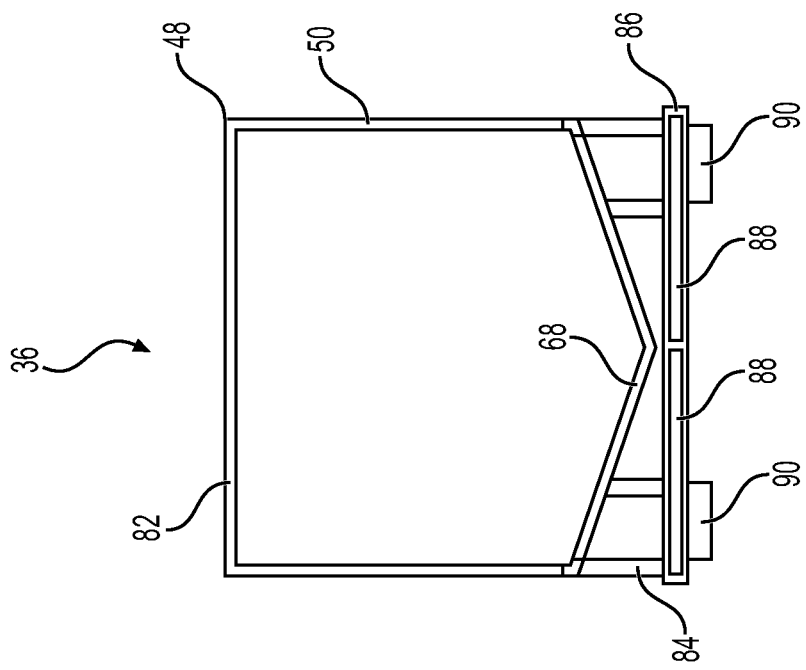
FIG. 7B is a schematic end view of the example material collector and example carrier shown in FIG. 7A, according to embodiments of the disclosure.
Figure 7A:
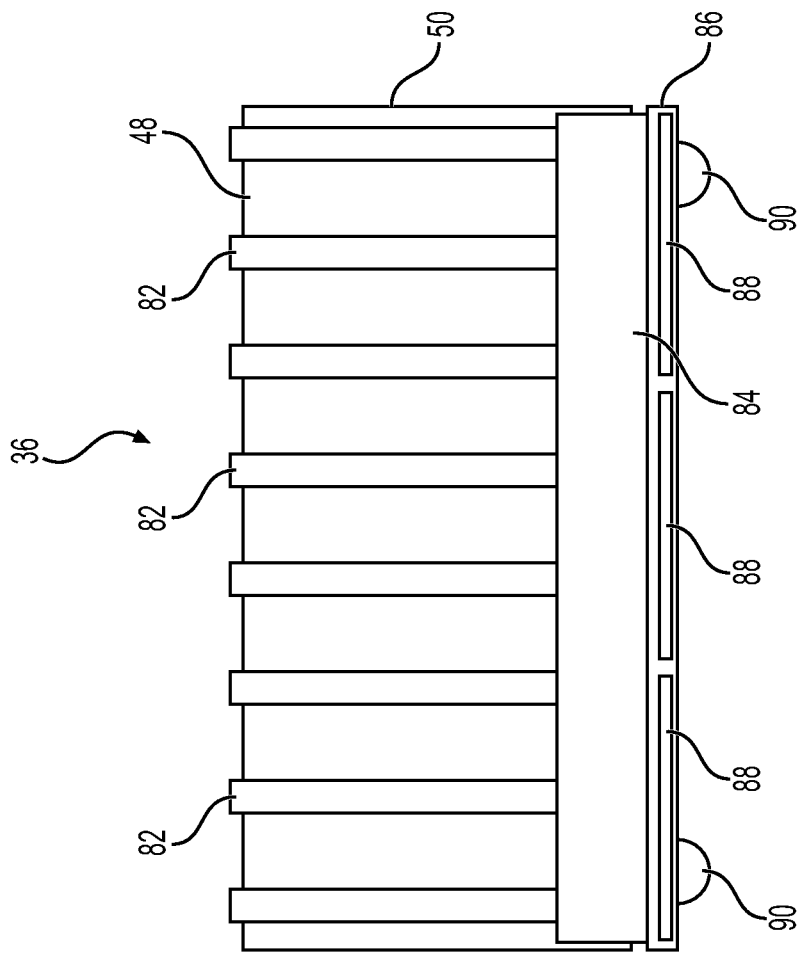
FIG. 7A is a schematic side view of an example material collector and an example carrier for transportation and/or orientation of the material collector, according to embodiments of the disclosure.

FIG. 7A is a schematic side view and FIG. 7B is a schematic end view of an example material collector 36 and an example carrier 84 for transportation and/or orientation of the material collector 36, according to embodiments of the disclosure. When in an industrial environment, for example, the vacuum box 48 may be subject to forces applied to it by the environment. To manage these forces, in some embodiments, the vacuum box 48 may include structural housing support members 82 positioned on/in the housing 50. The structural housing support members 82 may be positioned along the length of housing 50 and may at least partially encircle multiple walls of the housing 50. In some embodiments, the structural housing support members 82 may at least partially encircle three or more walls of the housing 48 (e.g., a top wall and two side walls). The structural housing support members 82 may have a thickness that extends away from the housing 50 so as to reduce the likelihood of force being directly transmitted to the housing 50. The structural housing support members 82 may enable the housing 50 to be efficiently repositioned by distributing load for moving the vacuum box 48 across the housing 50. The structural housing support members 82 may also increase the rigidity of the housing 50 (e.g., by enhancing the cross section of the housing 50, where the structural housing support members 82 are connected to the housing 50), thereby allowing the vacuum box 48 to be moved with reduced risk of damage (e.g., due to forces applied to the vacuum box 48 to move it).

In some embodiments, the vacuum box 48 may include a floor 68 having a V-shaped cross-section or other features. Such a floor 68 or other features may tend to make the housing 50 tip to one side or the other side if the housing 50 is placed directly onto a planar surface. To orient the vacuum box 48, in some embodiments, the vacuum box 48 may be provided with a carrier 84, for example, as shown in FIGS. 7A and 7B. The housing 50 and/or the structural housing support members 82 may be positioned on the carrier 84. The carrier 84 may be a structure configured to substantially maintain an upright orientation of the vacuum box 48. The carrier 84 may include a base plate 86 configured to apply force to the vacuum box 48 to move the vacuum box 48 in a manner that is unlikely to damage the vacuum box 48. In some embodiments, lifting member receivers 88 may be positioned on the base plate 86 and may extend into the base plate 86 to allow forks or other structures of heavy equipment to efficiently lift or otherwise apply force to the base plate 86. Forklifts or other types of machinery (e.g., cranes)

may be capable of lifting the carrier 84 and the vacuum box 48 using the lifting member receivers 88 (or other features of the vacuum box 48). The support members 82 may be positioned between base plate 86 and the vacuum box 48 to distribute force from the base plate 86 to the vacuum box 48. The vacuum box 48 may have a floor 68 having a V-shaped cross-section, which may tend to cause the vacuum box 48 to list to one side or the other if positioned on a planar surface. The support members 82 may attach the base plate 86 to the vacuum box 48, so that when the carrier 84 is positioned on a flat surface, the vacuum box 48 is maintained in a predetermined orientation, such as an upright orientation. The base plate 86 may be provided with wheels 90 (and/or tracks and/or skids) to facilitate movement of the vacuum box 48. The wheels 90 may be positioned relative to the base plate 86 to allow the carrier 84 with the vacuum box 48 to roll while being loaded, unloaded, and moved around an environment to which the vacuum box 48 is deployed.

Once the vacuum box 48 is filled with material, it may need to be unloaded before it may continue to be used. For example, extracted material 16 may include spent catalyst and/or used pall rings which may be effectively cleaned or recycled. To facilitate rapid unloading of the vacuum box 48, in some embodiments, the vacuum box 48 may include a door 92 (FIG. 4). The door 92 may substantially extend across one end of the housing 50. The door 92 may enable the interior 52 of the housing 50 to be physically accessed. The door 92 may include a handle 94, which facilitates opening and closing of the door 92. When opened, the end of the housing 50 may be unsealed, thereby allowing for large scale access to the undesired material 16 in the housing 52. When the door 92 is closed, the interior 52 may generally be sealed. The door 92 may allow for efficient removal of undesired material 16 from the interior 52, thereby allowing for a full vacuum box 48 to be quickly emptied and returned to use for undesired material 16 extraction purposes. For example, to efficiently remove undesired material 16 from the interior 52, the door 92 may be opened, and the vacuum box 48 may be oriented, so that gravity force tends to cause material in the interior 52 to exit the housing 50 through the door 92.

FIG. 8A is schematic side view and FIG. 8B is a schematic top view of an example vacuum generation and sound attenuation assembly 12, according to embodiments of the disclosure. To transfer the material 16 from the reaction vessel 14 to the material collector 36, as shown in FIG. 1, a high-pressure vacuum flow 26 may be applied to the material collector 36. Alternatively, or in addition, to convey and deposit material 16 from a material source 39 to the reaction vessel 14, as shown in FIG. 2, a high-pressure vacuum flow 26 may be applied to the suction manifold 44 pneumatically connected with the conveyance manifold 41 and material source 39.

In some embodiments, the vacuum generation and sound attenuation assembly 12 may include a vacuum source 38, which may be pneumatically connected to the material collector 36 by a conduit 96 (e.g., a hose). The pneumatic connection may allow the vacuum source 38 to apply a high-pressure vacuum flow 26 to the material collector 36. For example, the vacuum flow 26 may be applied to the interior 52 of the material collector 36 via the conduit 96 (or through other types of pneumatic connections between the components). The applied vacuum flow 26 may generate the vacuum induced fluid flow 26 along the flow path, thereby conveying the undesired material 16 from reaction vessel 14 to material collector 36.

In some embodiments, the vacuum generation and sound attenuation assembly 12 may include a vacuum source 38, which may be pneumatically connected to the suction manifold 44 by a conduit 96 (e.g., a hose). The pneumatic connection may allow the vacuum source 38 to apply a high-pressure vacuum flow 26 to the suction manifold 44. For example, the vacuum flow 26 may be applied to the suction manifold 44 and transmitted through the conveyance manifold 41 to draw material from the material source 39. The applied vacuum flow 26 may generate the vacuum induced fluid flow 26 along the flow path between the conveyance manifold 41 and the suction manifold 44 (see arrows in FIG. 2), thereby conveying the material 16 between the material source 39 and the material discharge outlet 43 on the reaction vessel 14.

As shown in FIGS. 8A and 8B, in some embodiments, the vacuum generation and sound attenuation assembly 12 may include a sound attenuation chamber 40 connected to the vacuum source 38. In some embodiments, the sound attenuation chamber 40 may include an attenuation housing 98 at least partially defining a chamber interior volume being positioned to receive at least a portion of the vacuum flow 26 from the vacuum source 38 and attenuate sound generated by the vacuum source 38 during operation. In some embodiments of the vacuum generation and sound attenuation assembly 12, the vacuum source 38 and the sound attenuation chamber 40 may be connected to one another to form a unified vacuum and attenuation module 100, for example, as shown in FIGS. 1, 2, 8A, and 8B. In some embodiments, the vacuum source 38 may be directly connected to the sound attenuation chamber 40. In the example embodiment shown, the unified vacuum and attenuation module 100 includes a chassis 102 supporting the vacuum source 38 and the sound attenuation chamber 40, and the chassis 102 may be configured to be transported between geographical locations. In some embodiments, wheels 104 may be connected to the chassis 102 to facilitate transportation, although tracks, skids, etc., may be connected to the chassis 102 instead of, or in addition to, wheels 104, depending, for example, on the type of terrain over which the vacuum and attenuation module 100 may be expected to traverse. In some embodiments, the chassis 102 may be self-propelled, for example, including a powertrain having an engine, hydraulic motor, and/or electric motor. Mounting the vacuum and attenuation module 100 on a mobile chassis 102 may facilitate rapid set-up, removal, and/or reconfiguration of the material extraction assembly 10 in accordance with embodiments of the disclosure.

In some embodiments, the vacuum source 38 may be implemented using a variety of configurations, depending, for example, on the environment to which the material collector 36 is deployed for operation. For example, in some embodiments, as shown in FIGS. 8A and 8B, the vacuum source 38 may generate a vacuum, which may be applied to the material collector 36. For example, the vacuum source 38 may include one or more vacuum generators 106 configured to generate the vacuum flow 26, and the vacuum generators 106 may be pneumatically connected to one or more material collectors 36, for example, via a conduit 96. In some examples, the one or more vacuum generators 106 may receive at least some electrical power via renewable means, such as batteries, solar panels, wind turbines, and/or other similar sources. In other embodiments, for example, the vacuum source 38 as shown in FIGS. 8A and 8B may generate a vacuum, which may be applied to the suction manifold 44.

The one or more vacuum generators 106 may be configured to generate the vacuum flow 26 in different ways, depending at least in part on, for example, the environment to which the vacuum and attenuation module 100 is deployed. For example, in some embodiments, the vacuum generators 106 may be configured to generate the vacuum flow 26 using the flow of another fluid. For example, the vacuum generators 106 may be connected to a fluid source 42 (see FIG. 1 and FIG. 2) via a fluid supply conduit 46. In some such embodiments, the vacuum generators 106 may be configured to receive a pressurized supply of the fluid through the fluid supply conduit 46. The flow of the pressurized fluid may cause the vacuum generators 106 to generate a high-pressure vacuum flow 26, thereby applying a high-pressure vacuum flow 26 to one or more material collectors 36, which may, in turn, transfer the vacuum flow 26 from the one or more material collectors 36 to the vacuum source 38. The vacuum-induced fluid flow 26 received from the one or more material collectors 36 may include a minor portion of the undesired material 16 from the one or more material collectors 36, for example, as described herein. Alternately or in addition, the flow of the pressurized fluid may cause the vacuum generators 106 to apply a high-pressure vacuum flow 26 to the suction manifold 44, which may, in turn, convey material from the material source 39 to the material discharge outlet 43 located at an elevated position relative to the material source.

Figure 9:
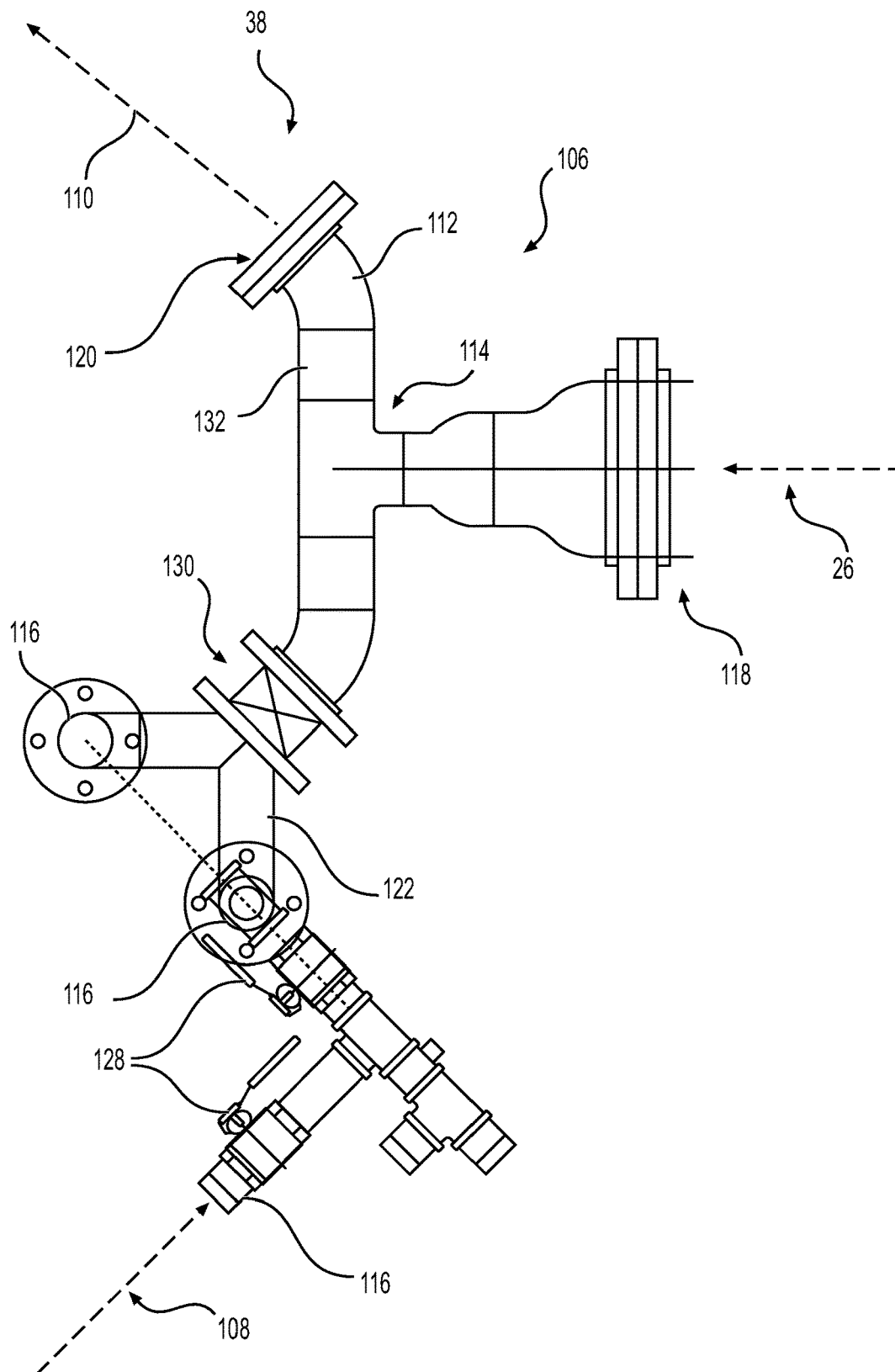
FIG. 9 is a schematic view of an example vacuum generator, according to embodiments of the disclosure.

When the one or more vacuum generators 106 generate the vacuum flow 26, in some embodiments, the vacuum generators 106 may combine vacuum-induced flow 26 and a fluid supply flow 108, and exhaust the combined flows as a vacuum exhaust fluid flow 110, which may include the minor portion of the undesired material 16, for example, as schematically shown in FIG. 9. To limit or prevent contamination of the ambient environment with the minor portion of the undesired material 16, the vacuum generators 106 may be pneumatically connected to the sound attenuation chamber 40 via a conduit 112 (e.g., a hose). The vacuum exhaust fluid flow 110 may flow from the vacuum source 38 into the sound attenuation chamber 40 via the conduit 112. Accordingly, the vacuum source 38 may be in the fluid flow path from the reaction vessel 14 to sound attenuation chamber 40.

In some embodiments, in order to generate a more powerful high-pressure vacuum flow 26, multiple vacuum sources 38 and/or one or more sound attenuation chambers 40 may be positioned on a common chassis 102 to form a more powerful vacuum generation and sound attenuation assembly 12 (e.g., a more powerful unified vacuum and attenuation module 100). For example, multiple vacuum sources 38 may each be pneumatically connected to the (one or more) sound attenuation chambers 40, which may cause two (or more) separate flow paths (e.g., for each of the vacuum sources 38) and which may be combined at the one or more sound attenuation chambers 40. In some embodiments, the vacuum sources 38 may be pneumatically connected to a common material collector 36 (e.g., to increase the strength of the high-pressure vacuum flow 26 through the common material collector 36) or different material collectors 36 (e.g., to enable the undesired material 16 to be transferred to multiple material collectors 36 in parallel). In some embodiments, the vacuum sources 38 may be pneumatically connected to the suction manifold 44 (e.g., to increase the strength of the high-pressure vacuum flow 26 through the suction manifold 44) or to multiple inlets in parallel on the suction manifold 44.

In some embodiments, the vacuum source 38 may be implemented using a variety of different structures, depending at least in part on, for example, the environment to which vacuum source 38 is deployed. For example, in some embodiments, the vacuum source 38 may include one or more vacuum generators 106, each having a venturi mechanism 114 configured to receive pressurized fluid from the fluid source 42 (see FIG. 1 and FIG. 2) and use a venturi effect to generate the vacuum flow 26 between the source of the material (e.g., the reaction vessel 14 in FIG. 1 or the material source 39 in FIG. 2) and the vacuum generation and sound attenuation assembly 12. For example, the venturi mechanism 114 may be a vacuum generation mechanism that generates a vacuum using another fluid flow.

As schematically depicted in FIG. 9, which shows an example vacuum generator 38 according to embodiments of the disclosure, the venturi mechanism 114 may include fluid supply ports 116 through which the supply of pressurized fluid from the fluid source 42 used to generate the vacuum is received. The venturi mechanism 114 also may include a vacuum port 118 through which the generated vacuum flow may be applied, and an exhaust port 120 through which the fluid flow used to generate the vacuum flow and any material drawn into the vacuum port 118 with the generated vacuum flow may be exhausted from the venturi mechanism 114.

In some embodiments, to generate the vacuum flow 26, the fluid supply ports 116 are pneumatically connected to the fluid source 42, which may be a mobile fluid supply. For example, the fluid supply ports 116 may be pneumatically connected to a compressed fluid stored at or in the fluid source 42. The compressed fluid may be used to generate the fluid supply flow 108 from the fluid source 42. The fluid supply flow 108 may be received through the pneumatic connection and into the fluid supply ports 116. The fluid supply flow 108 may be configured to drive the venturi mechanism 114, thereby generating the vacuum flow 26 produced by the vacuum source 38, which may be applied to other devices via the vacuum port 118.

The strength of the vacuum flow 26 generated by the venturi mechanism 114 may depend at least in part on, for example, the rate of the fluid supply flow 108 used to drive the venturi mechanism 114. In order to achieve higher vacuum pressure generation, in some embodiments, the vacuum source 38 may include a combiner 122. The combiner 122 may include a manifold for combining multiple fluid supply flows 108 received by the fluid supply ports 116 into a single fluid flow and directing the single fluid flow into the venturi mechanism 114 for generating the vacuum flow 26.

In some embodiments, to manage or control the flow rate, pressure, and/or volume of the fluid supply flow 108 into the venturi mechanism 114, which may be used to control or regulate the strength of the vacuum flow 26, fluid flow control valves 124 may be positioned between the fluid supply ports 116 and the fluid source 42. In some embodiments, the strength of the vacuum flow 26 generated by the venturi mechanism 114 may be substantially proportional to the flow rate, pressure, and/or volume of fluid flow into the fluid supply ports 116. The fluid flow control valves 124 may be used to limit (e.g., reduce, stop, etc.) the rate of fluid flow into the venturi mechanism 114 from the fluid supply ports 116.

In some embodiments, the vacuum port 118 may be pneumatically connected to the one or more material collectors 36 and/or the suction manifold 44 to apply a vacuum to the one or more material collectors 36 and/or suction manifold 44. Applying the vacuum may generate the vacuum-induced fluid flow 26 into the vacuum port 118. When connected to one or more material collectors 36, the vacuum-induced fluid flow 26 may draw material 16 into the one or more material collectors 36 from the source of the material (e.g., the reaction vessel 14). A major portion of the material 16 may be trapped by and within the material collector 36, and a minor portion of the material 16 may flow into the vacuum source 38 in vacuum-induced fluid flow 26.

To prevent or limit contamination of the ambient environment by a portion of any undesired material 16, in some embodiments, the exhaust port 120 may be pneumatically connected to the sound attenuation chamber 40. For example, the exhaust port 120 may be pneumatically connected to the sound attenuation chamber 40, which may exhaust the vacuum-induced fluid flow 26, which may include the minor portion of the undesired material 16, and the fluid supply flow 108, for example, as a combined fluid flow into the sound attenuation chamber 40.

In some embodiments, the pneumatic connections between the ports 116, 118, and/or 120 of the vacuum source 38 may be made using conduits, such as hoses or other flexible tubular structures. The conduits may enable the pneumatic connections to be efficiently made, thereby reducing the setup time for assembling the material extraction assembly 10, for example, shown in FIG. 1. In some embodiments, the conduits may include relatively rigid piping (e.g., poly pipe or polyethylene pipe). The piping may render the conduits at least partially self-supporting, for example, when conveying high pressure or high vacuum pressure.

Applicant has recognized that the use of conduits, such as hoses or other flexible tubular structures may present a potential hazard to a person near the conduits. For example, the vacuum flow 26 generated by the vacuum source 38 may cause the conduits to flex or move due to the forces applied to them by the fluid flows. A person may be impacted by the conduits if the flexing or movement of the conduits is significant and/or unexpected. In some embodiments, the material extraction assembly 10 or material conveyance assembly 11 may reduce or eliminate one of more of the conduits, for example, by pneumatically connecting one or more of the components of the material extraction assembly 10 or material conveyance assembly 11 to one another in a manner that eliminates a need for at least some of the conduits (e.g., connecting components directly to one another). For example, the material extraction assembly 10 or material conveyance assembly 11, in some embodiments, may include direct attachment of the vacuum source 38 to one or more material collectors 36, the suction manifold 44, and/or to the sound attenuation chamber 40. By directly attaching the vacuum source 38 to the one or more material collectors 36, the suction manifold 44, and/or the sound attenuation chamber 40, conduits, additional hoses or other flexible structures may not be necessary. As a result, the potential hazard of impact by uncontrolled movement by the conduits or other flexible structures to a person may be reduced or eliminated.

As shown in FIG. 10A, FIG. 10B, FIG. 10C, FIG. 10D, FIG. 10E, FIG. 10F, FIG. 10G, FIG. 10H, FIG. 10I, FIG. 10J and FIG. 11 (also FIGS. 8A and 8B), in some embodiments, the vacuum source 38 may be directly connected to the sound attenuation chamber 40 forming a unified vacuum and attenuation module 100. Directly connecting the vacuum source 38 to the sound attenuation chamber 40 may result in the vacuum-induced fluid flow to flow from the vacuum source 38 (e.g., as part of the vacuum exhaust fluid flow 110) directly into the sound attenuation chamber 40. In some such embodiments, both the vacuum source 38 and the sound attenuation chamber 40 may be rigid structures able to absorb forces applied to them by the vacuum flow 26 without significantly deforming or moving. The unified module 100 may be fitted with lifting receiver members 99 so the vacuum source 38 and sound attenuation chamber 40 may be easily transported to and deployed by operators of the site using a forklift, crane, or other appropriate equipment and/or methods.

Applicant has recognized that the material 16 may, in some instances, be challenging to move via fluid flow by virtue of, for example, the state of matter of the material 16, the weight of the material 16, the viscosity and/or surface tension of the material 16, and/or other physical properties of the material 16. Such characteristics of the material 16 may limit the rate at which the material 16 may flow through the fluid flow path if only a limited level of the vacuum flow 26 is generated by the vacuum generators 106. In some embodiments, the material extraction assembly 10 or material conveyance assembly 11 may be configured to provide a high-pressure vacuum flow 26, which may be suitable to expedite flow of the material 16 through the fluid flow path. To expedite the flow of the material 16, the vacuum source 38, in some embodiments, may include two or more vacuum generators 106, such as two or more venturi mechanisms 114, which may be operated in parallel with each other in order to enhance the pressure of the vacuum flow 26 generated by the vacuum source 38. Each of the two or more vacuum generators 106 may be driven using the pressurized fluid from the fluid source 42 (and/or other sources of pressurized fluid, such as other fluid sources (e.g., mobile fluid supplies)).

FIGS. 10A, 10B, 10C, 10D, and 10E are schematic views of an example vacuum generation and sound attenuation assembly 12 showing an example vacuum source end, according to embodiments of the disclosure. The example vacuum generation and sound attenuation assembly 12 shown in FIGS. 10A through 10E includes an embodiment of vacuum source 38 having multiple venturi mechanisms 114. For example, as illustrated, the vacuum source 38 includes four venturi mechanisms 114. The four venturi mechanisms 114 may be operated simultaneously in parallel to provide a high-pressure vacuum flow 26 and different levels of vacuum pressure.

In some embodiments, to manage the pressure generated by vacuum source 38, the venturi mechanisms 114 maybe divided into two dual vacuum sources 126. Each of the venturi mechanisms 114 of the two dual vacuum sources 126 may be fluidly connected in parallel to each other, for example, so that they each may be driven using a common fluid supply port 116, may commonly exhaust out of a common exhaust port 120, and/or may apply vacuum using a common vacuum port 118. In this example manner, each dual vacuum source 126 may provide a higher pressure vacuum flow 26 than may be provided using a single venturi mechanism 114 driven by a similar rate of fluid flow received from the fluid source 42.

A plurality of vacuum conduits 121 may be provided with the vacuum source 38 to provide a flow path between one or more of the vacuum sources 126 and the sound attenuation chamber 40. The vacuum conduits 121 may be, for example, ducts of flexible steel conduits, such as flexible corrugated steel conduits. The vacuum conduits 121 may be capable of absorbing reaction loads at the joints with the vacuum sources 126 and/or the sound attenuation chamber 40, for example, while resisting collapse under the negative pressures of the vacuum flows 26 from the venturi mechanisms 114 of the vacuum sources 126.

To control the generation of the vacuum flow 26 by the one or more vacuum sources 38, in some embodiments, the ports 116, 118, and/or 120 of each dual vacuum source 126 may be controlled by corresponding respective control valves 128, 130. The control valves 128, 130, may be usable to control the rate of fluid flow through each of the respective ports.

In some embodiments, to manage the process of generating the high-pressure vacuum flow 26, the vacuum source 38 may include a vacuum source controller 136. The vacuum source controller 136 may be in communication with one or more of the control valves 128, 130. The vacuum source controller 136 may be configured to control operation of one or more of the control valves 128, 130 to provide vacuum flows having desired pressures. For example, the vacuum source controller 136 may be operably coupled to an adjustor, such as a switch, dial, or other mechanism that a person may operate to achieve a desired level of vacuum pressure to be generated by the vacuum source 38. The vacuum source controller 136 may use one or more signals from the adjustor to set the operation points for the one or more control valves 128, 130 to generate the desired vacuum pressure with, for example, the venturi mechanisms 114.

The vacuum source controller 136 may include computing hardware (e.g., processors, memory, storage devices, communication devices, other types of hardware devices including circuitry, etc.), and/or computing instructions (e.g., computer code) that when executed by the computing hardware cause the vacuum source controller 136 to provide its functionality. The vacuum source controller 136 may include a lookup table or other data structure usable to determine the operating points for the one or more control valves 128, 130 based on a desired vacuum flow level. Once operating points are determined, the vacuum source controller 136 may modify operation of one or more of the control valves 128, 130 based on the operating points. For example, vacuum source controller 136 may modify the quantities of power used to drive control valves 128, 130 to set the quantity of fluid flow through each of the ports 116, 118, and/or 120.

In some embodiments, to limit or prevent contamination of the ambient environment with any undesired material 16, the sound attenuation chamber 40 may be configured remove undesired material 16 from the vacuum-induced fluid flow 26 prior to exhaustion into the ambient environment. To do so, the sound attenuation chamber 40 may be pneumatically connected to the vacuum source 38. In some embodiments, the sound attenuation chamber 40 is pneumatically connected to the vacuum source 38 by a conduit (e.g., a hose). In some embodiments, for example, as shown in FIGS. 10A-10J, the sound attenuation chamber 40 is directly and pneumatically connected to the vacuum source 38, thereby reducing reliance on a conduit, which may provide a potential hazard during operation.

Figure 10A:
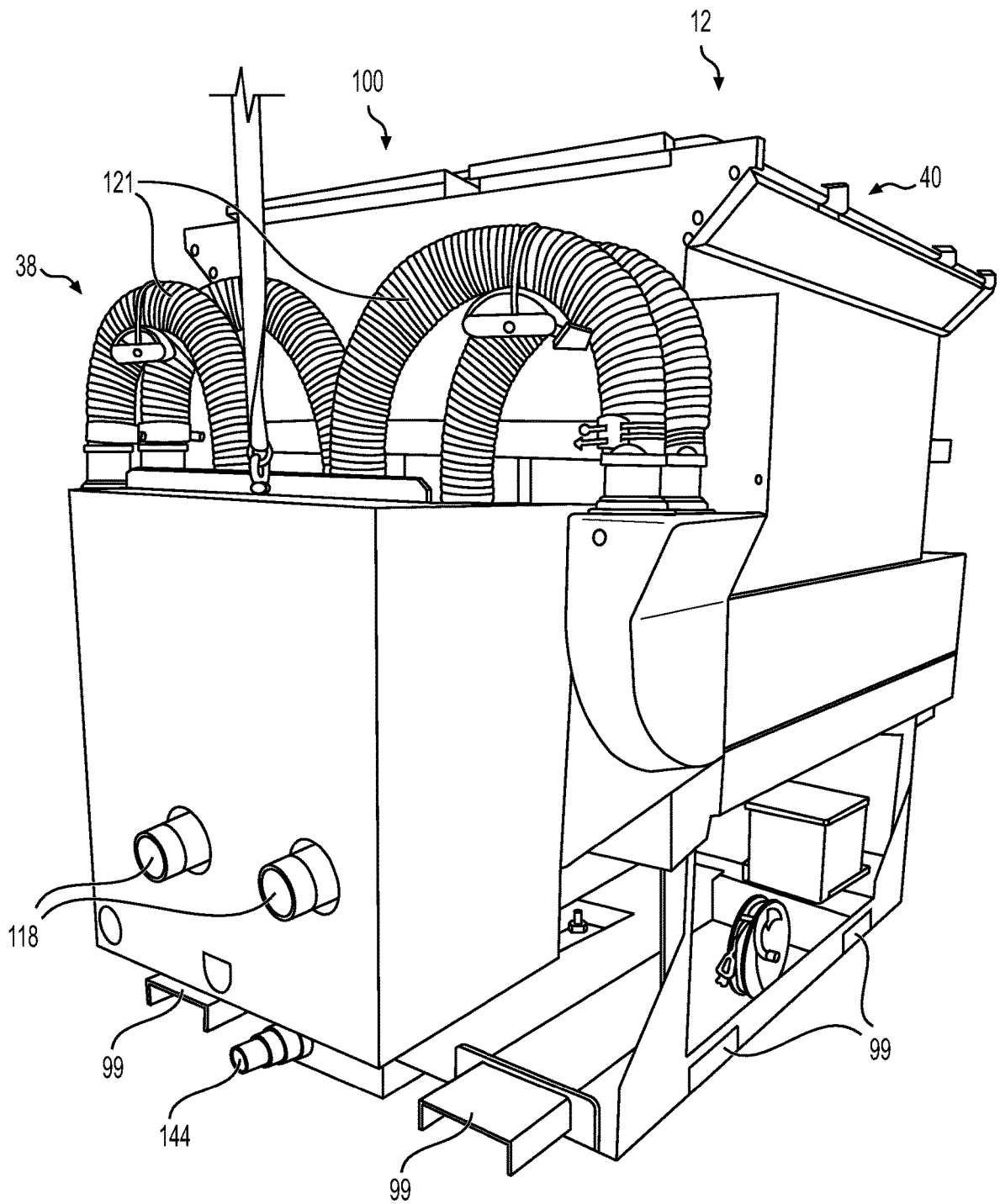
FIG. 10A is a schematic perspective view of an example vacuum generation and sound attenuation assembly, according to embodiments of the disclosure.
Figure 10B:
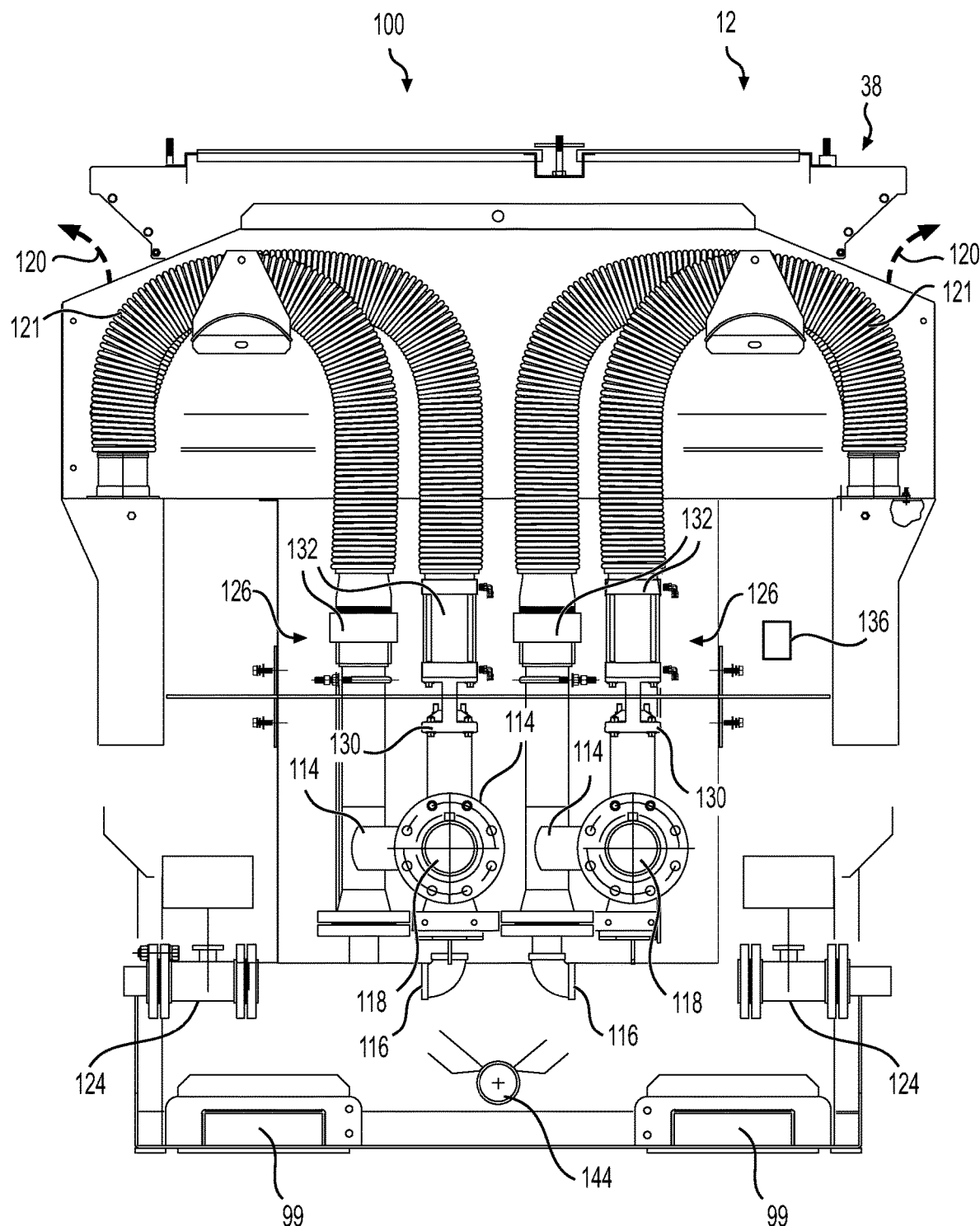
FIG. 10B is a schematic end view of the example vacuum generation and sound attenuation assembly of FIG. 10A, according to embodiments of the disclosure.
Figure 10C:
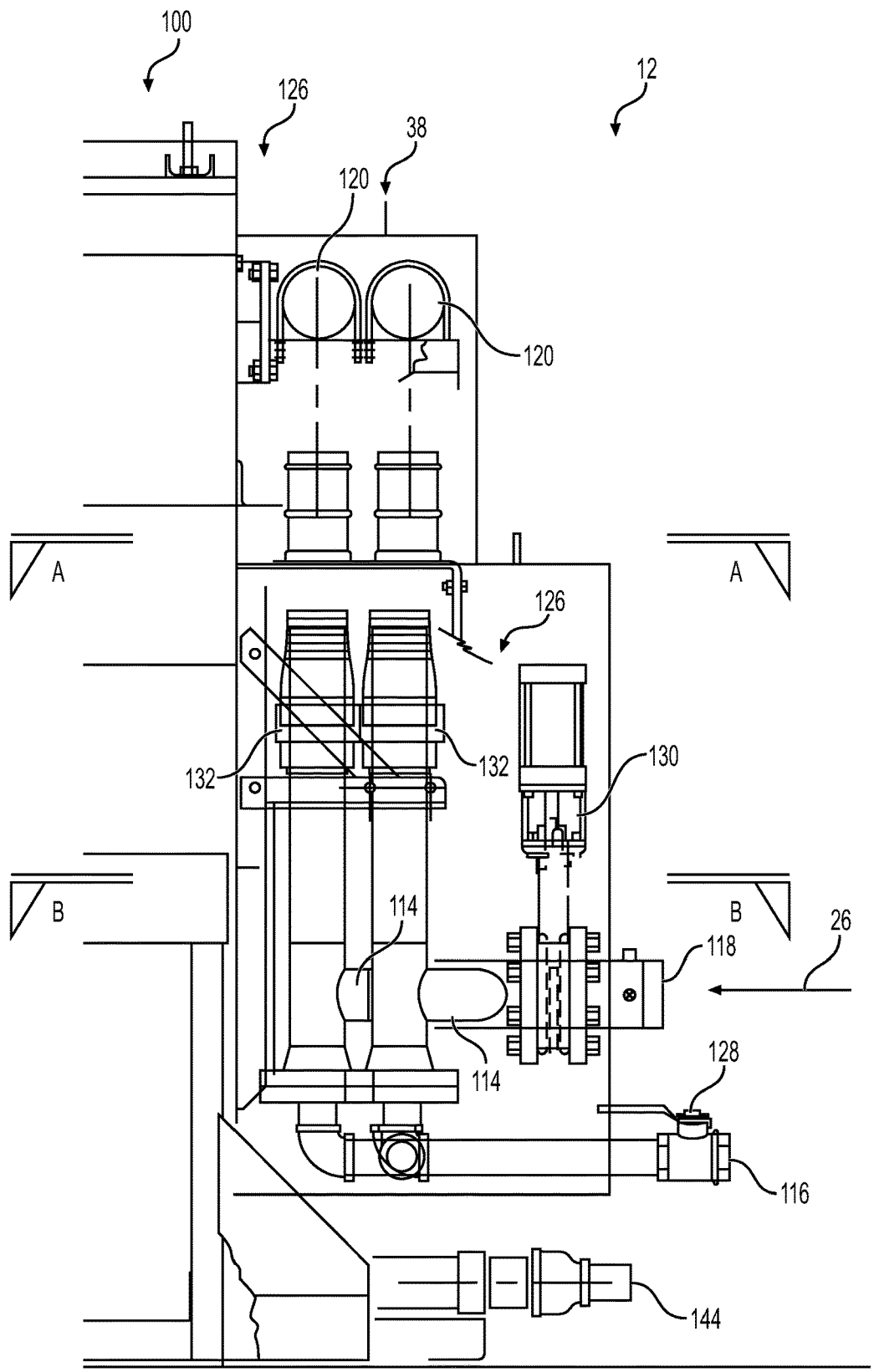
FIG. 10C is a schematic partial side view of the example vacuum generation and sound attenuation assembly shown in FIG. 10A, showing a side view of the example vacuum source end, according to embodiments of the disclosure.
Figure 10D:
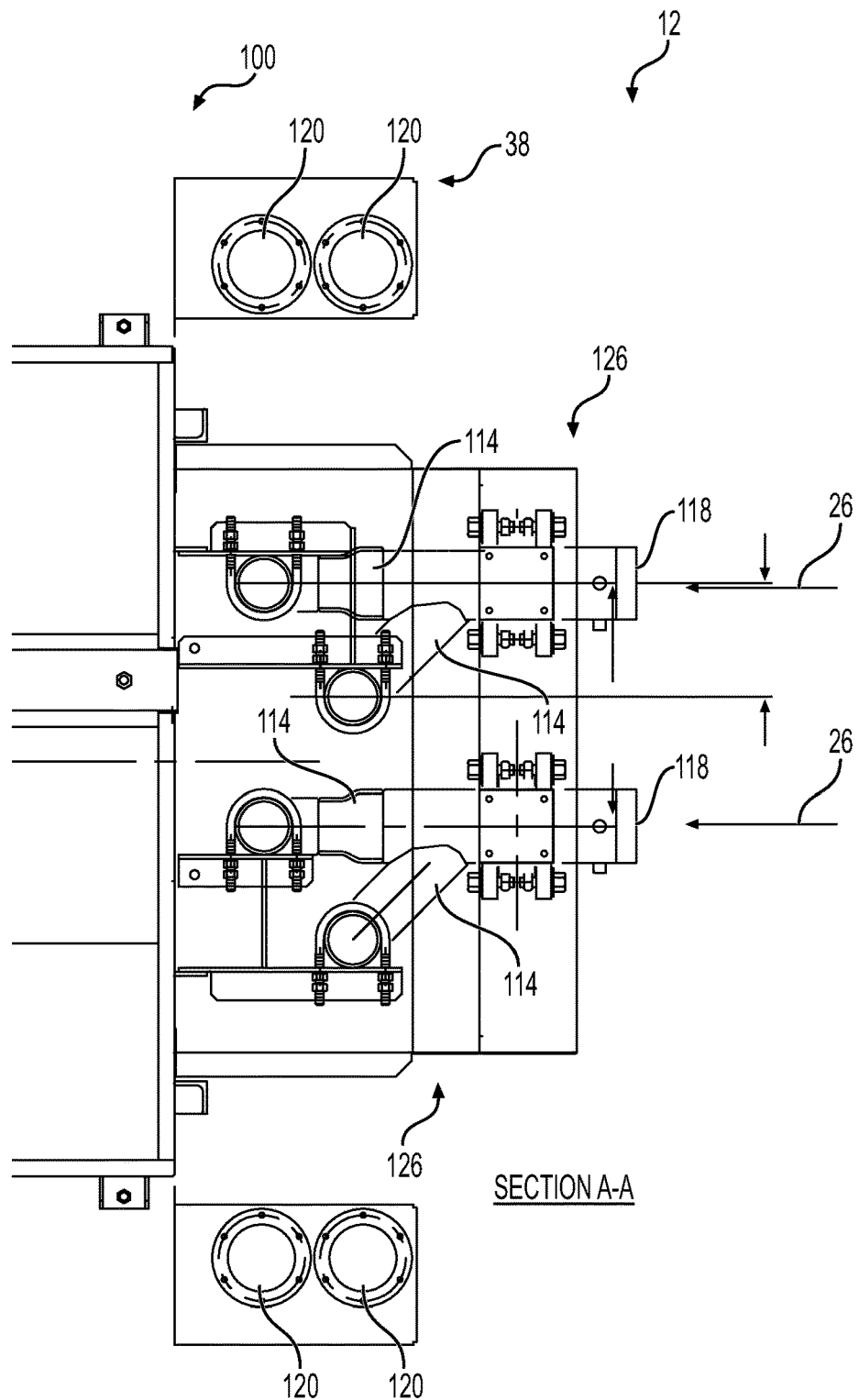
FIG. 10D is a schematic partial section view of the example vacuum generation and sound attenuation assembly shown in FIG. 10A taken along section A-A of FIG. 10C, showing a top view of the example vacuum source end, according to embodiments of the disclosure.
Figure 10E:
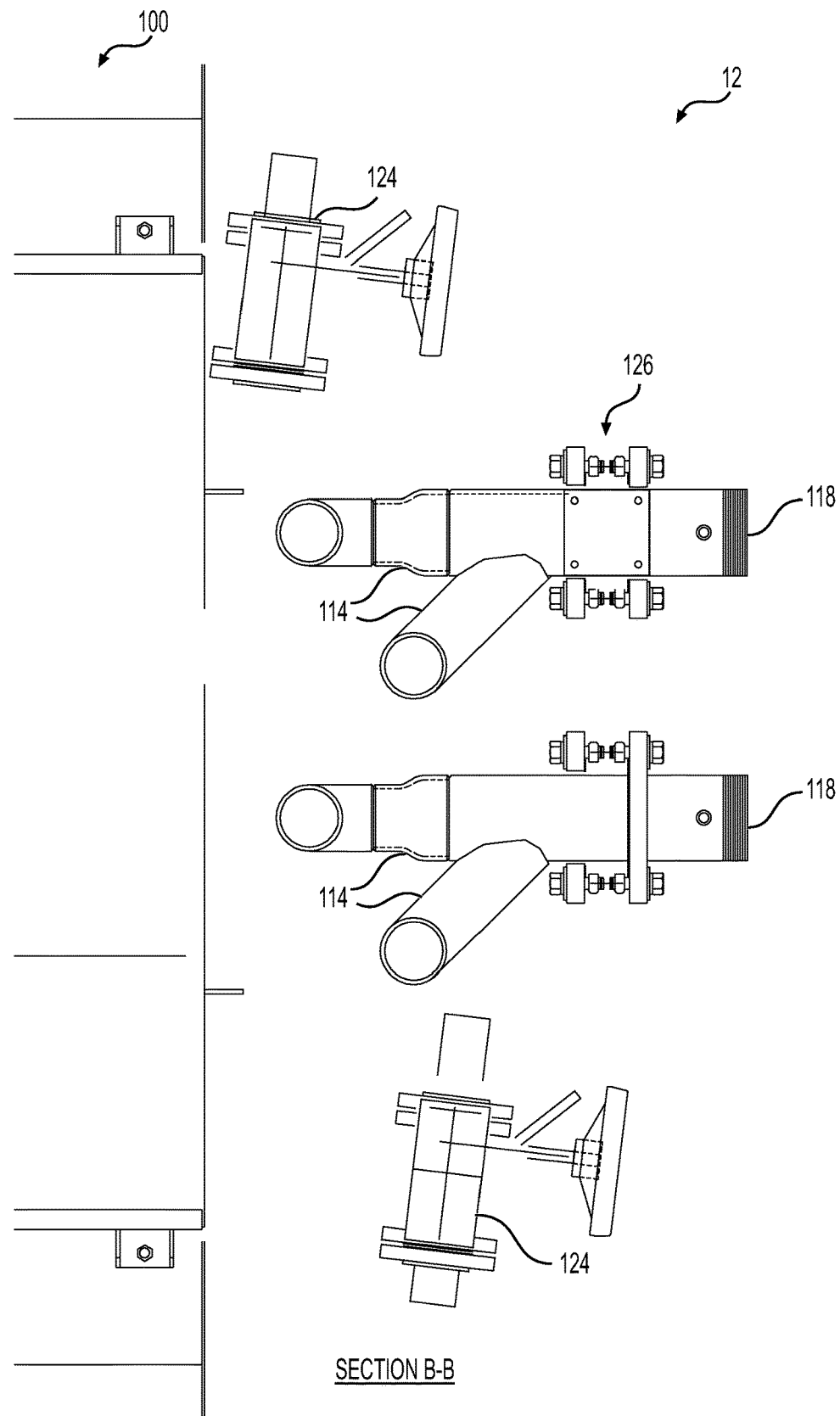
FIG. 10E is a schematic partial section view of the example vacuum generation and sound attenuation assembly shown in FIG. 10A taken along section B-B of FIG. 10C, showing a top view of the example vacuum source end, according to embodiments of the disclosure.
Figure 10F:
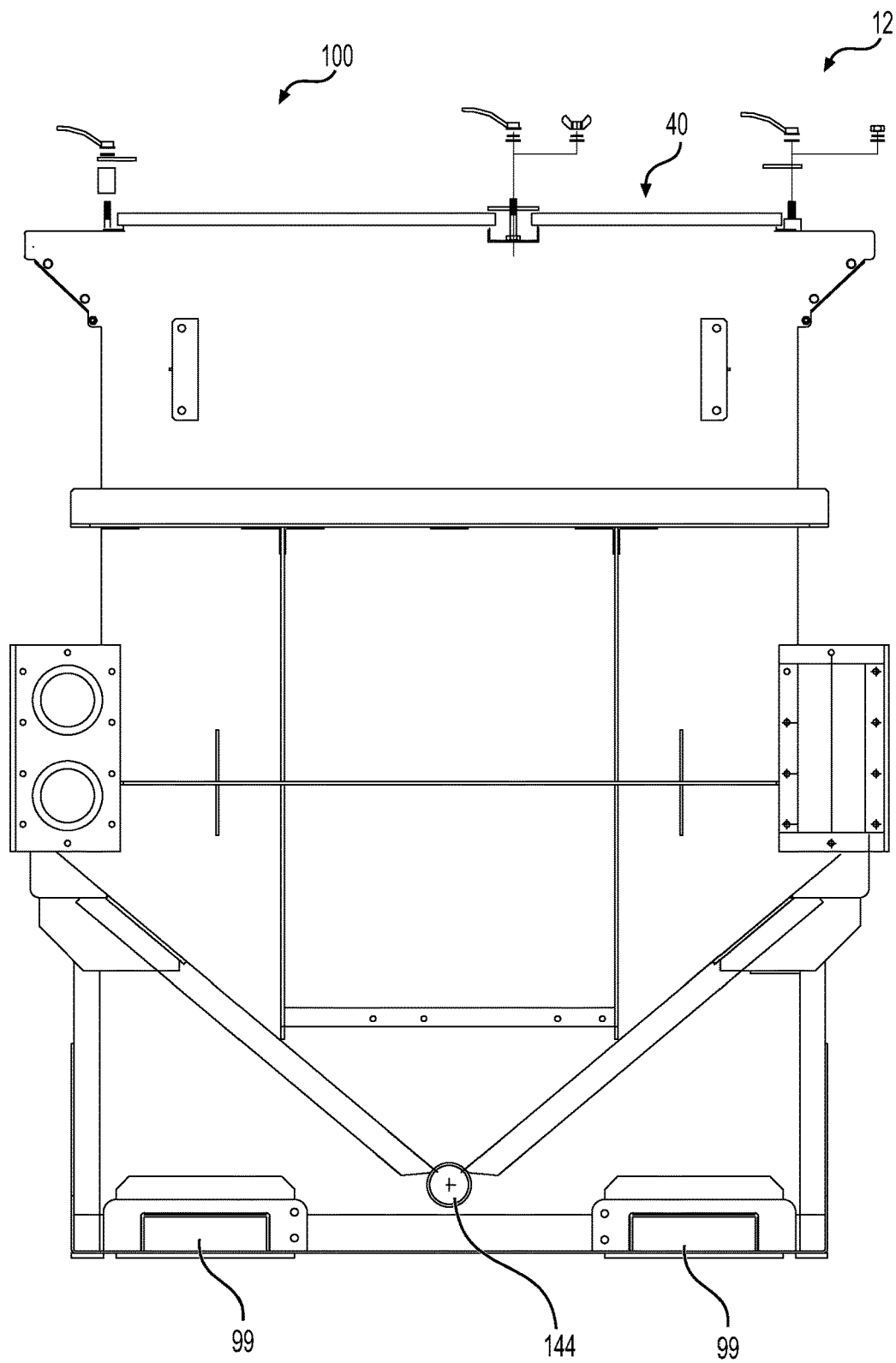
FIG. 10F is a schematic end view of the example vacuum generation and sound attenuation assembly shown in FIG. 10A, showing the example vacuum source end, according to embodiments of the disclosure.
Figure 10G:
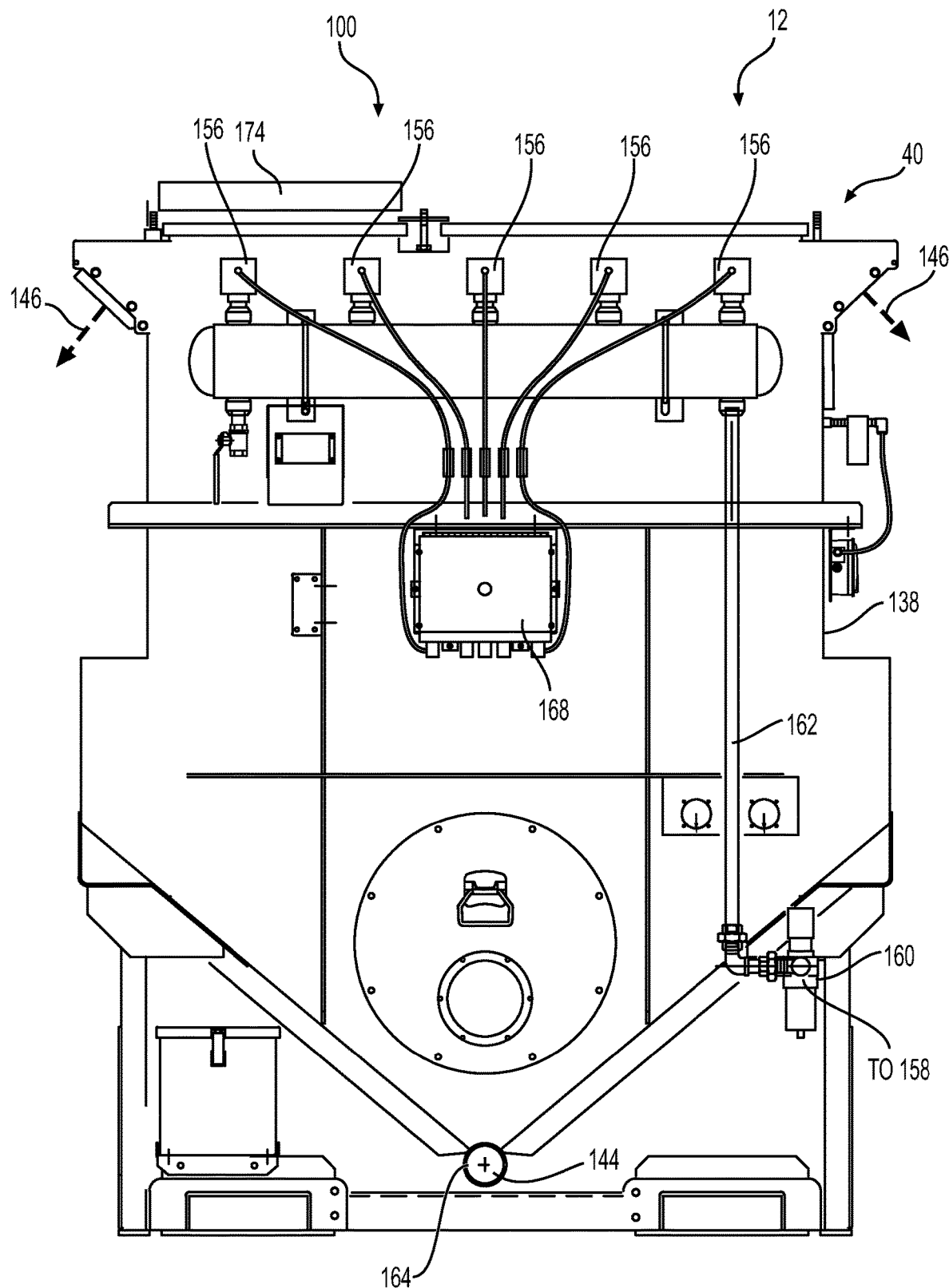
FIG. 10G is a schematic end view of the example vacuum generation and sound attenuation assembly shown in FIG. 10A, showing an example sound attenuation chamber end, according to embodiments of the disclosure.
Figure 10H:
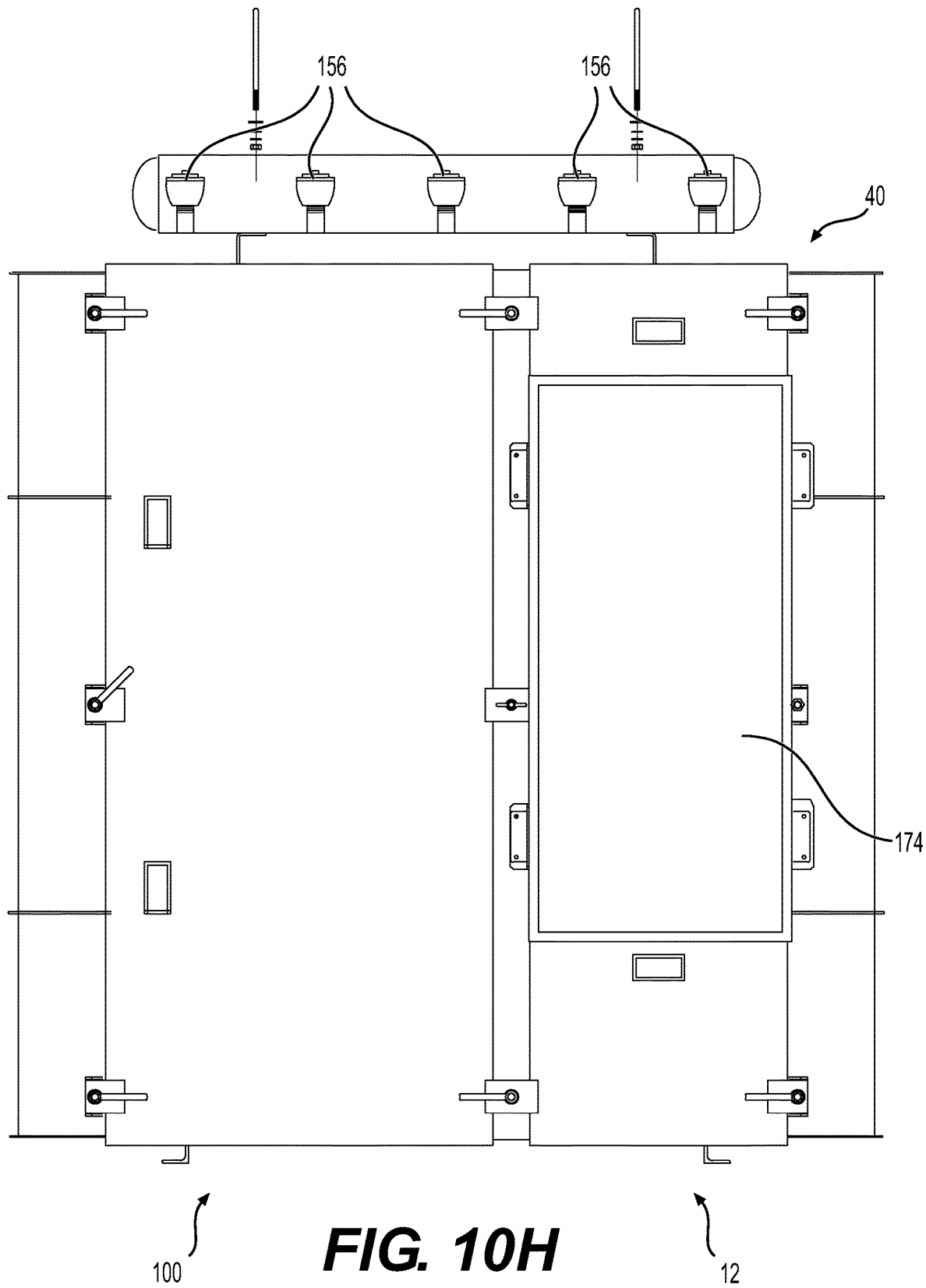
FIG. 10H is a schematic top view of the example vacuum generation and sound attenuation assembly shown in FIG. 10A, according to embodiments of the disclosure.
Figure 10J:
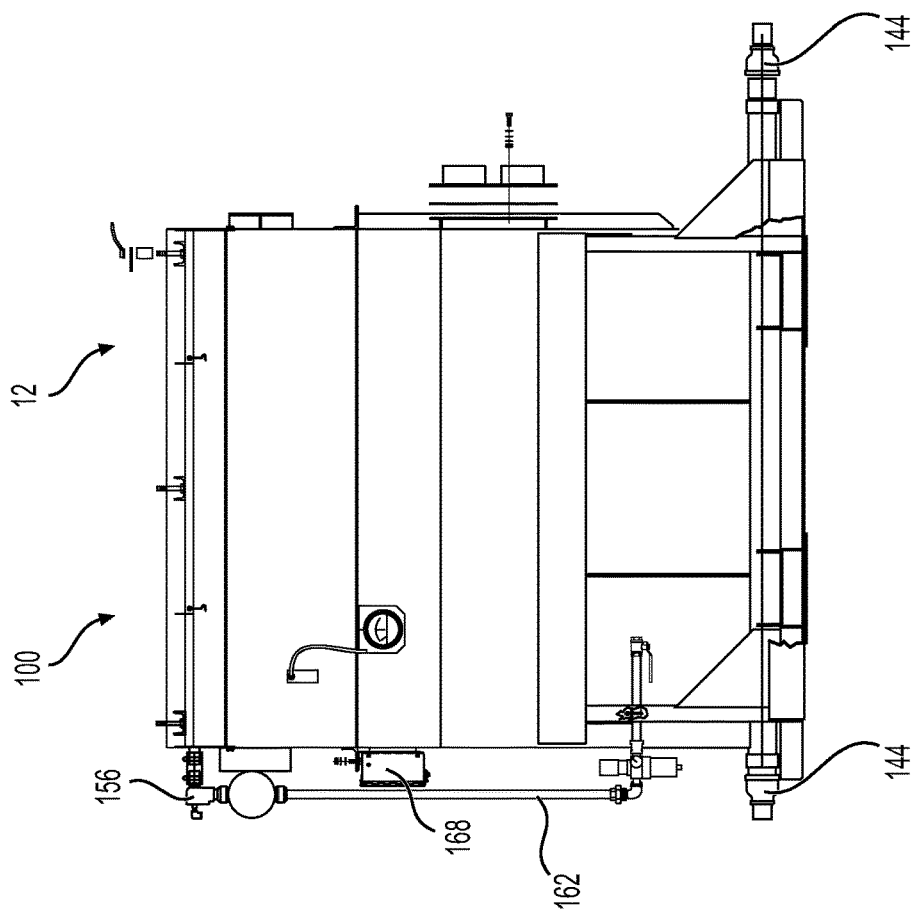
FIG. 10J is a schematic second side view, opposite the first side, of the example vacuum generation and sound attenuation assembly shown in FIG. 10A, according to embodiments of the disclosure.
Figure 10I:
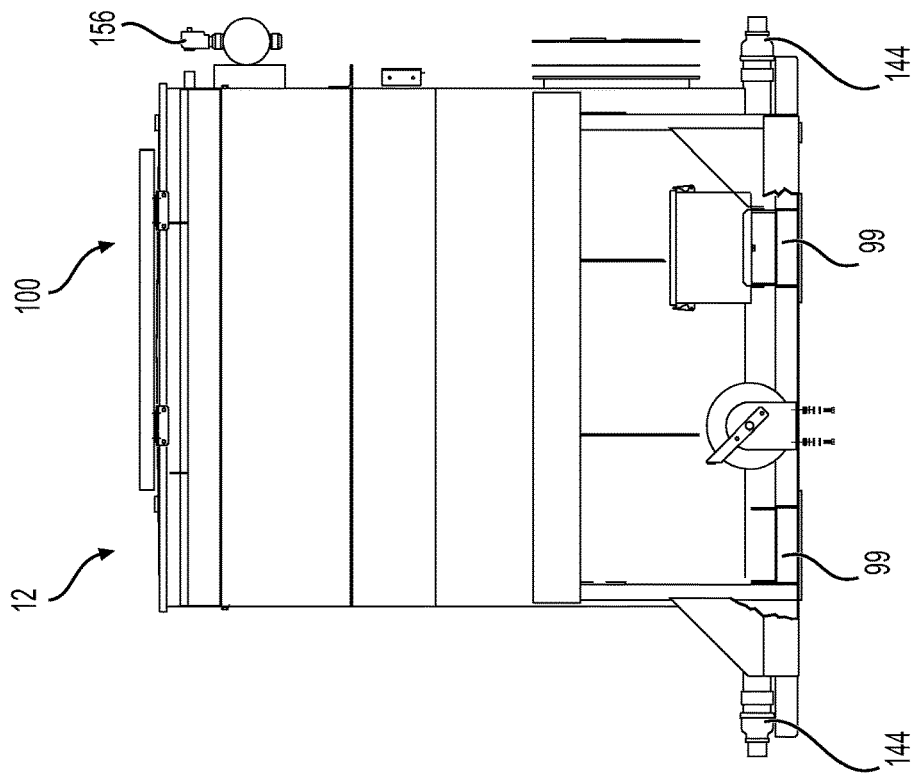
FIG. 10I is a schematic first side view of the example vacuum generation and sound attenuation assembly shown in FIG. 10A, according to embodiments of the disclosure.
Figure 11:
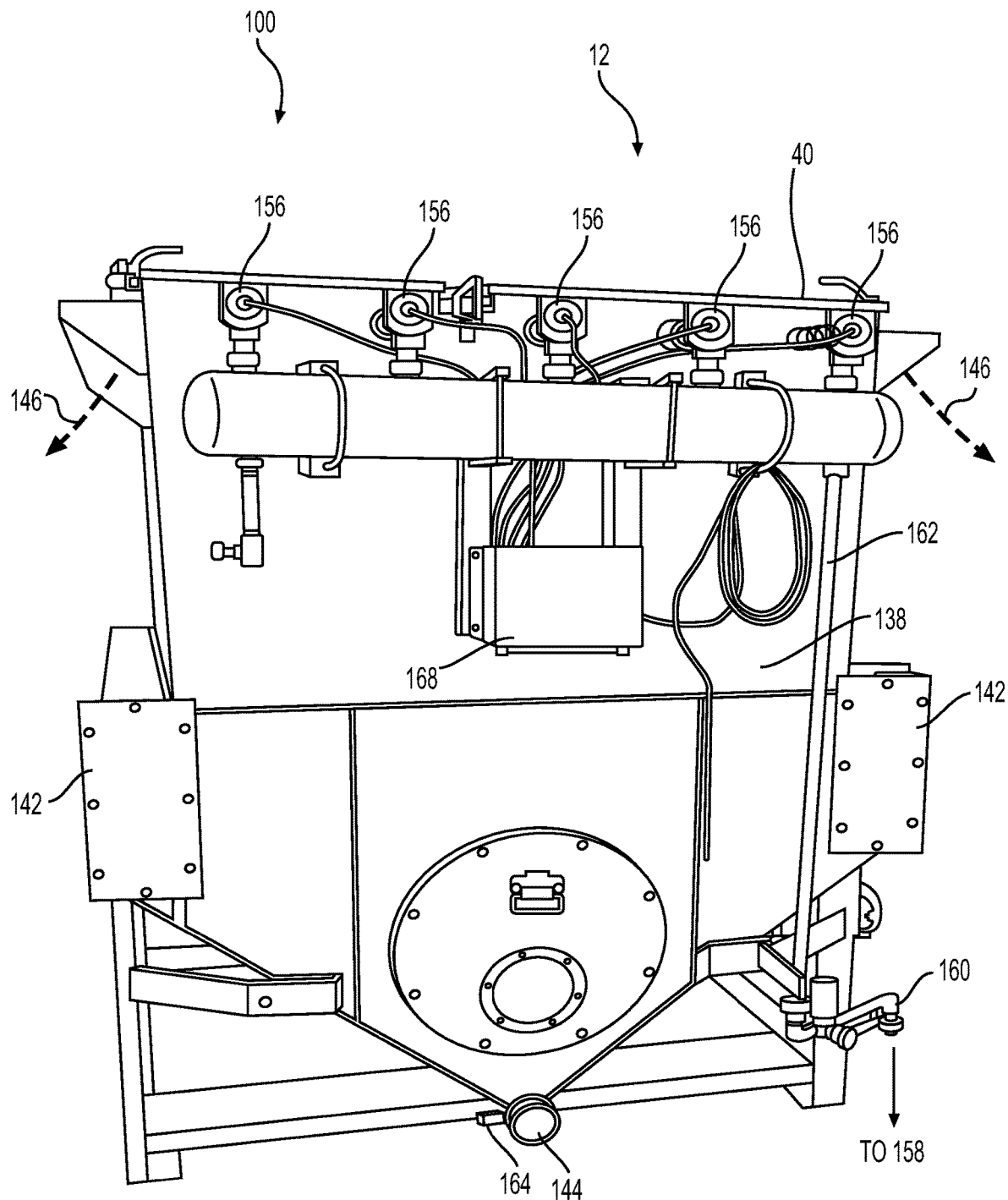
FIG. 11 is a schematic perspective view of an example vacuum generation and sound attenuation assembly, showing an example sound attenuation chamber end, according to embodiments of the disclosure.
Figure 12:
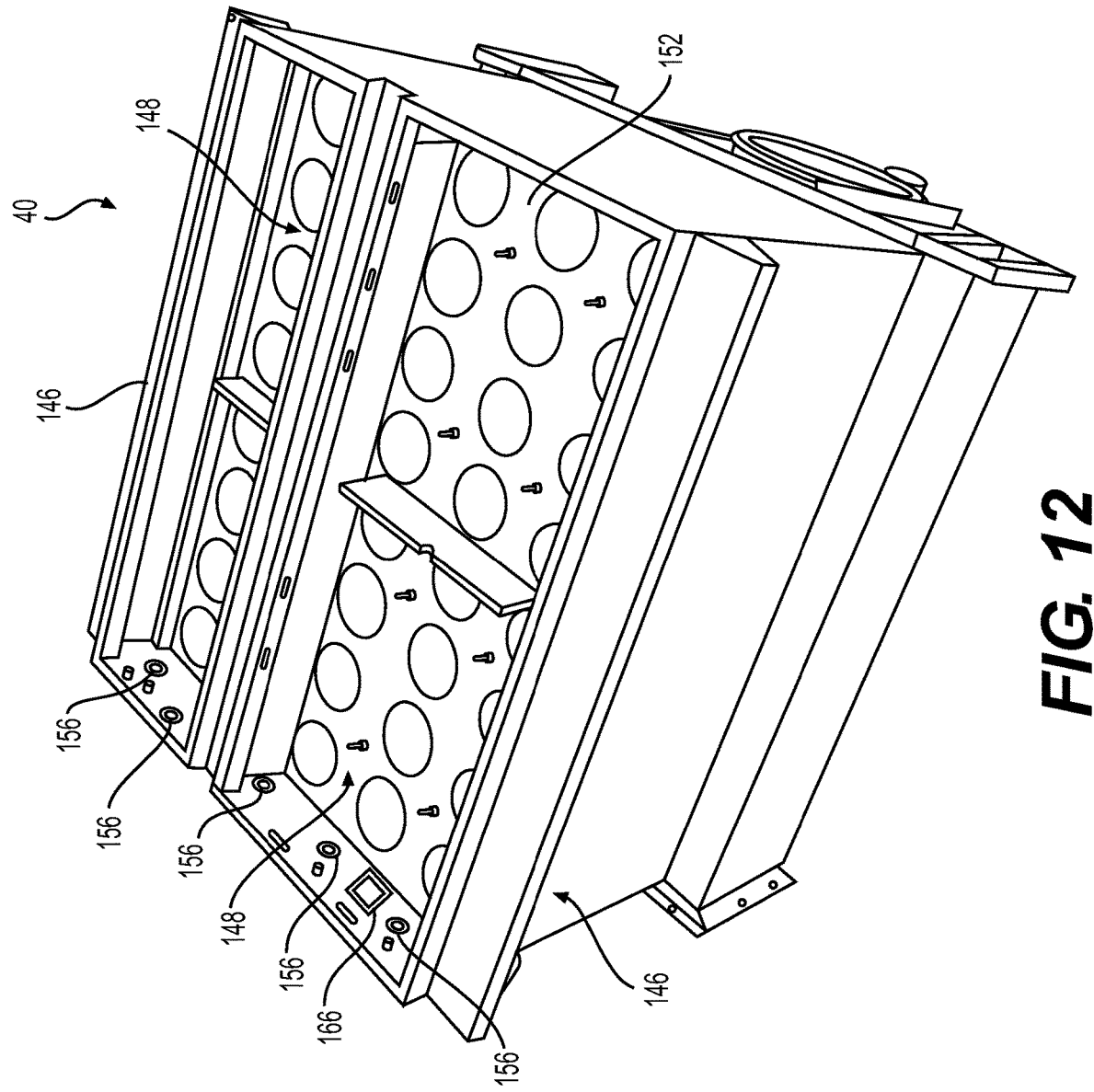
FIG. 12 is a schematic top perspective view of an example vacuum generation and sound attenuation assembly, with example filter media visible, according to embodiments of the disclosure.
Figure 13:
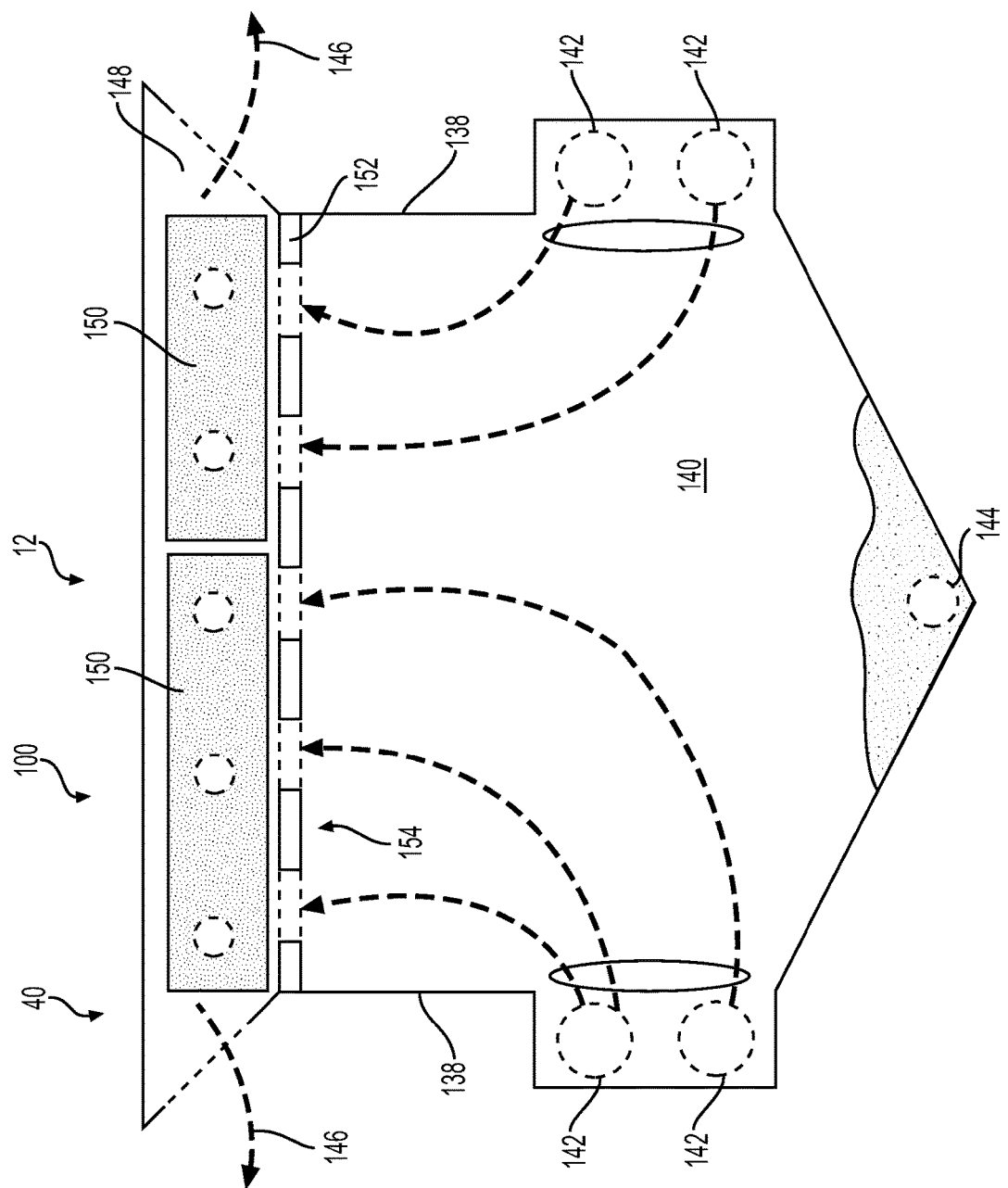
FIG. 13 is a simplified schematic end section view of an example sound attenuation chamber, according to embodiments of the disclosure.

In some embodiments, the vacuum source 38 and the sound attenuation chamber 40 may be configured such that the vacuum source 38 and the sound attenuation chamber 40 may be relatively easily separated from one another. This may facilitate maintenance and/or cleaning of the vacuum source 38 and/or the sound attenuation chamber 40. In some embodiments, this may facilitate conversion of the unified vacuum and attenuation module 100 for tailoring it to different uses. For example, this may facilitate attachment of different vacuum sources (e.g., having different features, sizes, and/or capacities) to the sound attenuation chamber 40, and/or attachment of different sound attenuation chambers (e.g., having different features, sizes, and/or capacities) to the vacuum source 38. FIGS. 10H, 10I, and 10J schematically depict an embodiment of sound attenuation chamber 40 that has been separated from a vacuum source and that is configured for attachment to a vacuum source.

Applicant has recognized that some industrial environments, such as the example environments including a reaction vessel 14 shown in FIG. 1 and FIG. 2, may include personnel tasked to operate the equipment in these environments. The presence of such personnel may restrict the acceptable level of sound that may be produced for undesired material removal purposes. The sound attenuation chamber 40, according to some embodiments, may be configured to attenuate sound generated by the vacuum source 38 and/or the fluid source 42 to sufficient levels, such that personnel may not need to wear protective hearing due to the sound generated by the material extraction assembly 10 and/or material conveyance assembly 11. In some embodiments, the sound attenuation chamber 40 may be configured to reduce the sound level generated by the material extraction assembly 10 and/or material conveyance assembly 11 by an amount ranging from ten percent to forty percent (e.g., by twenty-five decibels). For example, without the sound attenuation chamber 40, according to some embodiments, the assembly 10, 11 may generate approximately 115 decibels of sound. In contrast, when the sound attenuation chamber 40 is incorporated into the assembly 10, 11, the sound level may be reduced to about 89 decibels.

The sound attenuation chamber 40, in some embodiments, may both filter materials received from fluid flows before exhausting the received fluid flows and attenuate sound from received fluid flows before exhausting the received fluid flows into the ambient environment. In some embodiments, the sound may be attenuated to an extent that personnel in the area need not wear hearing protection, although personnel may need to wear hearing protection for other reasons.

FIGS. 10G, 10H, 11, 12, and 13 illustrate examples of embodiments of a sound attenuation chamber 40. The sound attenuation chamber 40, in some embodiments, may include an attenuation housing 138 at least partially defining a chamber interior volume 140 positioned to receive at least a portion of the vacuum flow 26 from the vacuum source 38 and attenuate sound generated by the vacuum source 38 during operation. The attenuation housing 138 may substantially seal the interior volume 140 from the ambient environment. The attenuation housing 138 may include one or more walls or other structural members to at least partially seal the interior volume 140.

In some embodiments, to filter undesired material 16 entering the sound attenuation chamber 40, the sound attenuation chamber 40 may include one or more inlet ports 142, one or more discharge ports 144, and/or one or more exhaust ports 146. At least some of the ports may be positioned on the attenuation housing 138 to provide access to the interior volume 140 from outside the attenuation housing 138. For example, the respective ports may include holes, apertures and/or other structures through one or more walls of the attenuation housing 138 that enable access to interior volume 140.

The inlet ports 142 may be pneumatically connected to the vacuum source 38. When pneumatically connected to the vacuum source 38, the inlet ports 142 may receive vacuum-induced flow 26 from the vacuum source 38. The minor portion of the undesired material 16 may be entrained in vacuum-induced flow 26, thereby presenting a potential contamination hazard if exhausted into the ambient environment without further filtering and/or treatment.

The exhaust ports 146, in some embodiments, may be pneumatically connected to the ambient environment. The fluid flow path through the material extraction assembly 10 may end at the exhaust ports 146. Consequently, in some embodiments, vacuum-induced flow 26 drawn from the source of the fluid (e.g., the reaction vessel 14, FIG. 1) and through the flow path may exit the flow path through the exhaust ports 146. The interior volume 140 may be in the flow path between the inlet ports 142 and the exhaust ports 146, such that vacuum-induced flow 26 flows through the interior volume 140 prior to being exhausted into the ambient environment.

In some embodiments, to partially attenuate sound, the exhaust ports 146 may be of substantially larger size than the inlet ports 142. The size difference between these ports may reduce or eliminate backpressure on the vacuum-induced flow 26. The flow path may expand greatly in cross-sectional area as the vacuum-induced flow 26 transitions from the inlet ports 142 into the interior volume 140. As a result, any sound generated by the vacuum-induced flow 26 may generally occur at an interface between the inlet ports 142 and the interior volume 140. In some embodiments, accordingly, the sound attenuation chamber 40 may, in part, dissipate the sound generated by the vacuum-induced flow 26 by generating it within the sound attenuation chamber 400, for example, such that the sound will dissipate prior to exiting the sound attenuation chamber 40.

In some embodiments, to filter undesired material 16 prior to exhaustion to the ambient environment, the interior volume 140 may include a filter media region 148. The filter media region 148 may include a portion of the interior volume 140 in which filter media 150 may be positioned. The filter media region 148 may be positioned, for example, such that the vacuum-induced flow 26 must substantially flow through the filter media region 148 and filter media 150 prior to being exhausted through the exhaust ports 146 to the ambient environment. In some embodiments, the interior volume 140 may include a filter media support plate 152. The filter media support plate 152 may be configured to support the filter media 150 within the filter media region 148. In some embodiments, the filter media support plate 152 may generally divide the interior volume 140 into two or more sections and may include holes through which the vacuum-induced flow 26 may travel between the sections. One or both sides of the filter media support plate 152 may include one or more baffles 154 configured to attenuate sound. The one or more baffles 154 may attenuate sound generated by the vacuum-induced flow 26, for example, prior to exhaustion out of the sound attenuation chamber 40.

In some embodiments, to filter undesired material 16 prior to exhaustion to the ambient environment, the filter media 150 may be configured to filter at least a portion of the minor portion of the undesired material 16 from the vacuum-induced flow 26. The filter media 150 may include any type of filter media for removing material from fluid flows. The filter media 150 also may be sound absorptive and, in part, help to dissipate the sound generated by the vacuum-induced flow 26. The filter media 150 may, in some examples, exhibit a relatively limited filtration capacity. As filter media 150 filters the undesired material 16, its permeability to fluid flow may decrease.

To manage the filtration capacity of the filter media 150, in some embodiments, the sound attenuation chamber 40 may include one or more jet generators 156 positioned relative to the sound attenuation chamber 40 to generate jets of fluid flow directed toward the filter media 150 to at least partially maintain the filtration capacity of the filter media 150. For example, the jet generators 156 may be positioned to generate jets of fluid flow directed toward the filter media 150 to at least partially refresh or restore the filtration capacity of filter media 150. For example, the jet generators 156 may be positioned outside the attenuation housing 138 and oriented facing into the filter media region 148.

When the jet generators 156 generate the jets, the jets may transfer undesired material 16 filtered by the filter media 150 out of the filter media 150 and into the interior volume 140. This may, in some embodiments, at least partially restore the permeability and/or the filtration capacity of the filter media 150. For example, the jets may cause undesired material 16 trapped in the filter media 150 to drop out of the filter media region 148, for example, through holes in the filter media support plate 152 and into interior volume 140.

To drive the jet generators 156, in some embodiments, the sound attenuation chamber 40 may include a jet fluid supply 158. The jet fluid supply 158 may be configured to store compressed fluid. In some embodiments, the jet fluid supply 158 may include a storage tank in which the compressed fluid is stored. The compressed fluid may be a gas, such as, for example, compressed air. The jet fluid supply 158 may be pneumatically coupled to the jet generators 156. The jet generators 156 may include one or more ports and one or more electrically driven actuators configured to control the rate at which the compressed fluid from the jet fluid supply 158 exits the jet generators 156. Thus, the jet generators 156 may modulate one or more of a strength of the jets of fluid flow, timing of the jets of fluid flow, or one or more other characteristics associated with the jets of fluid flow.

To fill the jet fluid supply 158, in some embodiments, the sound attenuation chamber 40 may include a fluid supply port 160. The fluid supply port 160 may be pneumatically connected to the jet fluid supply 158 to refill the jet fluid supply 158 with compressed fluid, for example, when another source of compressed fluid (e.g., the fluid source 42) is pneumatically coupled to the fluid supply port 160.

In some embodiments, due to a limited size of the interior volume 140, only a finite quantity of undesired material 16 may be stored in the interior volume 140. Over time the interior volume 140 may become filled with undesired material 16 as undesired material 16 is removed from the source of the material (e.g., the reaction vessel 14). Once the interior volume 140 is filled, the sound attenuation chamber 40 may become inoperable, for example, undesired material 16 may block fluid flow through the interior volume 140.

To manage the fill level 79 of the interior volume 140, in some embodiments, the sound attenuation chamber 40 may include one or more discharge ports 144. The discharge ports 144 may facilitate removal of undesired material 16 from the interior volume 140. In some embodiments, undesired material 16 may be removed from the interior volume 140 through the discharge port(s) 144 while the vacuum-induced flow 26 flows through the interior volume 140.

To remove undesired material 16 from the interior volume 140, in some embodiments, the discharge port 144 may be pneumatically connected to a material collector 36 (e.g., a vacuum box 48). For example, the discharge port 144 may be pneumatically connected to a material collector 36 via a conduit 162 (e.g., such as a restrictive hose). When a high-pressure vacuum is applied to the material collector 36, undesired material 16 in the interior volume 140 may be drawn out of the interior volume 140, through the conduit 162, and into the material collector 36. Thus, both the major portion and the minor portion of the undesired material 16 extracted from the source of the material (e.g., the reaction vessel 14) may be transferred to a material collector 36. The discharge port 144 may be pneumatically connected to other components for undesired material discharge purposes without departing from embodiments disclosed herein.

To control when and/or the rate of removal of the undesired material 16 from the interior volume 140, in some embodiments, the sound attenuation chamber 40 may include a discharge port control valve 164. The discharge port control valve 164 may be positioned to control the rate of fluid flow through the discharge port 144. For example, the discharge port control valve 164 may include an electrically driven actuator usable to control the rate of fluid flow through discharge port 144. In some embodiments, the discharge port control valve 164 may control the rate of fluid flow through discharge port 144 to selectively remove undesired material 16 from the interior volume 140.

To determine when and/or at which rate to remove undesired material 16 from the interior volume 140, in some embodiments, the sound attenuation chamber 40 may include one or more sensors 166. The sensors 166 may be positioned to monitor the filtration capacity of the filter media 150, the fill level 79 of the interior volume 140, and/or the flow rate of undesired material 16 out of the discharge port 144. The sensors 166 may be configured to generate signals indicative of any physical property of the sound attenuation chamber 40 and use the signals to determine these quantities. For example, the sensors 166 may include photo-sensors that measure the filtration capacity of the filter media 150 based on a quantity of light transmitted by the filter media 150. In some embodiments, the sensors 166 may include a transducer configured to measure the mass of undesired material 16 to determine the fill level 79 of the interior volume 140. The sensors 166 may include other components for measuring the same or different types of physical properties without departing from embodiments disclosed herein.

Figure 14:
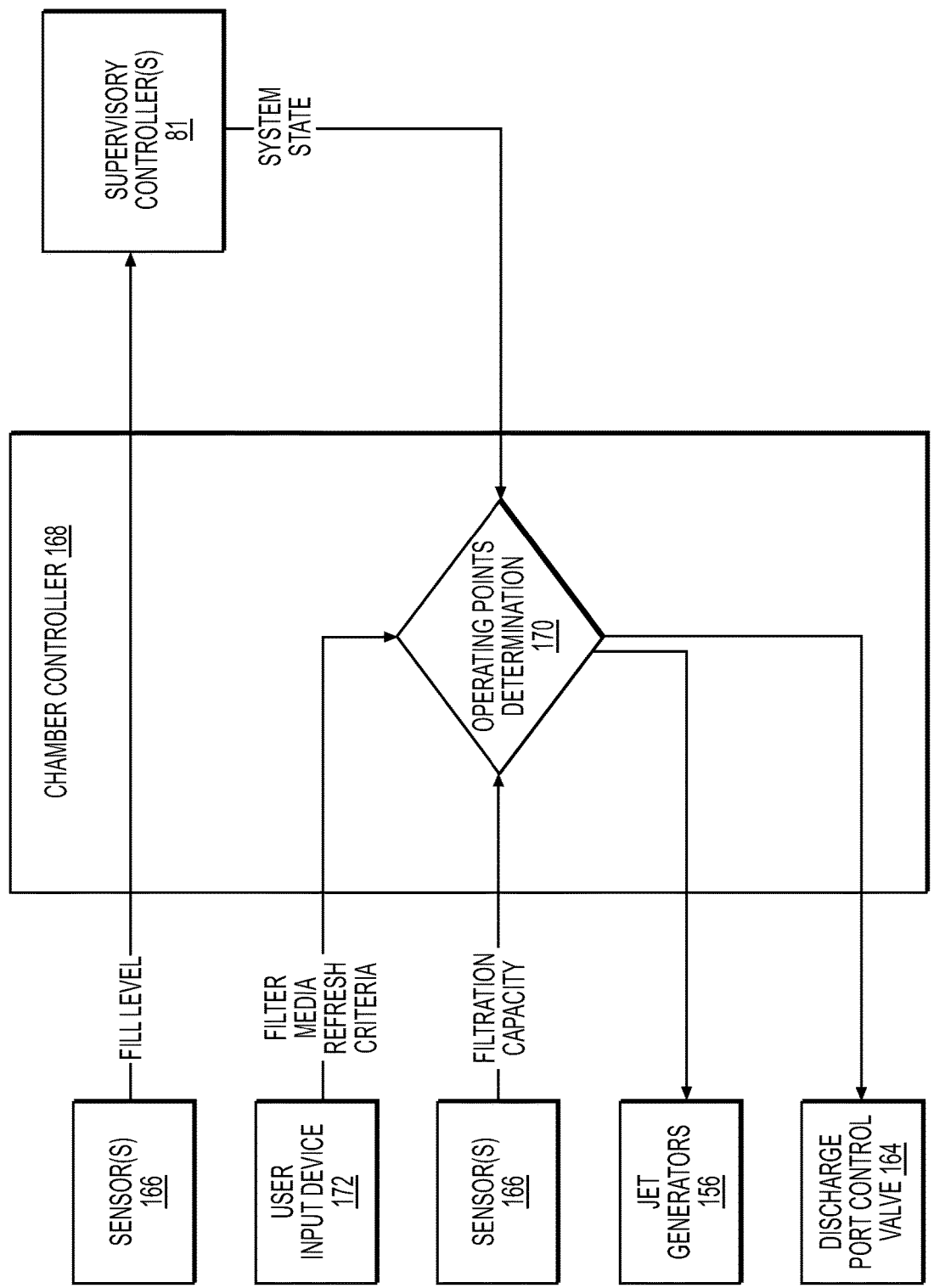
FIG. 14 is a block diagram of an example architecture for operating an example sound attenuation chamber of an example material extraction assembly or material loading assembly, according to embodiments of the disclosure.

FIG. 14 is a block diagram of an example architecture for operating an example sound attenuation chamber 40 of an example material extraction assembly 10 or an example material conveyance assembly 11, according to embodiments of the disclosure. To coordinate operation of the sound attenuation chamber 40, in some embodiments, the sound attenuation chamber 40 may include a chamber controller 168 in communication with one or more of a discharge port control valve actuator, one or more jet generators 156, and the one or more sensors 166. For example, the chamber controller 168 may be operably connected to the discharge port control valve 164, the jet generators 156, and the sensors 166. The chamber controller 168 may obtain information from sensors 166 and selectively drive the discharge port control valve 164 and/or the jet generators 156 based on the information to ensure that (i) the filter media 150 is capable of continuing to filter fluid flows through the interior volume 140 and (ii) the interior volume 140 is not overfilled with undesired material 16.

In some embodiments, the chamber controller 168 may include computing hardware (e.g., processors, memory, storage devices, communication devices, other types of hardware devices including circuitry, etc.), and/or computing instructions (e.g., computer code) that when executed by the computing hardware cause chamber controller 168 to provide its functionality. The chamber controller 168 may include a lookup table or other data structure usable to make an operating points determination 170 for the discharge port control valve 164 and/or the jet generators 156 based at least in part on the fill level 79 and filtration capacity of the filter media 150. Once the operating points are determined, the chamber controller 168 may be configured to modify operation of the discharge port control valve 164 and/or the jet generators 156 based at least in part on the operating points. For example, the chamber controller 168 may be configured to modify the quantities of power used to drive the discharge port control valve 164 and/or the jet generators 156 to set the quantity of fluid flows through each of the discharge port control valves 164 and/or the jet generators 156. As a result, in some embodiments, the sound attenuation chamber 40 may be more likely to be able to substantially continuously operate.

In some embodiments, to enable a person to control operation of the sound attenuation chamber 40, the sound attenuation chamber 40 may include a user input device 172. The user input device 172 may be in communication with to the chamber controller 168. The user input may be communicated to the chamber controller 168 via the user input device 172. The user input device 172 may include, for example, one or more buttons, touch sensitive displays, levers, knobs, and/or other devices (e.g., control panels, tablet computers, and/or smart phones) that are operable by a person to provide the chamber controller 168 with information for operating or controlling the sound attenuation chamber 40.

The chamber controller 168 may be configured to receive information from a person via the user input device 172 regarding how frequently to refresh the filtration capacity of the filter media 150 and/or information regarding how frequently to discharge undesired material 16 from the interior volume 140. The chamber controller 168 may use such information when determining the operating points for the discharge port control valve 164 and/or the jet generators 156. For example, a person may provide operational preferences or other information using the user input device 172 to configure operation of the sound attenuation chamber 40.

In some embodiments, the chamber controller 168 may be powered using electricity. The sound attenuation chamber 40 may include one or more solar panels 174 that provide electrical power to the chamber controller 168. The chamber controller 168 may include one or more batteries in which power from the one or more solar panels 174 may be stored prior to use by the chamber controller 168 (and/or other controllers of the material extraction assembly 10).

Applicant has recognized that some environments, such as industrial environments similar to the environment illustrated in FIG. 1 and FIG. 2, may include volatile hydrocarbon fluids (and/or other types of volatile materials) or other types of fluids susceptible to combustion. Some embodiments of the material extraction assembly 10 or material conveyance assembly 11, or one or more components thereof, may not be powered by combustible power sources. Rather, the material collector 36, the vacuum source 38, the sound attenuation chamber 40, and/or the fluid source 42 may be powered with electricity and/or compressed fluid. In some such embodiments, the material extraction assembly 10 or material conveyance assembly 11 may be capable of removing undesired materials from an environment, such as an industrial environment, without the risk of igniting combustible materials in the environment (or with a reduced risk).

In some embodiments, various components may utilize fluid flows to provide their functionalities. To operate these components, the material extraction assembly 10 or material conveyance assembly 11 may include the fluid source 42, which may be a mobile fluid supply. The fluid source 42 may be configured to supply pressurized or compressed fluid to the vacuum source 38 and/or the sound attenuation chamber 40. The fluid supplied may be may be pneumatically connected to the vacuum source 38 (e.g., to generate vacuums) and/or the sound attenuation chamber 40, for example, to refresh the filtration capacity of the filter media 150.

To supply pressurized or compressed fluid, the fluid source 42 may compress fluid and store the compressed or pressurized fluid for future use. In some embodiments, the fluid source 42 may include an air compressor, and the air compressor may be configured to compress air from the ambient environment to generate the compressed or pressurized fluid. The fluid source 42 may compress other fluids without departing from embodiments disclosed herein.

To limit or prevent combustion risk, in some embodiments, the fluid source 42 may compress fluid using electricity. The fluid source 42 may obtain the electricity from any electricity source. In some embodiments, the fluid source 42 may include one or more batteries for providing the electricity to the fluid source 42. In some embodiments, the fluid source 42 may include a power cable and/or other componentry for obtaining electricity from another source (e.g., from a utility company or other large scale supplier, a solar setup, and/or or other non-combustion-based electricity producers, etc.).

Applicant has recognized that environments, such as industrial environments, such as the site illustrated in FIG. 1 and FIG. 2, may require a high uptime by their operators. As a result, the time required to setup the material extraction assembly 10 or material conveyance assembly 11 may be a significant cost to the operators of the site. In some embodiments, the material extraction assembly 10 or material conveyance assembly 11 disclosed herein may provide for the efficient setup, operation, and removal of the assembly in many environments, including industrial environments. In some embodiments, any of the components of the material extraction assembly 10 or material conveyance assembly 11 may be placed or mounted on chassis including trailers or other types of high mobility structures to enable them to be efficiently placed and oriented with respect to, for example, a reaction vessel.

Applicant has recognized that environments, such the example environment shown in FIG. 1 and FIG. 2, may have different requirements for material removal. For example, different industrial environments may have different quantities of undesired material and/or undesired material at different industrial environments may have different physical properties. The material extraction assembly 10 or material conveyance assembly 11 in accordance with embodiments disclosed herein may provide for rapid deployment of a material extraction assembly 10 or material conveyance assembly 11 that is customized or tailored to meet the requirements of each industrial environment. As a result, different numbers of components may be deployed and connected (e.g., pneumatically connected) in parallel and/or in series to provide desired levels of vacuum strength and/or desired storage capacities for undesired material.

For example, as shown in FIG. 15, in some embodiments, a material extraction assembly 10 may include multiple material collectors 36 (e.g., vacuum boxes 48), vacuum sources 38, sound attenuation chambers 40, and/or fluid sources 42. For example, each material collector 36 may be pneumatically connected to a reaction vessel 14 via a divider 176 and manifold 178 through conduits 180. The divider 176 may be a pneumatic splitter that establishes two separate fluid flow paths through the respective material collectors 36.

By pneumatically connecting both material collectors 36, for example, to the source of the material (e.g., the reaction vessel 14) in parallel, undesired material 16 from the source of the material may be transferred to both material collectors 36 concurrently or substantially simultaneously. As a result, the material extraction assembly 10 may be capable of removing twice as much undesired material 16 before the material collectors 36 are filled. The material removal capacity of a material extraction assembly 10 in accordance with some embodiments may be scaled up (or down) as desired in this example manner to meet environment-based requirements. In such embodiments, any of the components may include any number of ports to facilitate the formation of multiple fluid flow paths. For example, as seen in FIG. 15, the material collectors 36 may include four ports (e.g., two inlet ports and two vacuum ports). The components shown in FIG. 15 may include different numbers of ports without departing from embodiments disclosed herein.

Each material collector 36 may be pneumatically connected to two vacuum sources 38 through hoses 182. By pneumatically connecting two vacuum sources 38 to a single material collector 36, the strength of the high-pressure vacuum in the material collector 36 may be increased. Consequently, a higher degree of suction may be applied to undesired material 16 in reaction vessel 14, thereby increasing the transfer rate of undesired material 16 from reaction vessel 14 and allowing more difficult material to be transferred out of reaction vessel 14. The suction strength of the material extraction assembly 10 in accordance with embodiments may be scaled up (or down) as desired in this example manner to meet environment requirements.

In some embodiments, each of the vacuum sources 38 pneumatically connected to a material collector 36 may be driven with fluid flow from a corresponding fluid source 42 (e.g., a mobile fluid supply). For example, the fluid sources 42 (e.g., gas supplies) may be pneumatically connected to corresponding vacuum sources 38 through conduits 184.

In some embodiments, each of the vacuum sources 38 pneumatically connected to a material collector 36 and/or suction manifold 44 may also exhaust through a corresponding sound attenuation chamber 40. For example, the vacuum sources 38 that exhaust through a corresponding sound attenuation chamber 40 may be positioned on a trailer together to form a mobile unit. In this manner, the material extraction assembly 10 or material conveyance assembly 11 may be quickly and efficiently deployed and scaled up (or down) as desirable to meet environment requirements.

To facilitate efficient reconfiguration of the material extraction assembly 10 or material conveyance assembly 11, any of the pneumatic connections may be implemented using quick connect-disconnect connections and/or pneumatic isolators. The quick connect-disconnect connections may allow for any of the pneumatic connections to be quickly made and removed. The pneumatic isolators may automatically seal the material removal system when a pneumatic connection is disconnected. For example, pneumatic isolators may be positioned between the divider 176 and the material collectors 36. When one of conduits 180 is disconnected from the divider 176, the pneumatic isolator may automatically seal the opening in the divider 176, to which the disconnected conduit was connected. In this manner, the disconnection of a conduit may not impact the other fluid flow paths. For example, the fluid flow path between the divider 176 and the remaining connected material collector 36 (e.g., with the other conduit) may not be impacted. Quick connect-disconnect connections and/or pneumatic isolators may be used to facilitate the pneumatic reconfiguration of any of the fluidic topologies illustrated throughout this application.

Applicant has recognized that environments similar to the example illustrated in FIG. 1 may need to be filled with desired material after the undesired material 16 has been removed. For example, the reaction vessel 14 may need to be refilled with catalyst, packing materials such as pall rings, or other materials after undesired material 16 is removed. Assemblies, apparatuses, systems, and methods similar to the example illustrated in FIG. 2 and accordance with embodiments disclosed herein may provide for rapid deployment of desired materials in certain environments.

Figure 16:
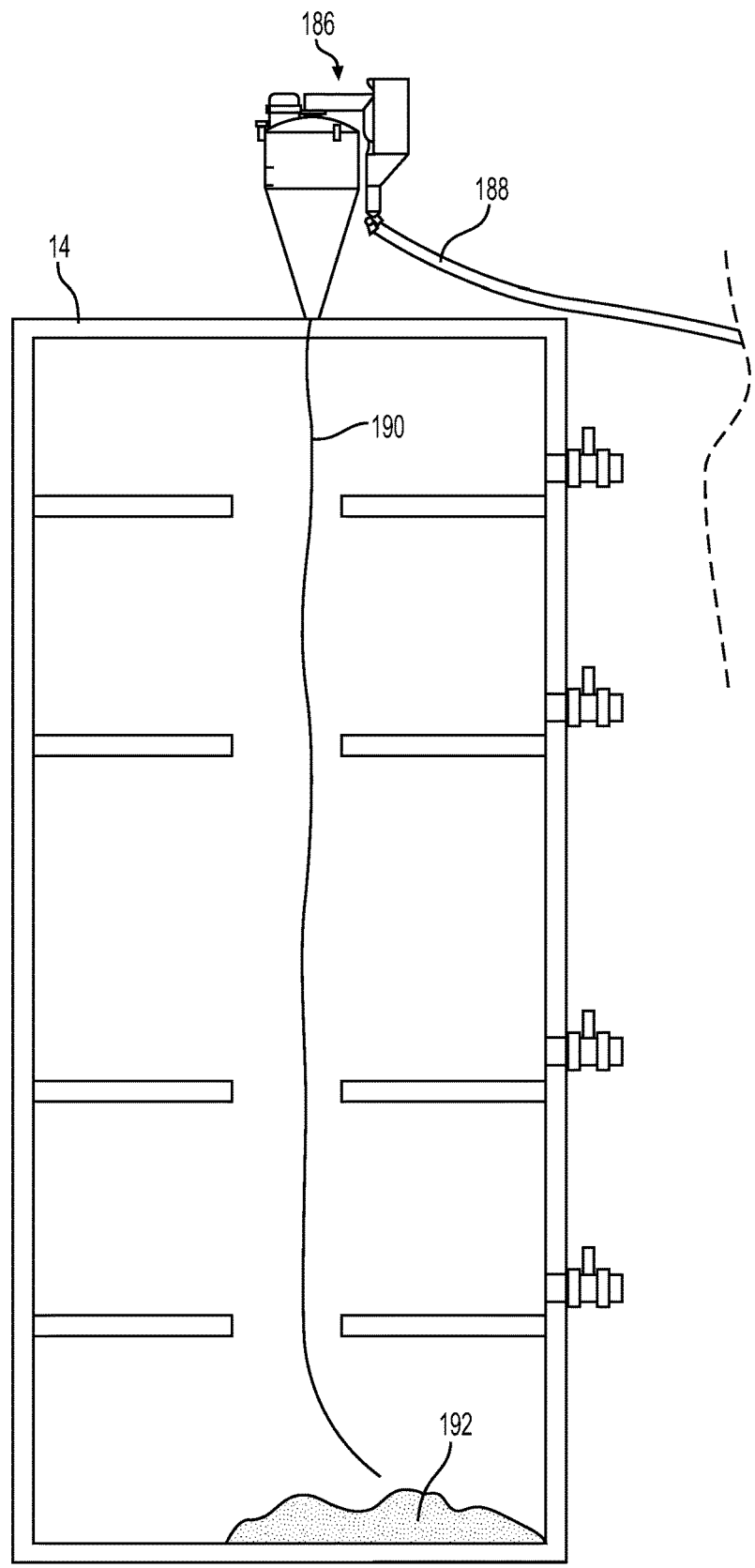
FIG. 16 is a schematic side view of an example separator housing for conveyance of material into an example reaction vessel, according to embodiments of the disclosure.
Figure 18A:
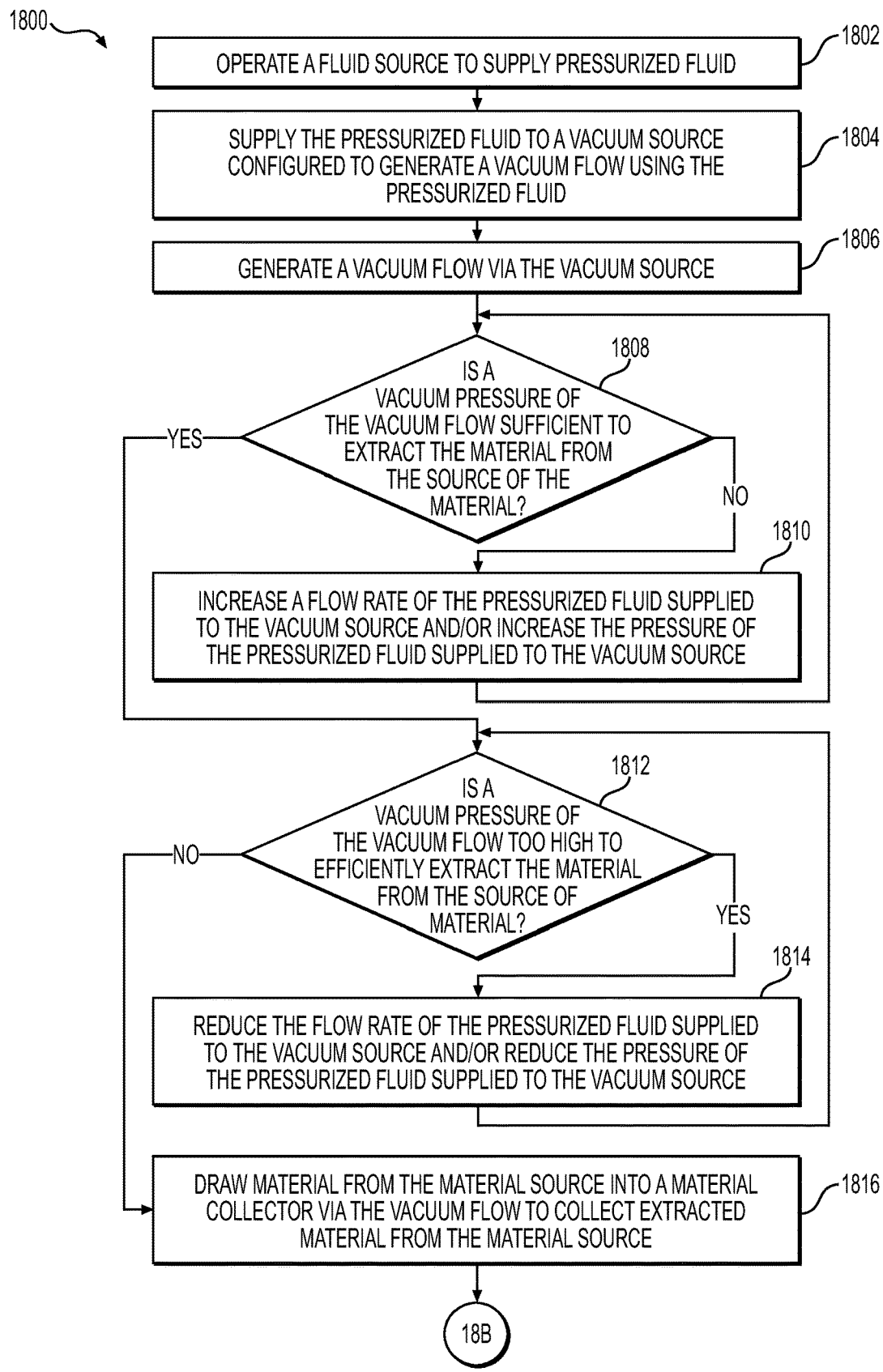
FIG. 18A is a block diagram of an example method for extracting material from a source of the material, according to embodiments of the disclosure.
Figure 18B:
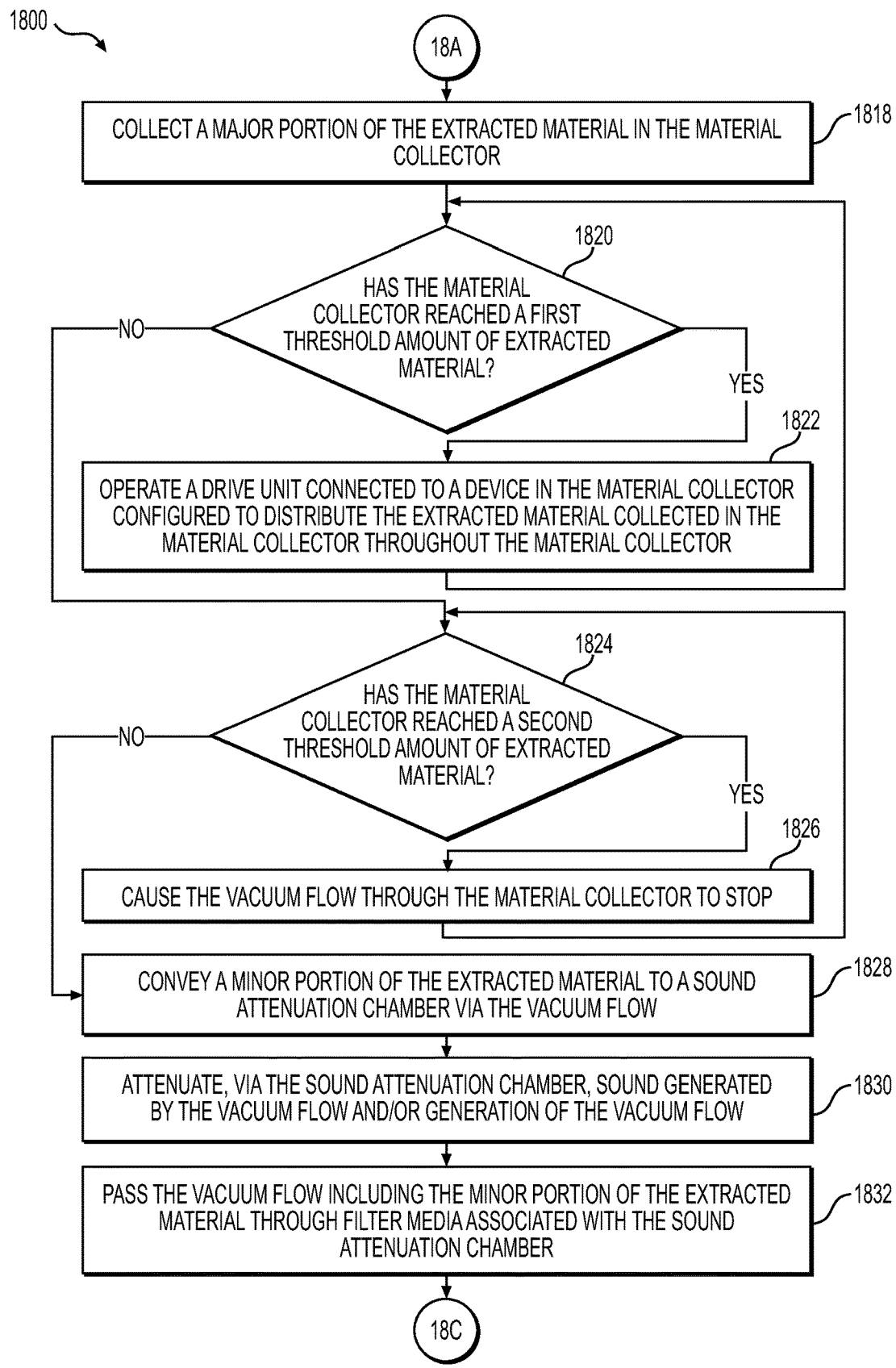
FIG. 18B is a continuation of the block diagram shown in FIG. 18A, according to embodiments of the disclosure.
Figure 18C:
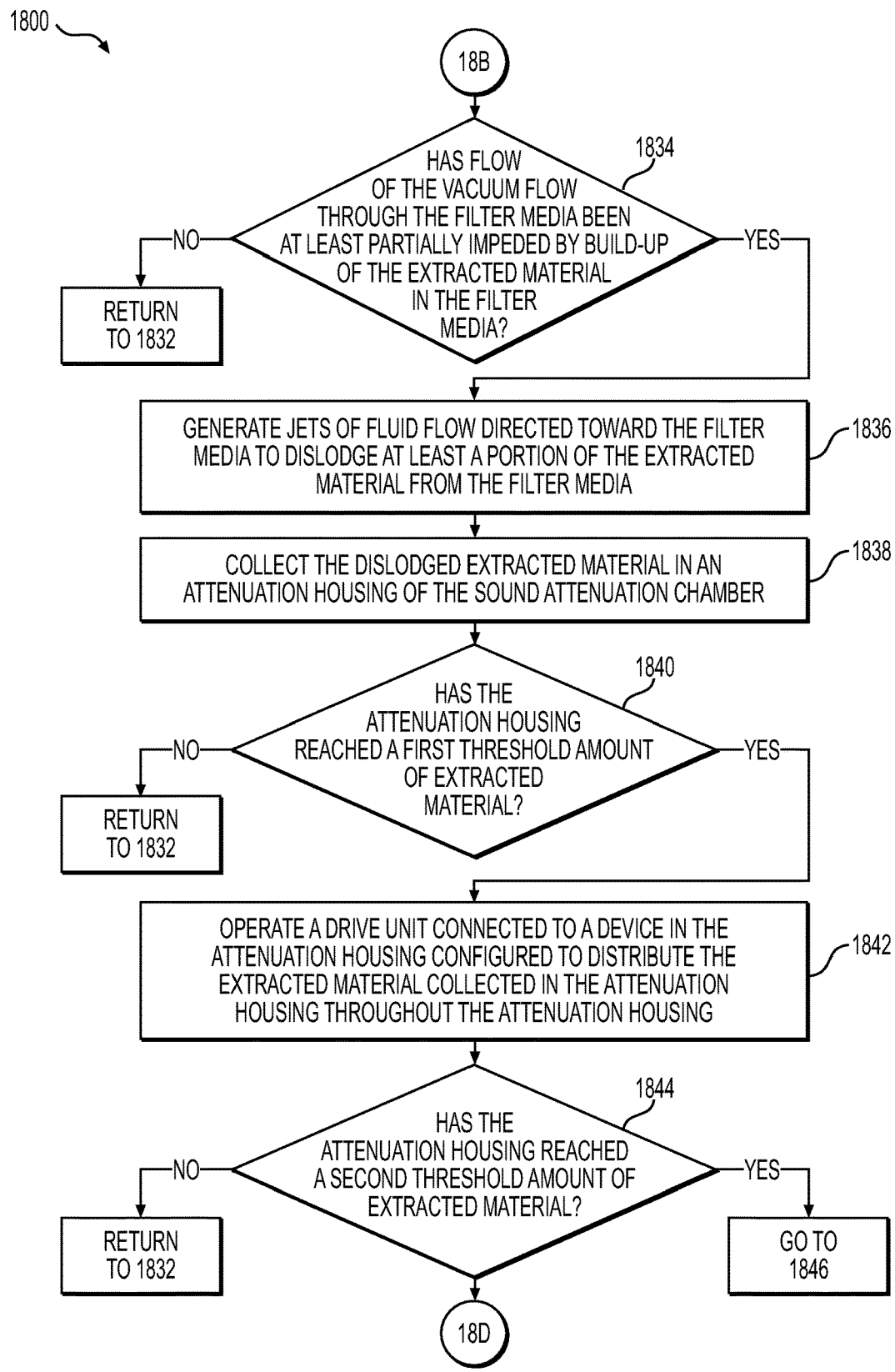
FIG. 18C is a continuation of the block diagram shown in FIGS. 18A and 18B, according to embodiments of the disclosure.
Figure 18D:
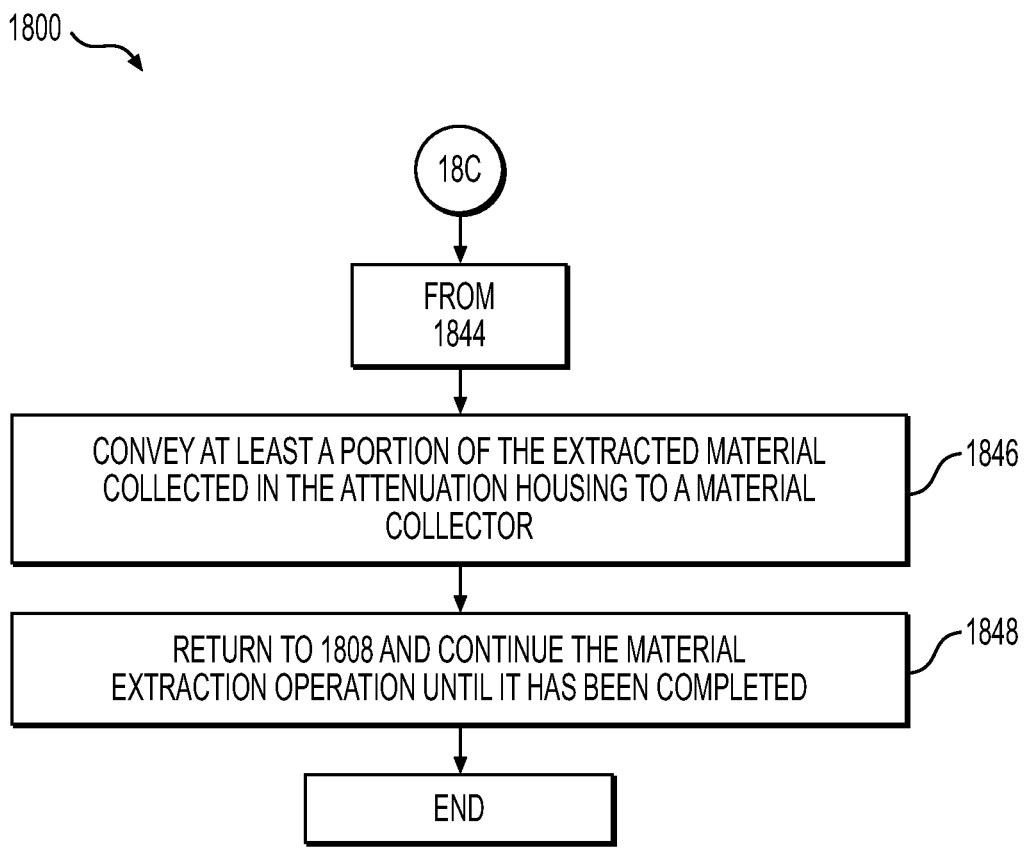
FIG. 18D is a continuation of the block diagram shown in FIGS. 18A, 18B, and 18C, according to embodiments of the disclosure.
Figure 19A:
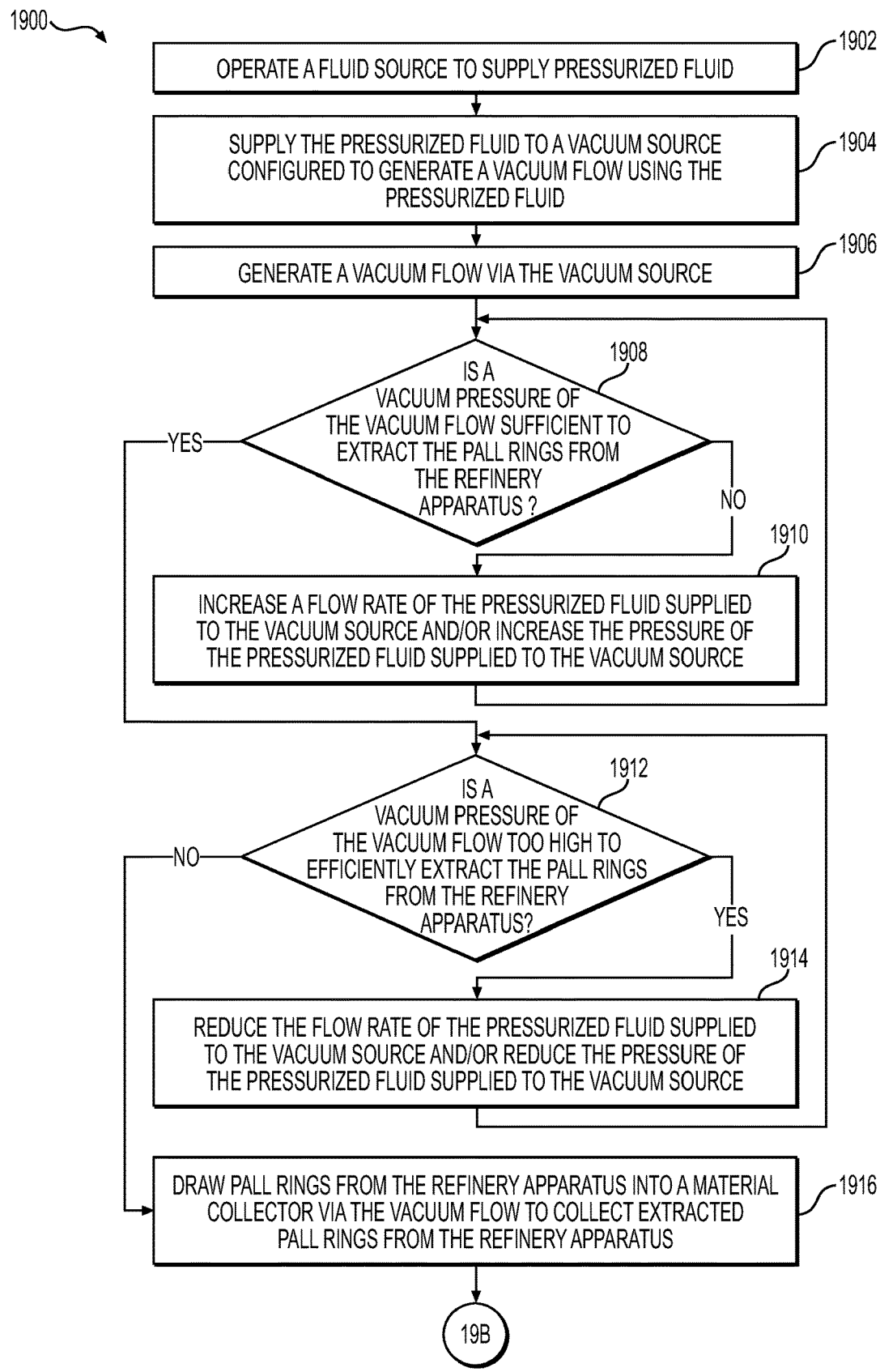
FIG. 19A is a block diagram of an example method for extracting pall rings from a source of the pall rings, according to embodiments of the disclosure.
Figure 19B:
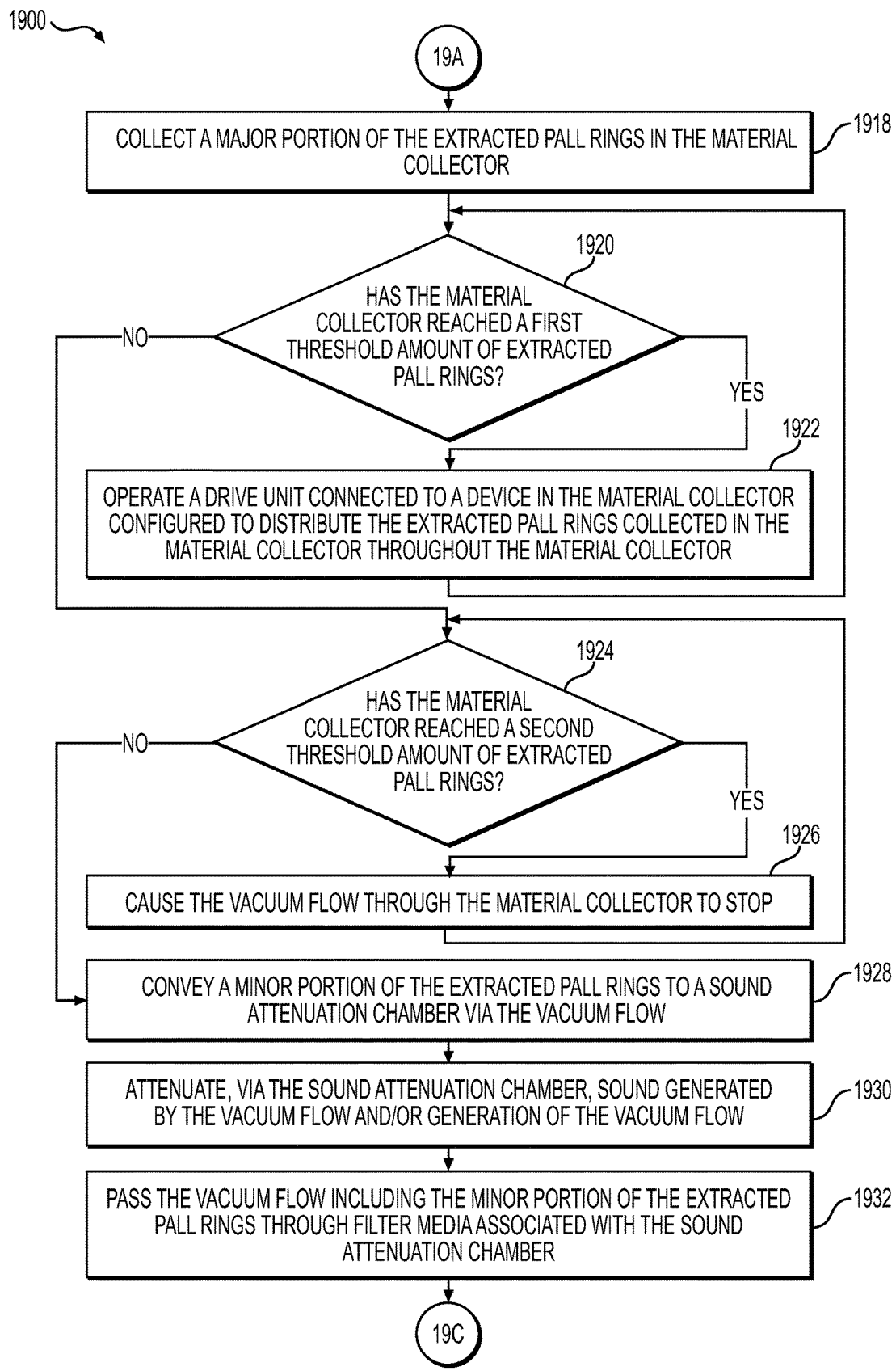
FIG. 19B is a continuation of the block diagram shown in FIG. 19A, according to embodiments of the disclosure.
Figure 19C:
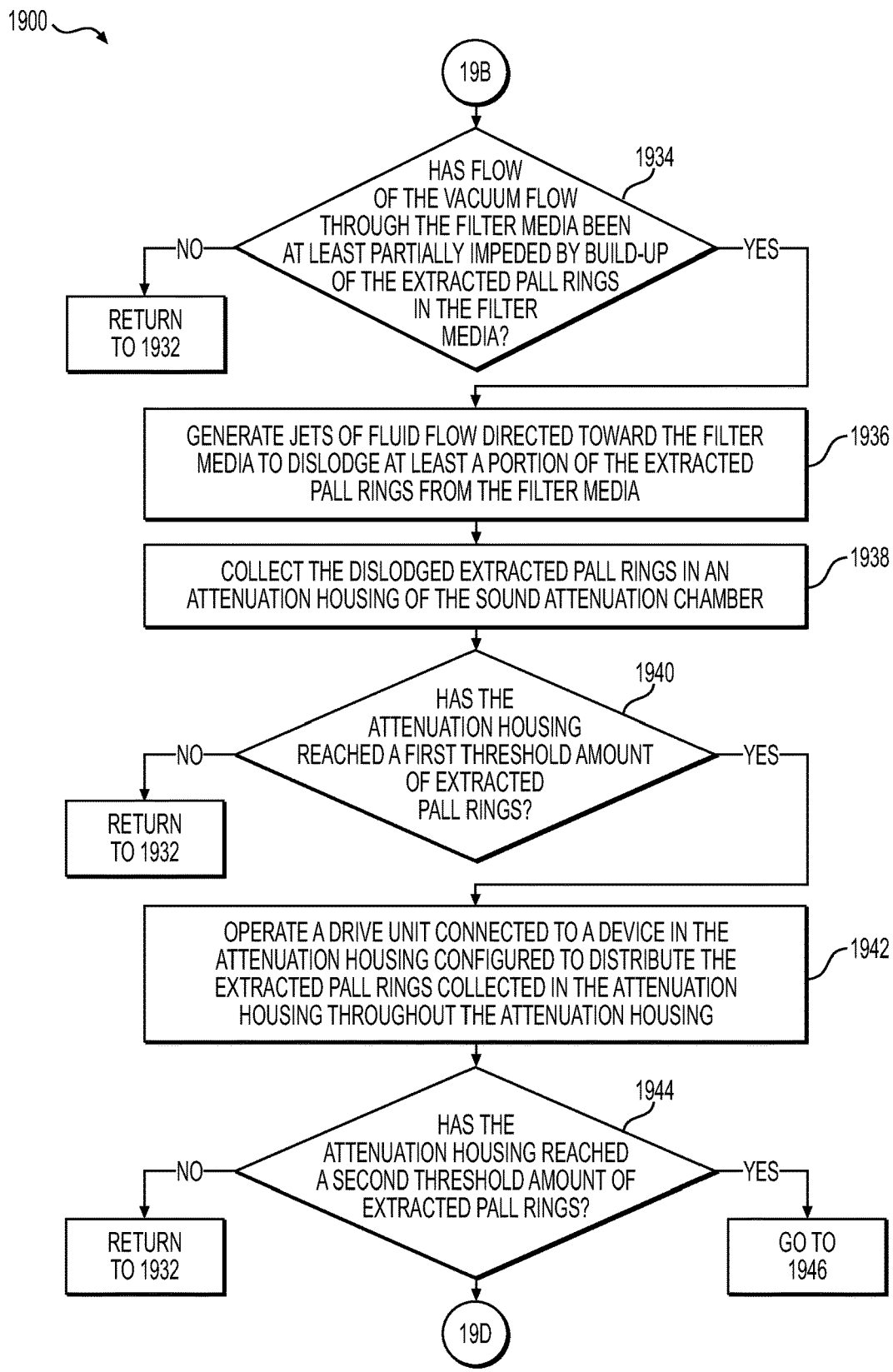
FIG. 19C is a continuation of the block diagram shown in FIGS. 19A and 19B, according to embodiments of the disclosure.
Figure 19D:
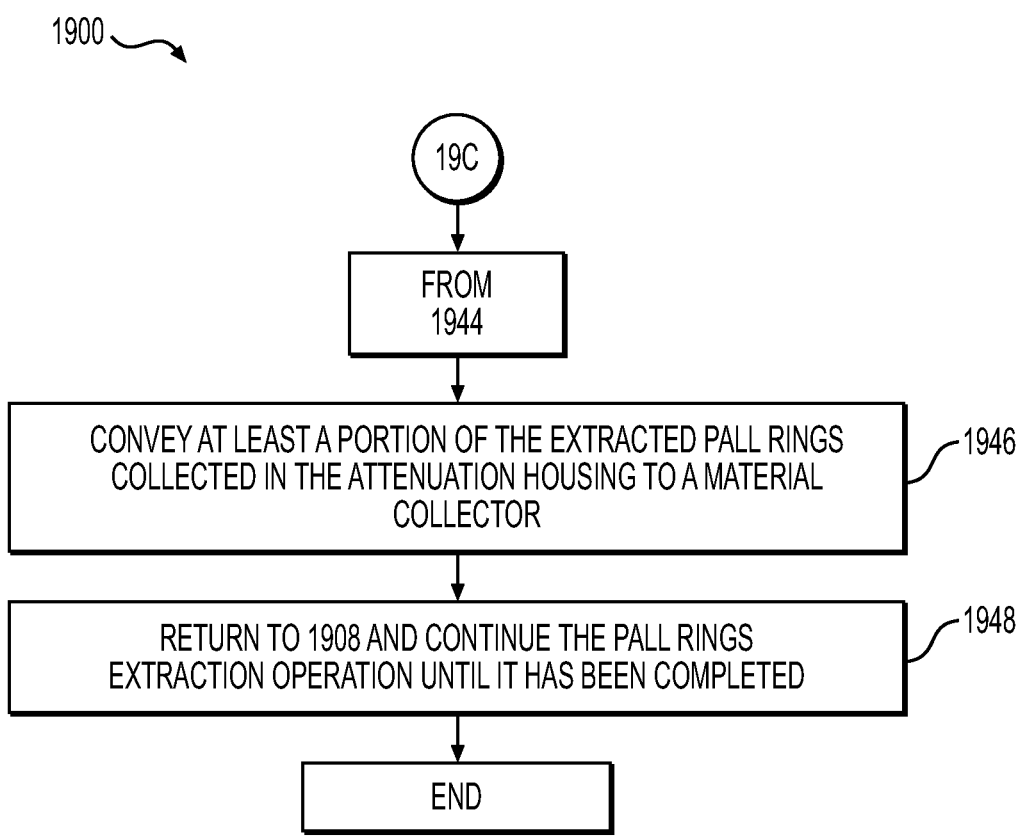
FIG. 19D is a continuation of the block diagram shown in FIGS. 19A, 19B, and 19C, according to embodiments of the disclosure.

An enlarged view of an embodiment similar to FIG. 2 to provide for the rapid conveyance and deployment of desired materials to a refinery apparatus is shown in FIG. 16. For example, a material conveyance assembly 11 may include a receiver 186. The receiver 186 may be a physical device to rapidly deploy desired materials into a reaction vessel 14. The receiver 186 may be positioned toward an upper portion of the reaction vessel 14 and may receive desired materials from a material source positioned below the receiver 186. The receiver 186 may separate the desired material from a high pressure fluid flow in which the desired material is entrained and used to carry it to the receiver 186. In some examples, the high pressure fluid flow may be directed to the receiver 186 with a conduit 188. The high pressure fluid flow may be generated by, for example, the one or more fluid sources 42.

The receiver 186 may be pneumatically connected to one or more conduits or chutes 190 through which the desired material 192 is deployed to various locations in the reaction vessel 14. The one or more chutes 190 may extend from the receiver 186 at least partially inside the reaction vessel 14. Desired material 192 in the receiver 186 may be, for example, pumped, gravity fed, or otherwise directed through the one or more chutes 190 into the reaction vessel 14. The desired material 192 may be deployed in one or more locations within the reaction vessel 14. The chute 190 may include various sections which may be removed, blocked, or otherwise separated from the flow of desired material 192 as different zones are filled. By doing so, the length of the conduit 190 may be adjusted to match each of the zones (or the heights of structures in the respective zones).

The desired material may take different forms. For example, in some embodiments, the desired material 192 may include new or recycled pall rings or other devices to facilitate a reaction in the reaction vessel 14. In some embodiments, the desired material 192 may be a catalyst material that was previously removed from the reaction vessel 14. The desired material 192 may be replacement catalyst or any other types of material without departing from embodiments disclosed herein. In some embodiments, the desired material 192 may be a different type of material that was not previously in the reaction vessel 14.

Some embodiments of the material extraction assembly 10 or material conveyance assembly 11 may include a number of components configured to cooperatively operate to provide its functionality. To orchestrate the operation of these components, in some embodiments, the operation of the material extraction assembly 10 or material conveyance assembly 11 may be coordinated in an at least partially automated manner. For example, as explained herein, any of the components of the material extraction assembly 10 or material conveyance assembly 11 may include a supervisory controller 81, which may coordinate operation of one or more of the components.

As shown in FIG. 17, the material extraction assembly 10 or material conveyance assembly 11 may include one or more supervisory controllers 81, which may be in communication with one or more of the drive controller 78 associated with operation of one or more material collectors, a vacuum source controller 136 associated with operation of one or more vacuum sources, and/or a chamber controller 168 associated with controlling operation of one or more sound attenuating chambers 40. The aforementioned supervisory controller(s) and other controllers may be in communication with one another via a network 194. The network 194 may include one or more wired and/or wireless networks through which the supervisory controller(s) 81 and other controllers may communicate.

FIG. 18A, FIG. 18B, FIG. 18C, and FIG. 18D are a block diagram of an example method 1800 for extracting material from a source of the material, for example, any one or more of the example sources of material described herein, as well as others. The example method 1800 is illustrated as a collection of blocks in a logical flow graph, which represent a sequence of operations. In some embodiments of the method 1800, one or more of the blocks may be manually and/or automatically executed. In the context of software, where applicable, the blocks may represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks may be combined in any order and/or in parallel to implement the method.

FIG. 18A through FIG. 18D are a block diagram of an example method 1800 for extracting material from a source of the material, according to embodiments of the disclosure. At 1802 (see FIG. 18A), the example method 1800 may include operating a fluid source to supply pressurized fluid, for example, as described herein.

The example method 1800, at 1804, may include supplying the pressurized fluid to a vacuum source configured to generate a vacuum flow using the pressurized fluid, for example, as described herein. In some embodiments, one or more conduits may be provided between one or more fluid sources and the vacuum generator to supply pressurized fluid from the one or more fluid sources to the vacuum source, for example, as described herein.

At 1806, the example method 1800, may include generating a vacuum flow via the vacuum source, for example, as described herein. For example, the vacuum source may include a plurality of vacuum generators configured to use the pressurized fluid to generate the vacuum flow. In some embodiments, the vacuum source may include two or more, three or more, or four of more vacuum generators. In some embodiments, one or more of the vacuum generators may include a venturi mechanism configured to use the pressurized fluid flow the generate the vacuum flow.

The example method 1800, at 1808, may include determining whether a vacuum pressure of the vacuum flow is sufficient to extract the material from the source of the material, for example, as described herein. For example, pressure sensors and/or flow rate sensors may be provided upstream and/or downstream of the vacuum source, and a controller may receive sensor signals from the sensors and determine whether the vacuum pressure is sufficient. In some embodiments, the controller may be configured to compare the pressure and/or flow rate determined based at least in part of the sensor signals and compare the pressure and/or flow rate to pressure and/or flow rate information stored in memory (e.g., via a look-up table) for different types of materials that may be extracted. In some embodiments, an operator of the system may input, for example, via a user input device, the type of material being extracted, and the controller may be configured to determine the pressure and/or flow rate appropriate for extracting the type of material input by the operator. In some embodiments, the controller may be configured to automatically determine the type of material being extracted, for example, via infra-red sensors, image sensors, optical sensors, and/or laser sensors, such as LIDAR, and analytical models, such as, for example, machine-learning-trained analytical models. Other ways of determining sufficient vacuum pressure are contemplated.

If, at 1808, is determined that the vacuum pressure is not sufficient to extract the material, at 1810, the example method 1800 may include increasing one or more of a flow rate of the pressurized fluid supplied to the vacuum source or increasing the pressure of the pressurized fluid supplied to the vacuum source.

Thereafter, the example method 1800 may include returning to 1808 to determine whether the vacuum pressure of the vacuum flow is sufficient to extract the material from the source of the material.

If, at 1808, it is determined that the vacuum pressure of the vacuum flow is sufficient to extract the material from the source of the material, at 1812, the example method 1800 may include determining whether the vacuum pressure is too high to efficiently extract the material from the source of material. This may be performed in a manner at least similar to the example manner described with respect to 1808.

If, at 1812, it is determined that the vacuum pressure is too high, at 1814, the example method 1800 may include reducing one or more of a flow rate of the pressurized fluid supplied to the vacuum source or reducing the pressure of the pressurized fluid supplied to the vacuum source.

Thereafter, the example method 1800 may include returning to 1808 to determine whether the vacuum pressure of the vacuum flow is sufficient to extract the material from the source of the material.

If, at 1812, it is determined that the vacuum pressure is not too high, at 1816, the example method 1800 may include drawing material from the material source into a material collector via the vacuum flow to collect extracted material from the material source, for example, as described herein. One or more manifolds and/or one or more conduits may be provided between the source of the material and the material collector to convey the extracted material to the material collector, for example, as described herein.

At 1818 (see FIG. 18B), the example method 1800 may include collecting a major portion of the extracted material in the material collector, for example, as described herein.

The example method 1800, at 1820, may include determining whether the material collector has reached a first threshold amount of extracted material, for example, as described herein. In some embodiments, one or more sensors may be provided to generate signals indicative of the amount of extracted material in the material collector, for example, as described herein. In some examples, a controller may be provided and configured to receive the sensor signals, and based at least in part on the sensor signals, determine whether the first threshold has been met.

If, at 1820, it is determined that the material collector has reached the first threshold amount, at 1822, the example method 1800, may include operating a drive unit connected to a device in the material collector configured to distribute the extracted material collected in the material collector throughout the material collector, for example, as described herein. For example, the drive unit may be connected to an auger configured to rotate via the drive unit and redistribute at least some of the extracted material within the material collector, for example, as described herein.

At 1824, the example method 1800 may include determining whether the material collector has reached a second threshold amount of extracted material approaching maximum capacity of the material collector, for example, as described herein. In some embodiments, as noted above at 1820, one or more sensors may be provided to generate signals indicative of the amount of extracted material in the material collector. In some examples, a controller may be provided and configured to receive the sensor signals, and based at least in part on the sensor signals, determine whether the second threshold has been met.

If, at 1824, it is determined that the material collector has reached the second threshold amount of extracted material, at 1826, the example method 1800 may include causing the vacuum flow through the material collector to stop. This may include, for example, closing a valve in the conduit between the source of the material and the material collector to prevent the extracted material from continuing to flow into the material collector. In some embodiments, this may include ceasing the method 1800 until, for example, the material collector may be emptied or the conduit may be connected to a different material collector. In some embodiments, the conduit connecting the material collector to the source of the material may be disconnected from the source of the material and another material collector may be connected to the conduit. Thereafter, the method 1800 may be restarted. The full material collector may be taken to a location for disposal of the extracted material, recycling of the extracted material, or remediation of the extracted material.

If, at 1824, it is determined that the material collector has not reached the second threshold amount of extracted material approaching maximum capacity of the material collector, at 1828, the example method 1800 may include conveying a minor portion of the extracted material to a sound attenuation chamber via the vacuum flow, for example, as described herein. For example, a conduit may be provided between the material collector and the sound attenuation chamber providing a flow path for the vacuum flow to convey the minor portion of the material (e.g., material not trapped in the material collector) to the sound attenuation chamber. In some embodiments, the sound attenuation chamber of the vacuum source may be connected to one another (e.g., directly connected to one another), for example, to form a unitary vacuum and attenuation module, for example, as described herein.

At 1830, the example method 1800 may include attenuating, via the sound attenuation chamber, sound generated by the vacuum flow and/or generation of the vacuum flow, for example, as described herein.

The example method 1800, at 1832, may include passing the vacuum flow including the minor portion of the extracted material through filter media associated with the sound attenuation chamber (e.g., at least partially enclosed within the sound attenuation chamber) to capture at least a portion of the minor portion of extracted material in the filter media, for example, as described herein.

At 1834 (see FIG. 18C), the example method 1800 may include determining whether flow of the vacuum flow through the filter media may be at least partially impeded by build-up of the extracted material in the filter media. This may be determined, for example, by determining whether a pressure change associated with the vacuum flow between opposite sides of the filter media has reached a threshold level indicative of the vacuum flow through the filter media being at least a partially impeded by a build-up of the extracted material in the filter media. Other ways of determining whether the vacuum flow through the filter media is at least a partially impeded by a build-up of the extracted material in the filter media are contemplated.

If, at 1834, it is determined that the flow of the vacuum flow through the filter media may be at least partially impeded by build-up of the extracted material in the filter media, at 1836, the example method 1800 may include generating jets of fluid flow directed toward the filter media to dislodge at least a portion of the extracted material from the filter media, for example, as described herein. In some embodiments, the example method 1800 may include periodically generating the jets of fluid flow directed toward the filter media instead of, or in addition to, determining whether flow of the vacuum flow through the filter media may be at least partially impeded by build-up of the extracted material in the filter media. For example, the jets of fluid flow directed toward the filter media may be initiated based on parameters, such as, for example, the amount of time the material extraction assembly has been operating, the pressure level and/or flow rate of the vacuum flow, and/or the type of material being extracted from the material source. One of more of these parameters may be determined based at least in part on, for example, sensor signals, a controller, and/or operator input.

At 1838, the example method 1800 may include collecting the dislodged extracted material in an attenuation housing of the sound attenuation chamber, for example, as described herein. For example, the jets of fluid, when generated may cause at least a portion of the extracted material trapped in the filter media to fall from the filter media into the attenuation housing for collection.

The example method 1800, at 1840, may include determining whether the attenuation housing has reached a first threshold amount of extracted material, for example, as described herein. This may be performed in a manner at least similar to the example manner described with respect to 1820 above.

If, at 1840, it is determined that the attenuation housing has reached the first threshold amount, at 1842, the example method 1800, may include operating a drive unit connected to a device in the attenuation housing configured to distribute the extracted material collected in the attenuation housing throughout the attenuation housing, for example, as described herein. For example, this may be performed in a manner at least similar to the manner described with respect to 1822 above.

At 1844, the example method 1800 may include determining whether the attenuation housing has reached a second threshold amount of extracted material, for example, as described herein. This may be performed in a manner at least similar to the example manner described with respect to 1824 above.

If, at 1844, it is determined that the second threshold has been reached, the example method 1800 may include, at 1846 (see FIG. 18D), conveying at least a portion of the extracted material collected in the attenuation housing to a material collector, for example, as described herein. For example, a discharge valve in the attenuation housing may be opened, and the vacuum flow may be used to convey at least a portion of the extracted material collected in the attenuation housing to a material collector connected to the attenuation housing via a conduit.

At 1848, the example method 1800 may include returning to, for example, 1808 and continuing the material extraction operation until it has been completed.

It should be appreciated that at least some subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like FIG. 19A, FIG. 19B, FIG. 19C, and FIG. 19D are a block diagram of an example method 1900 for extracting pall rings from a refinery apparatus, according to embodiments of the disclosure. The pall rings may be, for example, used pall rings in a reactor vessel, which have been at least partially covered with material that may reduce the effectiveness of the pall rings during operations associated with the reactor vessel. At least some steps for the generation of a vacuum flow and extraction of the pall rings may be at least similar to those described in method 1800. The example method 1900 is illustrated as a collection of blocks in a logical flow graph, which represent a sequence of operations. In some embodiments of the method 1900, one or more of the blocks may be manually and/or automatically executed. In the context of software, where applicable, the blocks may represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks may be combined in any order and/or in parallel to implement the method.

At 1902 (see FIG. 19A), the example method 1900 may include operating a fluid source to supply pressurized fluid, and at 1904 supplying the pressurized fluid to a vacuum source configured to generate a vacuum flow using the pressurized fluid. At 1906 the vacuum flow is generated. The vacuum source may include a plurality of vacuum generators, and the plurality of vacuum generators may include venturi mechanisms configured to use the pressurized fluid flow the generate the vacuum flow as described herein.

The example method 1900, at 1908 and 1912, may include determining whether a vacuum pressure of the vacuum flow is sufficient or too high to efficiently extract the pall rings from the refinery apparatus, for example, as described herein. For example, pressure sensors and/or flow rate sensors may be provided and a controller may receive sensor signals from the sensors and determine whether the vacuum pressure is sufficient. In some embodiments, an operator of the system may specify, for example, via a user input device, that the extracted type of material is pall rings of a certain size and/or configuration. If, at 1908, is determined that the vacuum pressure is not sufficient to extract the material, at 1910, the example method 1900 may include increasing one or more of a flow rate or a pressure of the pressurized fluid supplied to the vacuum source. If, at 1912, it is determined that the vacuum pressure is too high, at 1914, the example method 1900 may include reducing one or more of a flow rate or a pressure of the pressurized fluid supplied to the vacuum source. After each of 1910 and 1914, the method 1900 may return to 1908 to determine whether the vacuum pressure of the vacuum flow within the desired bounds.

If, after 1912, it is determined that the vacuum pressure lies within the desired range, the example method 1900 may include drawing the pall rings from the refinery apparatus into a material collector via the vacuum flow to collect extracted pall rings from reactor vessel, for example, as described herein. One or more manifolds and/or one or more conduits may be provided to convey the extracted pall rings to the material collector.

At 1918 (see FIG. 19B), the example method 1900 may include collecting a major portion of the extracted pall rings in the material collector, for example, as described herein.

The example method 1900, at 1920, may include determining whether the material collector has reached a first threshold amount of extracted pall rings, for example, as described herein. In some embodiments, one or more sensors and a controller may be provided to determine whether the first threshold has been met.

If, at 1920, it is determined that the material collector has reached the first threshold amount of pall rings, at 1922, the example method 1900, may include operating a drive unit connected to a device in the material collector configured to distribute the extracted pall rings in the material collector throughout the material collector, for example, as described herein.

At 1924, the example method 1900 may include determining whether the material collector has reached a second threshold amount of extracted pall rings approaching maximum capacity of the material collector, for example, as described herein. In some embodiments, as noted above at 1920, one or more sensors and a controller may be provided to determine whether the first threshold has been met.

If, at 1924, it is determined that the material collector has reached the second threshold amount of pall rings, at 1926, the example method 1900 may include causing the vacuum flow through the material collector to stop, for example, as described herein. In some embodiments, this may include ceasing the method 1900 until, for example, the material collector may be emptied or the conduit may be connected to a different material collector. In some embodiments, the conduit connecting the material collector to the reactor vessel may be disconnected from the source of the material and another material collector may be connected to the conduit. Thereafter, the method 1900 may be restarted. The full material collector may be taken to a location for disposal, recycling, or remediation of the extracted pall rings.

If, at 1924, it is determined that the material collector has not reached the second threshold amount of extracted pall rings approaching maximum capacity of the material collector, at 1928, the example method 1900 may include conveying a minor portion of the extracted pall rings to a sound attenuation chamber via the vacuum flow, for example, as described herein. In some embodiments, the sound attenuation chamber of the vacuum source may be connected to one another to form a unitary vacuum and attenuation module, for example, as described herein.

At 1930, the example method 1900 may include attenuating, via the sound attenuation chamber, sound generated by the vacuum flow and/or generation of the vacuum flow, and at 1932 may include passing the vacuum flow including the minor portion of the extracted pall rings through filter media associated with the sound attenuation chamber to capture at least a portion of the extracted pall rings in the filter media, for example, as described herein.

At 1934 (see FIG. 19C), the example method 1900 may include determining whether flow of the vacuum flow through the filter media may be at least partially impeded by build-up of the extracted pall rings in the filter media. If it is determined that the flow of the vacuum flow through the filter media may be at least partially impeded, 1936 may include generating jets of fluid flow directed toward the filter media to dislodge at least a portion of the extracted pall rings from the filter media, as described herein.

At 1938, the example method 1900 may include collecting the dislodged extracted pall rings in an attenuation housing of the sound attenuation chamber, and at 1940, may include determining whether the attenuation housing has reached a first threshold amount of extracted pall rings similar to the example manner described with respect to 1920 above, for example, as described herein. If it is determined that the attenuation housing has reached the first threshold amount, 1942 may include operating a drive unit connected to a device in the attenuation housing configured to distribute the extracted pall rings throughout the attenuation housing, as described herein. For example, this may be performed in a manner at least similar to the manner described with respect to 1922 above.

At 1944, the example method 1900 may include determining whether the attenuation housing has reached a second threshold amount of extracted pall rings, for example, in a manner described with respect to 1924 above. If, at 1944, it is determined that the second threshold has been reached, at 1946 (see FIG. 19D) the method may include conveying at least a portion of the extracted pall rings collected in the attenuation housing to a material collector, for example, as described herein. At 1948, the example method 1900 may include returning to, for example, 1908 and continuing the pall ring extraction operation until it has been completed.

Similar to the example method described in 1800, it should be appreciated that at least some subject matter presented herein in method 1900 may be implemented as a computer process, a computer-controlled apparatus, a computing system, or an article of manufacture. Additionally, those skilled in the art will also appreciate that aspects of the subject matter described herein may be practiced on or in conjunction with other computer system configurations beyond those described herein.

FIG. 20A, FIG. 20B, FIG. 20C, and FIG. 20D are a block diagram of an example method 2000 for conveying material from a material source to an elevated position and depositing the material into a refinery apparatus, according to embodiments of the disclosure. The material may be, for example, new, regenerated, and/or recycled catalyst, pall rings, and/or other packing material for a reaction vessel. Other types of materials are contemplated, such as, for example, beads, balls, pellets, and/or bricks of material. The steps for the generation of a vacuum flow and extraction of the material from the material source may be at least similar to those described in methods 1800 and 1900 above. The example method 2000 is illustrated as a collection of blocks in a logical flow graph, which represent a sequence of operations. In some embodiments of the method 2000, one or more of the blocks may be manually and/or automatically executed. In the context of software, where applicable, the blocks may represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks may be combined in any order and/or in parallel to implement the method.

Figure 20A:
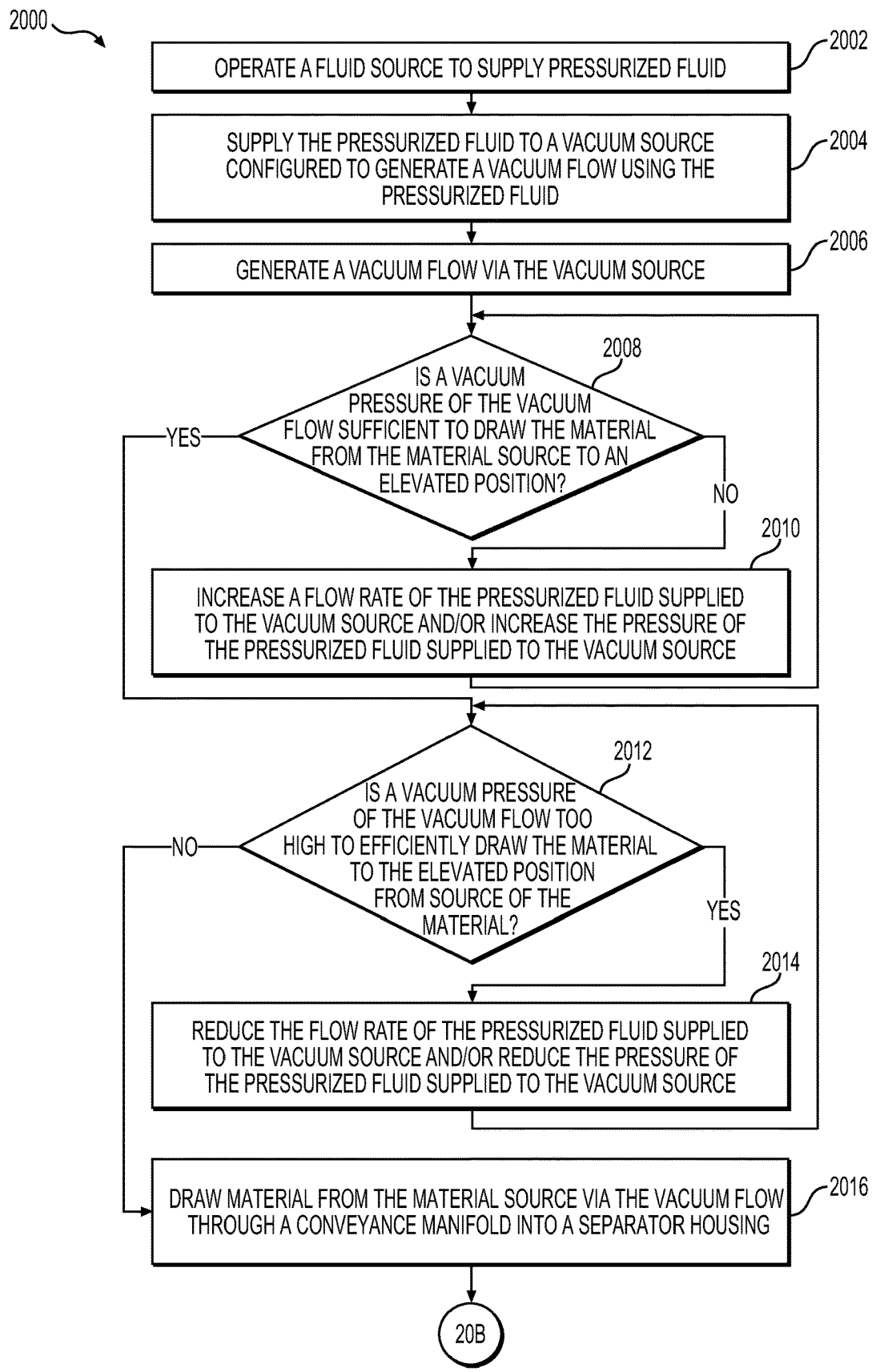
FIG. 20A is a block diagram of an example method for conveying material from a source of the material, according to embodiments of the disclosure.
Figure 20B:
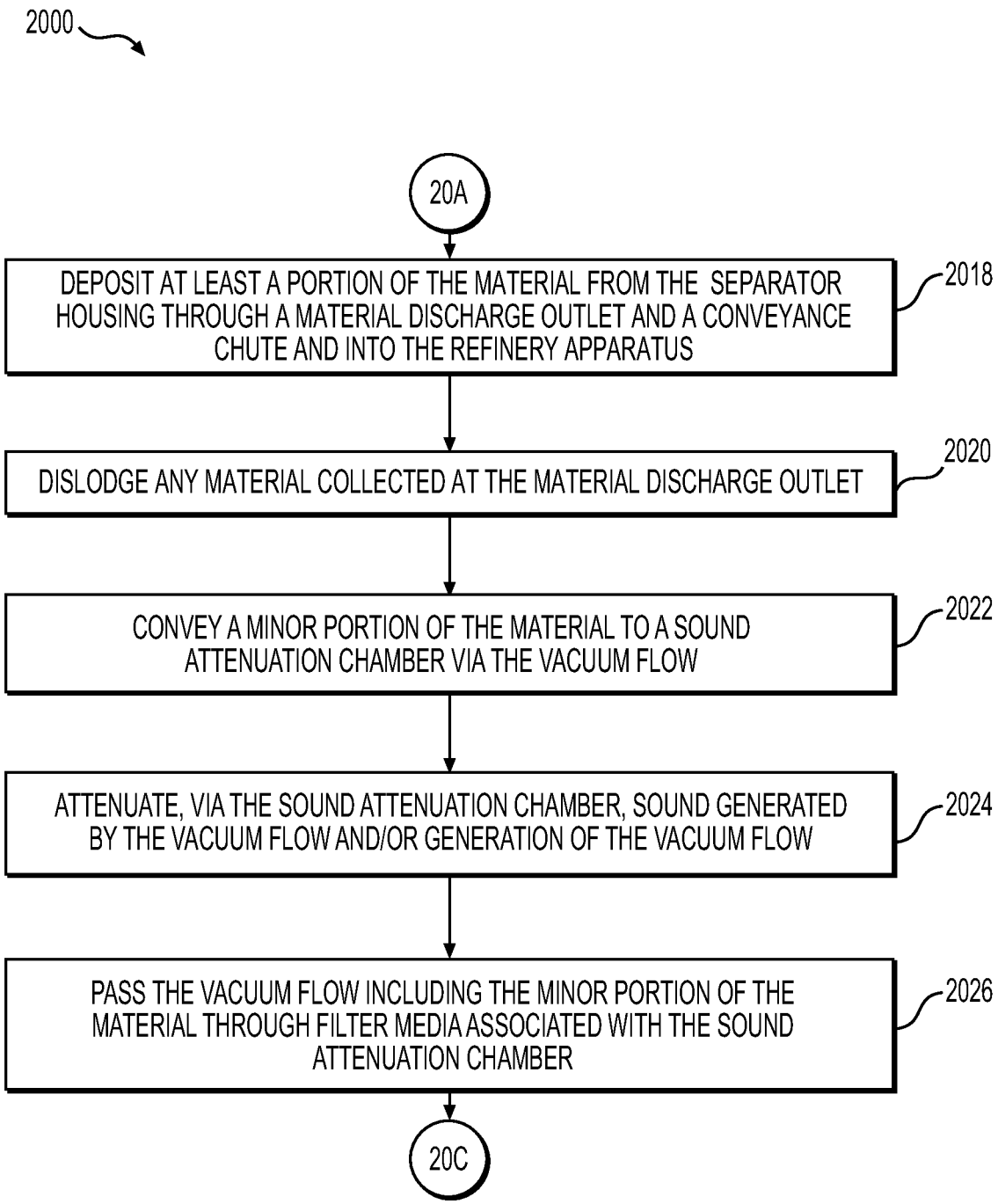
FIG. 20B is a continuation of the block diagram shown in FIG. 20A, according to embodiments of the disclosure.
Figure 20C:
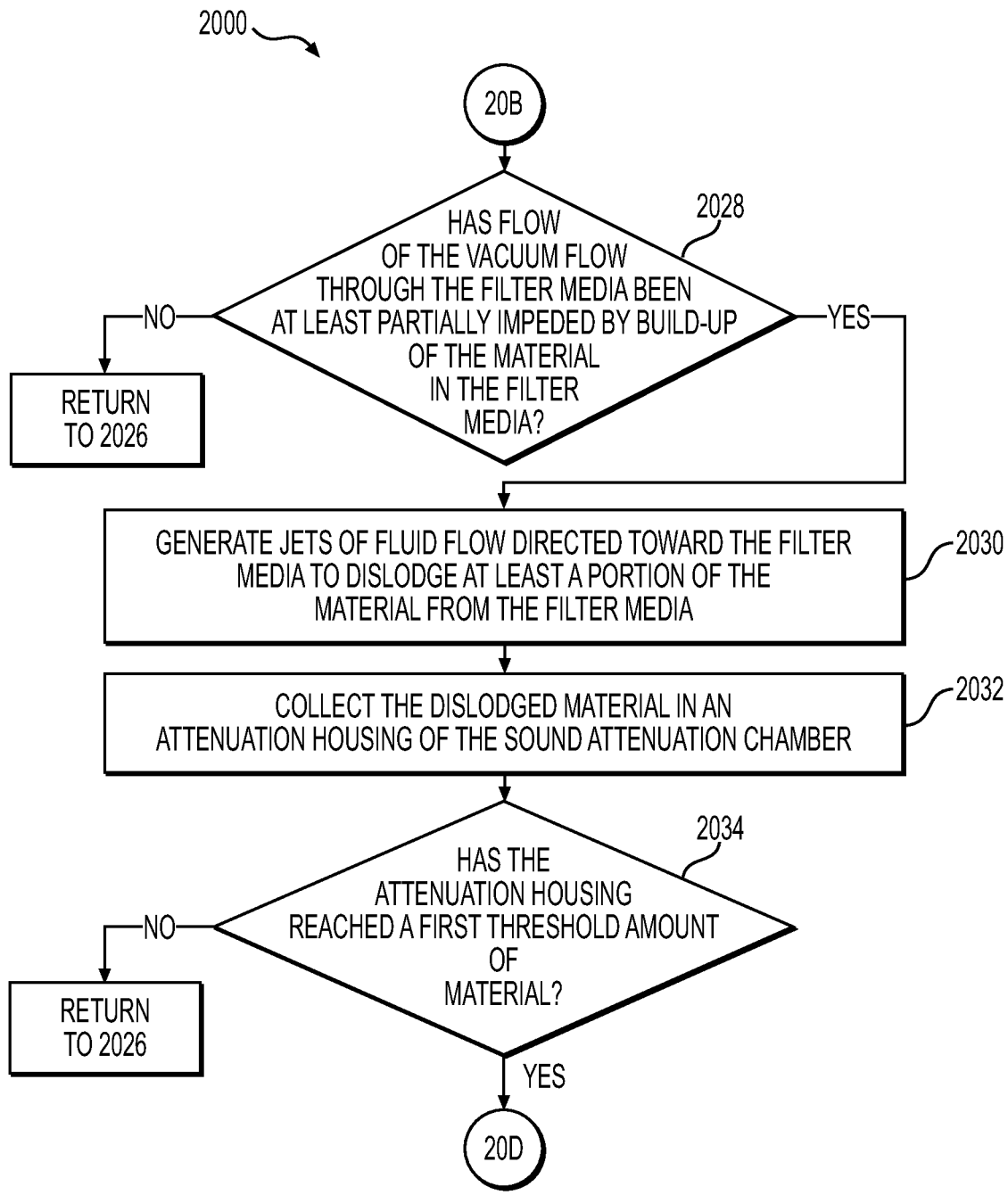
FIG. 20C is a continuation of the block diagram shown in FIGS. 20A and 20B, according to embodiments of the disclosure.
Figure 20D:
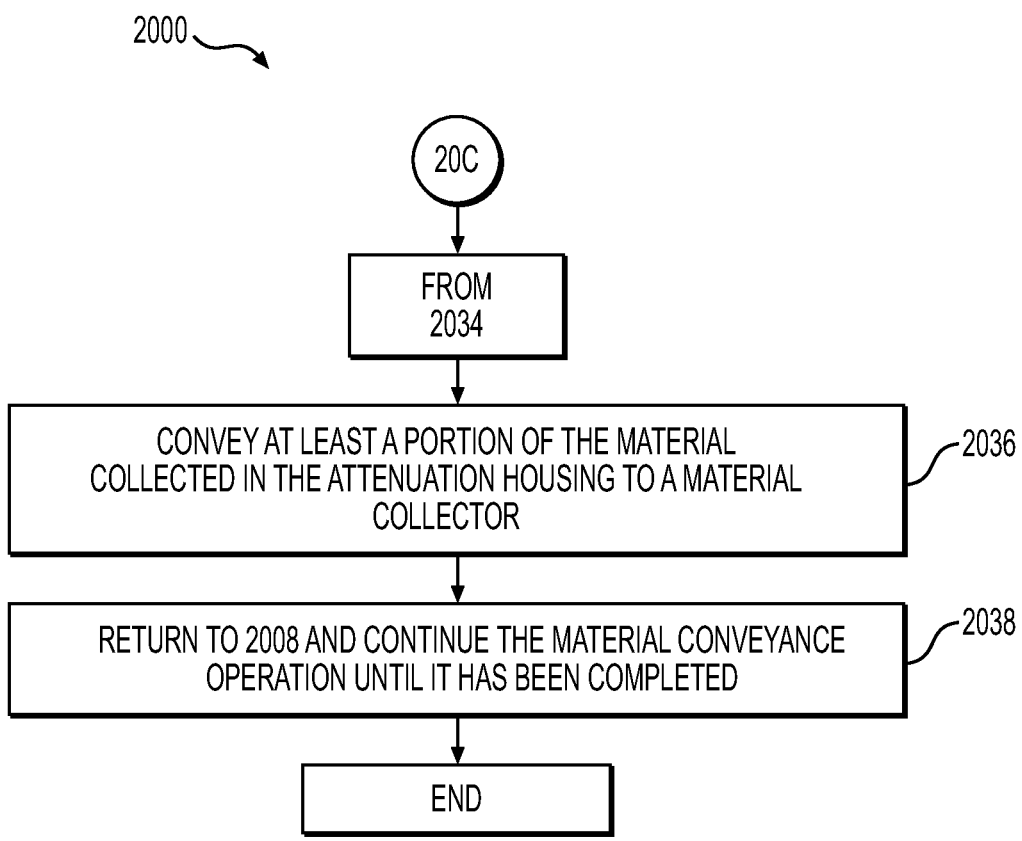
FIG. 20D is a continuation of the block diagram shown in FIGS. 20A, 20B, and 20C, according to embodiments of the disclosure.

In FIG. 20A, at 2002, the example method 2000 may include operating a fluid source to supply pressurized fluid, and at 2004, supplying the pressurized fluid to a vacuum source configured to generate, at 2006, a vacuum flow.

The example method 2000, at 2008 and 2012, may include determining whether a vacuum pressure of the vacuum flow is sufficient or too high to efficiently draw the material from the material source to an elevated position (e.g., above the refinery apparatus) in a manner similar to those described herein. If, at 2008 and 2012, is determined that the vacuum pressure is not sufficient or too high, the example method 2000 may include at 2010 and 2014 adjusting one or more of a flow rate or a pressure of the pressurized fluid supplied to the vacuum source. After each of 2010 and 2014, the method 2000 may return to 2008 to determine whether the vacuum pressure of the vacuum flow within the desired range for conveying the material to the elevated position.

If, after 2012, it is determined that the vacuum pressure lies within the desired range, the example method 1900 may include drawing the material from the material source to the elevated position through a conveyance manifold and into a separator housing, for example, as described herein. The separator housing may have, for example, a diverter to separate the conveyed material from the vacuum flow. Once in the separator housing, at 2018 (see FIG. 20B), the example method 2000 may include depositing at least a portion of the extracted material in the refinery apparatus, for example, as described herein. The flow of material may pass, for example, through a material discharge outlet and may be directed within the interior of the refinery apparatus by a conveyance chute extending at least partially within the refinery apparatus.

The example method 2000, at 2020, may include dislodging any material collected, for example, as described herein. In some embodiments, a vibrating apparatus or other suitable device and/or method may be used to agitate and dislodge the material from the separator housing, material discharge outlet, and/or other nearby components, for example, as described herein.

At 2022, the example method 2000, may include conveying a portion of the material not directed into the refinery apparatus to a sound attenuation chamber using the vacuum flow, and, at 2024, using the sound attenuation chamber to attenuate the sound generated by the vacuum flow, and/or the sound produced during the generation of the vacuum flow. The method, at 2026, may thereafter include, for example, passing the vacuum flow including the portion of the conveyed material through filter media associated with the sound attenuation chamber to capture at least a portion of the conveyed material in the filter media, for example, as described herein.

At 2028 (see FIG. 20C), the example method 2000 may include determining whether flow of the vacuum flow through the filter media may be at least partially impeded by build-up of the conveyed material in the filter media. If it is determined that the flow of the vacuum flow through the filter media may be at least partially impeded, at 2030, the example method 2000 may include generating jets of fluid flow directed toward the filter media to dislodge at least a portion of the conveyed material from the filter media, for example, as described herein.

At 2032, the example method 2000 may include collecting the dislodged conveyed material in an attenuation housing of the sound attenuation chamber, and, at 2034, may include determining whether the attenuation housing has reached a first threshold amount of conveyed material similar to the example manner described with respect to 1920 of the method 1900 above. If it is determined that the attenuation housing has reached the first threshold amount, at 2036, the example method 2000 may include conveying at least a portion of the material collected in the attenuation housing to a material collector, for example, as described herein. The material collected in the material collector thereafter may be, for example, disposed, regenerated, recycled, and/or returned to the material source. At 2038, the example method 2000 may include returning to, for example, 2008, and continuing to draw material until the material conveyance operation has been completed.

Figure 21:
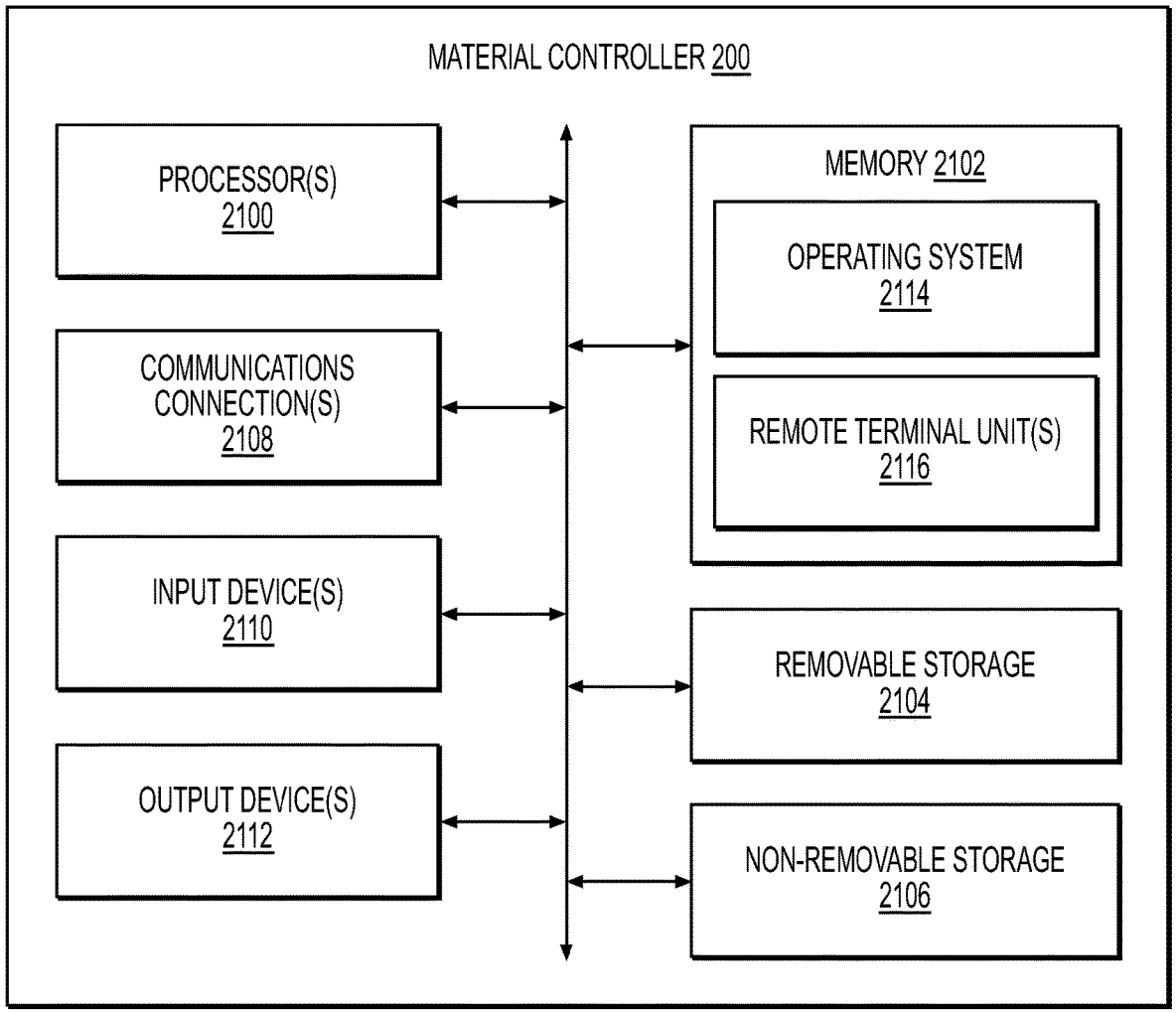
FIG. 21 is a schematic diagram of an example material extraction controller configured to at least partially control a material extraction assembly or material conveyance assembly, according to embodiments of the disclosure.

FIG. 21 is a schematic diagram of an example material controller 200 configured to at least partially control a material extraction assembly 10 and/or a material conveyance assembly 11, according to embodiments of the disclosure. The material controller 200 may include one or more of the controllers described herein. The material controller 200 may include one or more processor(s) 2100 configured to execute certain operational aspects associated with implementing certain systems and methods described herein. The processor(s) 2100 may communicate with a memory 2102. The processor(s) 2100 may be implemented and operated using appropriate hardware, software, firmware, or combinations thereof. Software or firmware implementations may include computer-executable or machine-executable instructions written in any suitable programming language to perform the various functions described. In some examples, instructions associated with a function block language may be stored in the memory 2102 and executed by the processor(s) 2100.

The memory 2102 may be used to store program instructions that are loadable and executable by the processor(s) 2100, as well as to store data generated during the execution of these programs. Depending on the configuration and type of the material controller 200, the memory 2102 may be volatile (such as random access memory (RAM)) and/or non-volatile (such as read-only memory (ROM), flash memory, etc.). In some examples, the memory devices may include additional removable storage 2104 and/or non-removable storage 2106 including, but not limited to, magnetic storage, optical disks, and/or tape storage. The disk drives and their associated computer-readable media may provide non-volatile storage of computer-readable instructions, data structures, program modules, and other data for the devices. In some implementations, the memory 2102 may include multiple different types of memory, such as static random access memory (SRAM), dynamic random access memory (DRAM), or ROM.

The memory 2102, the removable storage 2104, and the non-removable storage 1906 are all examples of computer-readable storage media. For example, computer-readable storage media may include volatile and non-volatile, removable and non-removable media implemented in any method or technology for storage of information, such as computer-readable instructions, data structures, program modules, or other data. Additional types of computer storage media that may be present may include, but are not limited to, programmable random access memory (PRAM), SRAM, DRAM, RAM, ROM, electrically erasable programmable read-only memory (EEPROM), flash memory, or other memory technology, compact disc read-only memory (CD-ROM), digital versatile discs (DVD) or other optical storage, magnetic cassettes, magnetic tapes, magnetic disk storage or other magnetic storage devices, or any other medium, which may be used to store the desired information and which may be accessed by the devices. Combinations of any of the above should also be included within the scope of computer-readable media.

The material controller 200 may also include one or more communication connection(s) 2108 that may facilitate a control device (not shown) to communicate with devices or equipment capable of communicating with the material controller 200. The material controller 200 may also include a computer system (not shown). Connections may also be established via various data communication channels or ports, such as USB or COM ports to receive cables connecting the material controller 200 to various other devices on a network. In some examples, the material controller 200 may include Ethernet drivers that enable the material controller 200 to communicate with other devices on the network. According to various examples, communication connections 2108 may be established via a wired and/or wireless connection on the network.

The material controller 200 may also include one or more input devices 2110, such as a keyboard, mouse, pen, voice input device, gesture input device, and/or touch input device. It may further include one or more output devices 2112, such as a display, printer, and/or speakers. In some examples, computer-readable communication media may include computer-readable instructions, program modules, or other data transmitted within a data signal, such as a carrier wave or other transmission. As used herein, however, computer-readable storage media may not include computer-readable communication media.

Turning to the contents of the memory 2102, the memory 2102 may include, but is not limited to, an operating system (OS) 2114 and one or more application programs or services for implementing the features and embodiments disclosed herein. Such applications or services may include remote terminal units 2116 for executing certain systems and methods for controlling operation of the material extraction assembly 10 or material conveyance assembly 11 (e.g., semi- or full-autonomously controlling operation of the assembly), for example, upon receipt of one or more control signals generated by the material controller 200. In some embodiments, one or more remote terminal unit(s) 2116 may be located on one or more components of the material extraction assembly 10 or material conveyance assembly 11. The remote terminal unit(s) 2116 may reside in the memory 2102 or may be independent of the material controller 200. In some examples, the remote terminal unit(s) 2116 may be implemented by software that may be provided in configurable control block language and may be stored in non-volatile memory. When executed by the processor(s) 2100, the remote terminal unit(s) 2116 may implement the various functionalities and features associated with the material controller 200 described herein.

As desired, embodiments of the disclosure may include a material controller 200 with more or fewer components than are illustrated in FIG. 21. Additionally, certain components of the example material controller 200 shown in FIG. 21 may be combined in various embodiments of the disclosure. The material controller 200 of FIG. 21 is provided by way of example only.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a non-transitory computer-readable memory that may direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide task, acts, actions, or operations for implementing the functions specified in the block or blocks.

One or more components of the systems and one or more elements of the methods described herein may be implemented through an application program running on an operating system of a computer. They may also be practiced with other computer system configurations, including handheld devices, multiprocessor systems, microprocessor-based or programmable consumer electronics, mini-computers, mainframe computers, and the like.

Application programs that are components of the systems and methods described herein may include routines, programs, components, data structures, etc. that may implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks may be performed by remote processing devices linked through a communications network.

This U.S. non-provisional patent application claims priority to and the benefit of U.S. Provisional Application No. 63/367,570, filed Jul. 1, 2022, titled "HIGH VOLUME INDUSTRIAL VACUUM ASSEMBLIES AND METHODS," U.S. Provisional Application No. 63/367,219, filed Jun. 29, 2022, titled "RECEIVER, ASSEMBLIES, AND METHODS FOR LOADING AND EXTRACTING PRODUCT IN ELEVATED TOWER," U.S. Provisional Application No. 63/367,218, filed Jun. 29, 2022, titled "ASSEMBLIES AND METHODS FOR MATERIAL EXTRACTION FROM RETENTION COLLECTIONS,"

U.S. Provisional Application No. 63/364,630, filed May 13, 2022, titled "ASSEMBLIES, APPARATUSES, SYSTEMS, AND METHODS FOR MATERIAL EXTRACTION AND CONVEYANCE," U.S. Provisional Application No. 63/264,101, filed Nov. 16, 2021, titled "ASSEMBLIES AND METHODS FOR MATERIAL EXTRACTION," U.S. Provisional Application No. 63/264,015, filed Nov. 12, 2021, titled "ASSEMBLIES AND METHODS FOR MATERIAL EXTRACTION," U.S. Provisional Application No. 63/203,147, filed Jul. 9, 2021, titled "SYSTEMS, METHODS, AND DEVICES FOR INDUSTRIAL TOWER WASTE EXTRACTION," and U.S. Provisional Application No. 63/203,108, filed Jul. 8, 2021, titled "SYSTEMS, METHODS, AND DEVICES FOR INDUSTRIAL TOWER WASTE EXTRACTION," the disclosures of all of which are incorporated herein by reference in their entireties.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems, methods, and/or aspects or techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the disclosure may be practiced other than as specifically described.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further may be made thereto without departing from the spirit and scope of the present disclosure as set forth in the appended claims.

What is claimed is:

1. A method to enhance extraction of pall rings from a refinery apparatus, the method comprising:
   supplying a pressurized fluid to a plurality of vacuum generators;
   generating, via the plurality of vacuum generators by use of the pressurized fluid, a vacuum flow;
   associating a manifold with the refinery apparatus, the manifold providing a flow path for the vacuum flow;
   extracting pall rings from the refinery apparatus via the vacuum flow through the manifold to a material collector through which the vacuum flow passes;
   depositing at least a portion of the extracted pall rings in the material collector; and
   passing the vacuum flow into a sound attenuation chamber to reduce a sound level generated by one or more of the vacuum flow or generating the vacuum flow.

2. The method of claim 1, wherein generating the vacuum flow comprises receiving the pressurized fluid and using a venturi effect to generate the vacuum flow.

3. The method of claim 1, further comprising connecting the plurality of vacuum generators and the sound attenuation chamber to one another, thereby to define a unified vacuum and attenuation module.

4. The method of claim 1, further comprising directly connecting the plurality of vacuum generators and the sound attenuation chamber to one another.

5. The method of claim 1, wherein generating, via the plurality of vacuum generators by use of the pressurized fluid, a vacuum flow comprises operating the plurality of vacuum generators in parallel to enhance vacuum pressure of the vacuum flow.

6. The method of claim 1, further comprising passing the vacuum flow into filter media at least partially enclosed in the sound attenuation chamber to filter one or more of a portion of the pall rings or duct extracted from the refinery apparatus from the vacuum flow passing into the sound attenuation chamber.

7. The method of claim 1, further comprising removing a portion of the pall rings extracted from the refinery apparatus from the sound attenuation chamber and conveying the portion of the pall rings extracted from the sound attenuation chamber to a material collector configured to receive pall rings extracted from the refinery apparatus.

8. The method of claim 1, wherein the refinery apparatus comprises a tower, and extracting pall rings from the refinery apparatus comprises extracting pall rings from the tower.

9. The method of claim 1, wherein the pall rings comprise one or more of metal, ceramic, or polymeric pall rings.

10. The method of claim 1, further comprising supplying electric power to one or more of the plurality of vacuum generators via one or more of a battery, a solar panel, a wind turbine, or other renewable source of electrical power.

11. An extraction assembly to enhance extraction of pall rings from a refinery apparatus, the extraction assembly comprising:
   a vacuum source including a plurality of vacuum generators, each of the plurality of vacuum generators being positioned to cause a vacuum flow between the refinery apparatus and the vacuum source;
   a material collector including an interior collector volume positioned for receipt of at least a portion of the pall rings; and
   a sound attenuation chamber connected to the vacuum source, the sound attenuation chamber including an attenuation housing at least partially defining a chamber interior volume being positioned to receive at least a portion of the vacuum flow from the vacuum source and attenuate sound generated by the vacuum source.

12. The extraction assembly of claim 11, further comprising a manifold connected to the refinery apparatus and positioned to provide a flow path to convey extracted pall rings from the refinery apparatus.

13. The extraction assembly of claim 11, wherein one or more of the plurality of vacuum generators comprises a venturi mechanism configured to receive pressurized fluid from a fluid source of pressurized fluid and use a venturi effect to generate the vacuum flow between the refinery apparatus and the vacuum source and the sound attenuation chamber.

14. The extraction assembly of claim 11, wherein the vacuum source and the sound attenuation chamber are connected to one another, thereby to define a unified vacuum and attenuation module.

15. The extraction assembly of claim 11, wherein the vacuum source is connected to the material collector, the material collector being configured such that the vacuum flow passes through the material collector, drawing the extracted pall rings into the material collector.

16. The extraction assembly of claim 11, wherein:
the extraction assembly comprises a manifold connected to the refinery apparatus and positioned to provide a flow path to convey extracted pall rings from the refinery apparatus,
the material collector comprises a first material collector, the vacuum source comprises a first vacuum source, and the material extraction assembly further comprises:
- a second material collector connected to the manifold; and
- a second vacuum source connected to the second material collector, and
- so that the first vacuum source, the second vacuum source, the first material collector, and the second material collector increase an extraction rate of the pall rings from the refinery apparatus.

17. The extraction assembly of claim 11, further comprising filter media at least partially enclosed in the sound attenuation chamber and configured to filter one or more of a portion of the pall rings or dust extracted from the refinery apparatus from the vacuum flow passing through the sound attenuation chamber.

18. The extraction assembly of claim 11, further comprising:
- a battery configured to store electric energy to supply to the extraction assembly for operation; and
- a solar panel configured to supply electrical energy to one or more of the battery or the extraction assembly for operation.

19. The extraction assembly of claim 11, further comprising a plurality of flexible steel conduits providing a vacuum flow path between the vacuum source and the sound attenuation chamber.

20. The extraction assembly of claim 11, wherein the pall rings comprise one or more of metal, ceramic, or polymeric pall rings.

* * * * *